US011839975B2

(12) United States Patent
Harmalkar et al.

(10) Patent No.: US 11,839,975 B2
(45) Date of Patent: Dec. 12, 2023

(54) CONTROLLING A ROBOTIC ARM BASED ON PROFILOMETER SCANS TO PERFORM PRECISION WORKSTATION OPERATIONS UPON A WORKPIECE

(71) Applicant: VAIA Technologies LLC, Westborough, MA (US)

(72) Inventors: Chinmay Harmalkar, Shrewsbury, MA (US); Tyler C. Kelly, Cumberland, RI (US); David F. Bentley, Warwick, RI (US); Anthony Wang, Boston, MA (US); Thomas J. Kennedy, West Brookfield, MA (US)

( * ) Notice: Subject to any disclaimer, the term of this patent is extended or adjusted under 35 U.S.C. 154(b) by 0 days.

(21) Appl. No.: 18/157,797

(22) Filed: Jan. 20, 2023

(65) Prior Publication Data

US 2023/0234220 A1    Jul. 27, 2023

Related U.S. Application Data

(60) Provisional application No. 63/302,553, filed on Jan. 24, 2022.

(51) Int. Cl.
| | |
|---|---|
| *B25J 9/16* | (2006.01) |
| *B25J 11/00* | (2006.01) |
| *B25J 19/02* | (2006.01) |
| *B25J 13/08* | (2006.01) |

(52) U.S. Cl.
CPC .......... *B25J 9/1612* (2013.01); *B25J 9/1692* (2013.01); *B25J 9/1697* (2013.01); *B25J 11/0065* (2013.01); *B25J 13/089* (2013.01); *B25J 19/021* (2013.01)

(58) Field of Classification Search
CPC ...... B25J 9/1612; B25J 9/1692; B25J 9/1697; B25J 11/0065; B25J 13/089; B25J 19/021; B25J 9/1679; G05B 2219/45159
See application file for complete search history.

(56) References Cited

U.S. PATENT DOCUMENTS

| | | |
|---|---|---|
| 6,663,465 B2 | 12/2003 | Gross |
| 8,758,084 B2 | 6/2014 | Knecht et al. |
| 9,902,039 B2 | 2/2018 | Vogel et al. |
| 10,569,377 B2 | 2/2020 | Robinson et al. |
| 10,661,406 B2 | 5/2020 | Graves et al. |

(Continued)

*Primary Examiner* — Robert T Nguyen
(74) *Attorney, Agent, or Firm* — Patent GC LLC; Alexander Franco

(57) ABSTRACT

A computer-controlled robotic arm performs operations upon a workpiece, such as a knife with a blade that requires sharpening, by a set of one or more workstations, such as a grinder and a polisher. A position target having a defined surface profile is attached to the robot arm and scanned by a profilometer to determine a relative position of the arm with respect to a target centerpoint feature. The arm is then used to manipulate the centerpoint feature to locate operating features, such as a grinder's grinding surface, of the various workstations in the robot arm's coordinate system. A workpiece grasped by the robot arm is then scanned along with the target or another target to locate and profile the workpiece relative to the target. Based on the determined profile and positional relationships, the robot arm manipulates the workpieces so as to be operated upon by the workstations.

18 Claims, 47 Drawing Sheets

(56) References Cited

U.S. PATENT DOCUMENTS

| | | | |
|---|---|---|---|
| 2011/0022216 A1* | 1/2011 | Andersson | G05B 19/401 |
| | | | 700/114 |
| 2020/0246933 A1 | 8/2020 | Fowler et al. | |
| 2020/0254617 A1 | 8/2020 | Aldridge et al. | |
| 2023/0015238 A1* | 1/2023 | Clark | G06T 7/0004 |
| 2023/0049183 A1* | 2/2023 | Kennedy | B24B 3/54 |

* cited by examiner

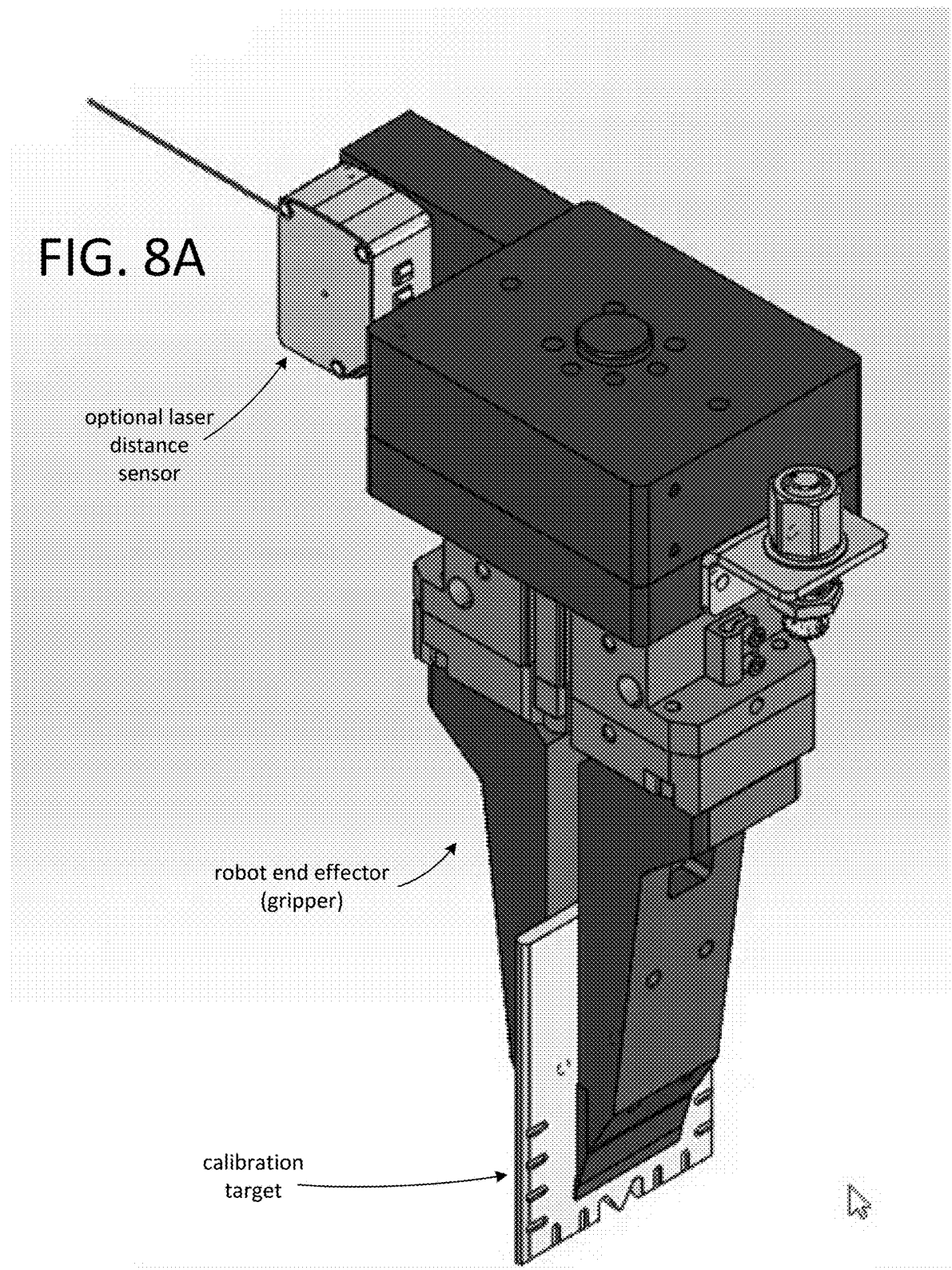

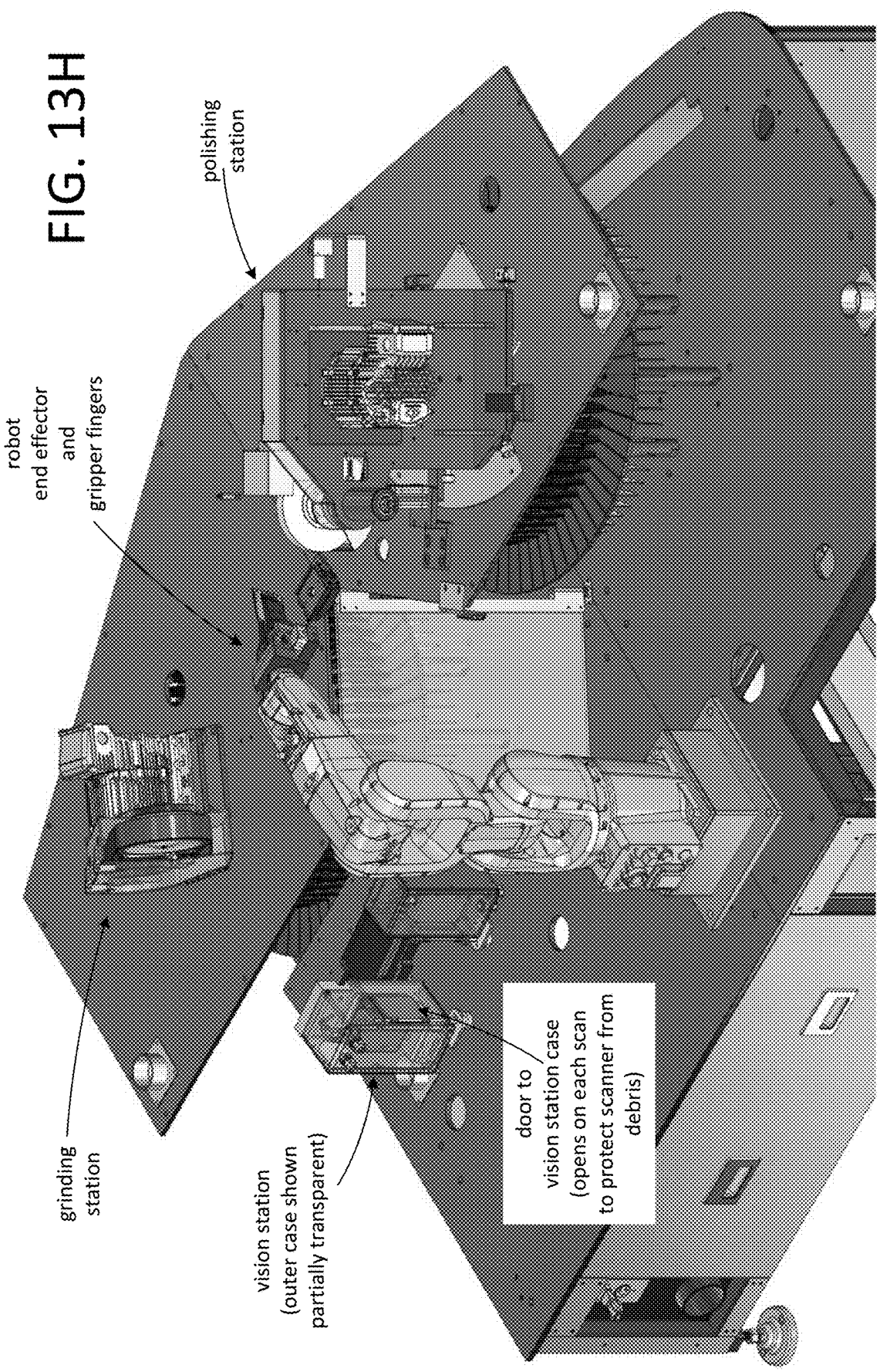

CONTROLLING A ROBOTIC ARM BASED ON PROFILOMETER SCANS TO PERFORM PRECISION WORKSTATION OPERATIONS UPON A WORKPIECE

RELATED APPLICATIONS

The subject matter of this application is related to U.S. Provisional Application No. 63/302,553, filed on 2022 Jan. 24 and U.S. patent application Ser. No. 17/400,952, filed on 2021 Aug. 12, all of which applications are incorporated herein by reference in their entireties.

SUMMARY OF THE INVENTION

A method is disclosed for operating a computer-controlled industrial robotic arm to perform operations by a set of one or more workstations upon a workpiece. The method includes: attaching a set of one or more position targets to the robotic arm, wherein each of the position targets has a defined surface profile that is configured for detection by a 3D scanning profilometer; operating the robotic arm to pass a centerpoint feature defined by the surface profile of a first target of the set of position targets through a detection plane of a first profilometer during a first profilometer scan; based on the first profilometer scan and a registered position of the robotic arm, determining a position of the centerpoint feature during the first profilometer scan; for each workstation of the set of one or more workstations: manually controlling positioning of the robotic arm to make physical contact between the centerpoint feature and each of one or more calibration points on the each workstation, and determining a position of an operating feature of the each workstation based on a registered position of the robotic arm at each physical contact; securing a workpiece to the robotic arm; operating the robotic arm to pass a portion of the workpiece to be operated upon and a second target of the set of position targets through the detection plane of the first profilometer during a second profilometer scan; based on the second profilometer scan, computationally determining a physical surface profile of the portion of the workpiece relative to the second target; and based on the determined physical surface profile relative to the second target, operating the robot arm to manipulate the portion of the workpiece for operation upon by the operating feature of the each workstation of the set of one or more workstations.

The method can be performed wherein the second target is a different target than the first target, and wherein the second target is also passed through the detection plane during the first profilometer scan, the method can further include: based on the first profilometer scan, the defined surface profile of the first target, and the defined surface profile of the second target, determining a position of a defined surface profile feature of the first target relative to a defined surface profile feature of the second target.

The method can be performed wherein the first target has been temporarily secured to the robot arm during the first profilometer scan, and wherein the first target has been removed from the robot arm during the second profilometer scan.

The method can be performed wherein the first and second targets are a same single target.

The method can further include: operating the robotic arm to pass the portion of the workpiece to be operated upon and a third target of the set of position targets through the detection plane of the first profilometer during a third profilometer scan, wherein the second profilometer scan and the third profilometer scan each scan the portion of the workpiece from a different perspective; and based on the third profilometer scan, determining a physical surface profile of the portion of the workpiece relative to the third target, wherein the robot arm is operated to manipulate the portion of the workpiece for operation upon by the operating feature of the each workstation of the set of one or more workstations further based on the determined physical surface profile relative to the third target.

The method can be performed wherein the first, second and third targets are different targets.

The method can be performed wherein the first, second and third targets are a same single target.

The method can be performed wherein a second profilometer is positioned and oriented opposite the first profilometer, wherein during the first profilometer scan, the centerpoint feature is passed between the first and second profilometers through a detection plane of the second profilometer simultaneously with being passed through the detection plane of the first profilometer, and wherein during the second profilometer scan, the portion of the workpiece to be operated upon and a third target of the set of position targets are passed between the first and second profilometers through the detection plane of the second profilometer.

The method can further include: performing a positional and orientational calibration between the robotic arm and each of the first profilometer and the second profilometer based on the defined surface profile of the first target.

The method can be performed wherein the robot arm comprises a robotically controllable gripper, and wherein the workpiece is secured to the robot arm by the gripper gripping the workpiece.

The method can be performed wherein the set of one or more workstations comprises a grinder for removing material from a portion of the workpiece, and wherein the operating feature of the grinder is a grinding surface.

The method can be performed wherein the workpiece is a cutting blade, and wherein the portion of the workpiece is a cutting edge of the cutting blade.

The method can further include: computationally determining a target edge profile for the cutting edge based on the determined physical surface profile of the cutting edge, wherein the robot arm manipulates the cutting blade for operation upon by the grinder to remove material in accordance with the target edge profile.

The method can be performed wherein the target edge profile is computationally determined: based on a set of one or more predetermined target edge profile characteristics; and by extrapolating the determined physical surface profile of the cutting edge into the cutting blade.

The method can further include: computationally analyzing the determined physical surface profile to identify defects in the determined physical surface profile; and computationally determining an amount of extrapolation into the cutting blade based on the identified defects.

The method can be performed wherein the set of one or more workstations comprises a polisher for polishing the cutting edge, and wherein, after operation upon by the grinder, the robot arm manipulates the cutting blade for operation upon by the polisher to polish the cutting edge in accordance with the target edge profile.

The method can be performed wherein the cutting blade is part of a knife having a handle, and wherein the cutting blade is gripped by the gripper by two lateral sides of the cutting blade such that the cutting edge is exposed and unobstructed by the gripper.

The method can further include: securing a workpiece to the robotic arm, the gripper gripping the workpiece to remove it from a predetermined location in a holder configured for storing multiple workpieces; and after operating the robot arm to manipulate the portion of the workpiece for operation upon by the operating feature of the each workstation of the set of one or more workstations, operating the robot arm and the gripper to place the workpiece in a predetermined location in a holder configured for storing multiple workpieces.

A system including the computer-controlled industrial robotic arm and the set of one or more workstations can perform the method.

One or more non-transitory computer-readable media can store computer code that is executed by a computer system to cause the computer-controlled industrial robotic arm and the set of one or more workstations to perform the method.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

BRIEF DESCRIPTION OF THE DRAWINGS

FIGS. 8A-C illustrate a temporary calibration target that can be used during a calibration procedure to calibrate the robot relative to the vision station.

FIGS. 13A-I illustrate computer rendered views of a system in accordance with one embodiment in additional detail.

DETAILED DESCRIPTION

Figure 1:
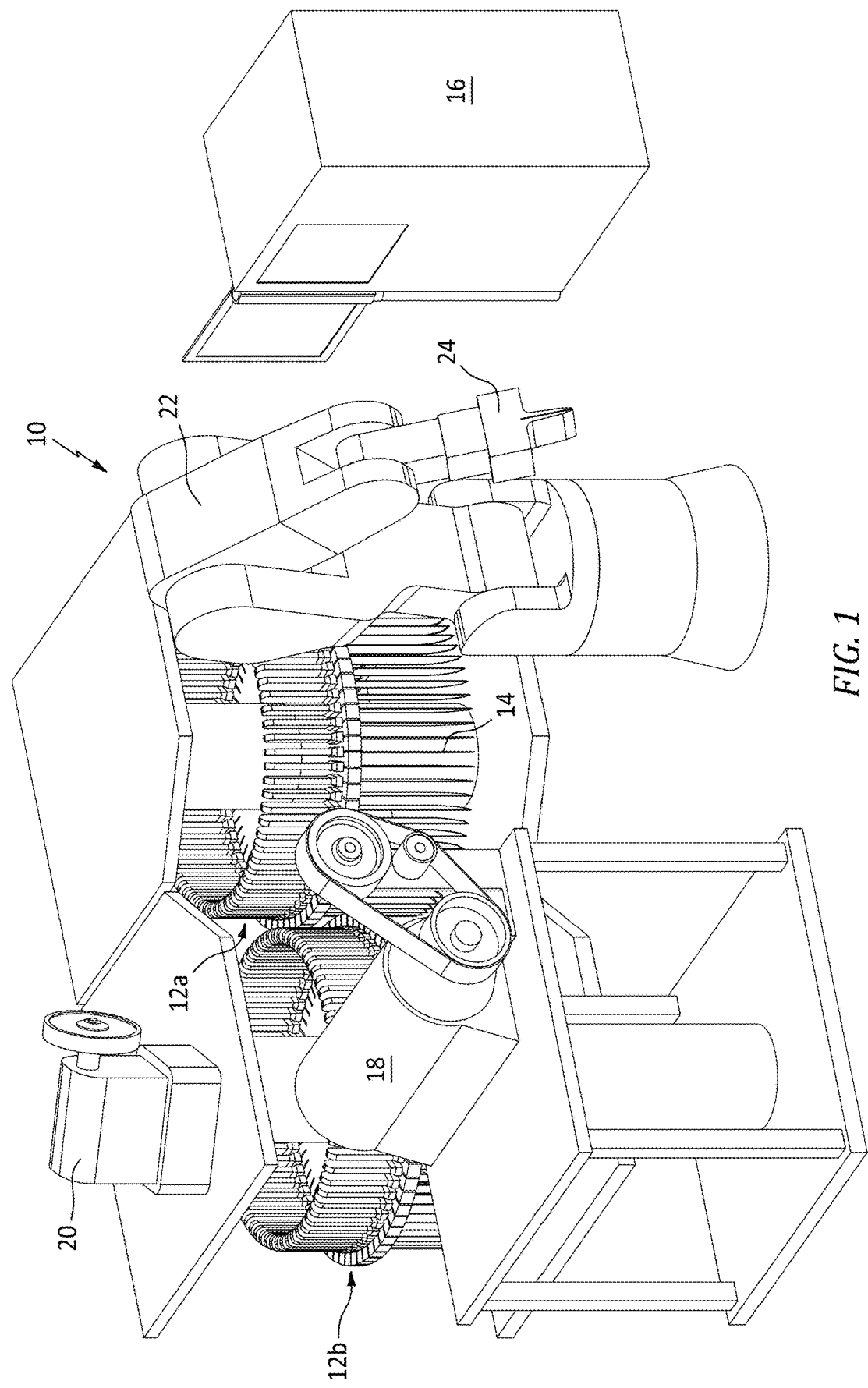
FIG. 1 is a perspective view of a system for automated sharpening or resharpening of cutting tools in accordance with one embodiment.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

A computer-controlled robotic arm performs operations upon a workpiece, such as a knife with a blade that requires sharpening, by a set of one or more workstations, such as a grinder and a polisher. A position target having a defined surface profile is attached to the robot arm and scanned by a profilometer to determine a relative position of the arm with respect to a target centerpoint feature. The arm is then used to manipulate the centerpoint feature to locate operating features, such as a grinder's grinding surface, of the various workstations in the robot arm's coordinate system. A workpiece grasped by the robot arm is then scanned along with the target or another target to locate and profile the workpiece relative to the target. Based on the determined profile and positional relationships, the robot arm manipulates the workpieces so as to be operated upon by the workstations.

In one embodiment, a robotic system is configured to rapidly and accurately sharpen knife blades. The robotic arm grasps a knife from a magazine holder by the blade as opposed to the handle, which reduces flex during the sharpening process, and passes the knife between a pair of oppositionally disposed profile scanners. The scanners produce a high-resolution three-dimensional mapping of the blade to produce an edge profile. The detected profile can be extrapolated into the knife blade body to produce a target edge profile. A robot trajectory is created based on the target profile to pass each blade edge across a grinder and a polisher. The trajectory, being based on the profile of the blade, enables the robot, still grasping the knife by the blade, to manipulate the blade across the grinder and the polisher so that the edge continuously contacts the grinder and polisher at a desired position and angle to achieve the target profile.

The disclosed system can be configured to sharpen cutting tool blades with edge profiles which approximate the original edge profile of the blades, regardless of whether the blade has a minor bend or warp. The system can also be configured to remove minor defects or flaws such as nicks or scratches from the cutting edge of the blade.

In one embodiment, the overall cycle time of the system (i.e., the time for one cutting tool to travel through the system and be returned to its original position in the magazine) can range from about 15 to about 45 seconds, preferably, from about 25 to about 35 seconds.

Reference will now be made in detail to the description of embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

Figure 2A:
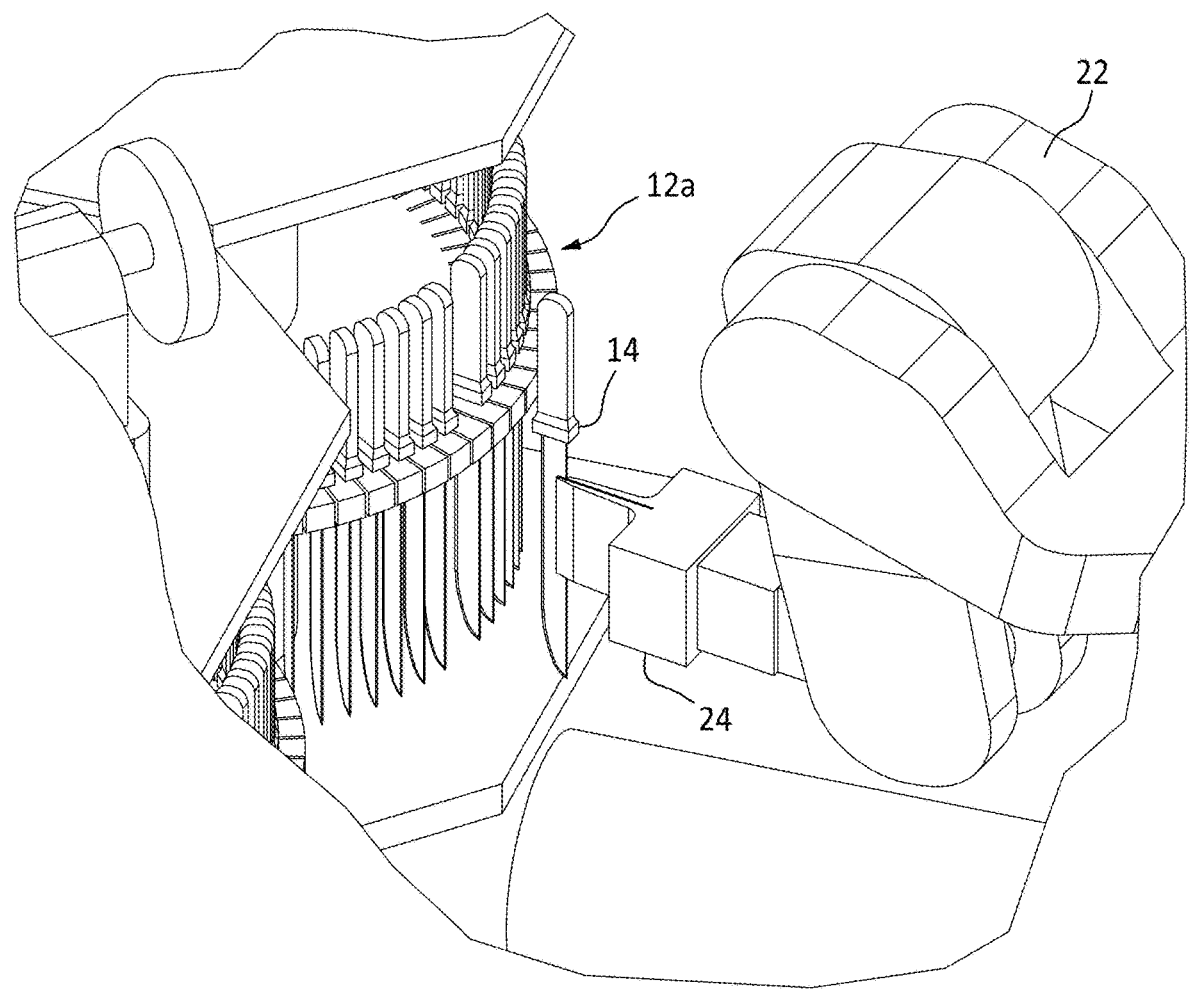
FIG. 2A is a perspective view of an end of arm gripper of a robotic arm selecting a cutting tool from a rotary magazine by gripping the blade a distance away from the cutting edge of the blade, in accordance with one embodiment.

FIG. 1 illustrates a system 10 for automated sharpening or resharpening of cutting tools, in accordance with one embodiment. System 10 advantageously includes two rotary magazines 12a, 12b, which hold a plurality of cutting tools 14, a vision station 16, a grinding station 18, a polishing station 20 and a robotic arm 22 with an end of arm gripper 24. As shown in FIG. 2A, the robotic arm 22 with end of arm gripper 24 is configured to locate and grip the blade of a cutting tool 14 a distance away from its cutting edge.

Components and other features of the inventive system will now be described in detail below.

Magazine(s)

The magazine or magazines used in the present inventive system serve to hold and advance cutting tools. This eliminates the need for specially designed racks or bins.

In one embodiment, as shown in FIG. 1, the magazine(s) is a rotary magazine(s) and a plurality of support members (e.g., slotted support members configured to removably secure a plurality of cutting tools) are arranged radially in the magazine, such that the cutting devices hang in a vertical fashion, with the cutting edge of each blade facing inward. The handle of each cutting tool is positioned above its respective slotted support member, while the blade of each cutting tool is positioned within and below the slotted support member.

Each magazine may be made up of one or more radial rows of slotted support members. Thus, the quantity of cutting tools may be doubled (or more) by adding one or more additional radial rows of support members above or below the existing row of support members.

One or more magnets (not shown) may be vertically arranged below each slotted support member, which assist in maintaining a proper vertical orientation of each cutting tool. A proper vertical orientation assures that the tool is correctly griped by the robotic arm to assure that it completely fits within the scanning window(s) of the visual station.

The magnets may adopt any shape (e.g., circular, square, rectangular, triangular) and may be substantially planar or curved to confirm to the arcuate shape of the plurality of support members and magazine.

In one embodiment, there is one (1) elongated or substantially rectangular magnet that measures from about 6 to about 50 mm in length, that is vertically arranged below each slotted support member.

In another embodiment, three or more substantially circular magnets, preferably, three magnets, that each measure from about 3 to about 9 mm in diameter, are vertically arranged below each slotted support member.

In one embodiment, neodymium (N42 grade) magnets are used. These are sometimes referred to as "super magnets". Sintered neodymium-iron-boron (Nd—Fe—B) magnets are a member of the rare earth magnet family and are one of the most powerful permanent magnets known. An advantage of this type of magnet is that they are very resistant to demagnetization and can be expected to hold their magnetism for the lifetime of the inventive system. It should be appreciated by those skilled in the art that other types of magnets that have equivalent magnetic strength properties to neodymium magnets could be conceivably used.

More than one magazine may be used within the inventive system. In a preferred embodiment, as shown in FIG. 1, two magazines 12a, 12b, are used, which allows for an operator to safely load/unload one magazine while the robot is sharpening from the other.

In one embodiment, the rotary magazine accommodates 64 knives, but other embodiments may accommodate anywhere from about 25 to about 100 cutting devices. The magazine is programed to index for the next cutting tool to get sharpened until all of the cutting tools are sharpened. The magazine may be advanced by any suitable means including, for example, by a motor or pneumatic cylinder attached to gears or to a ratchet type mechanism. The magazine may also be advanced using a mechanism employing two pins (one stationary and one that moves a specific distance), with the mechanism shuttling the pins in such a way to index the magazine.

For those embodiments employing more than one rotary magazine, once all of the cutting tools in a first magazine are sharpened, the robotic arm will start to pull from another magazine. At that time, the first magazine will become accessible to an operator for removal of the sharpened cutting tools. The inventive system allows an operator to select if a magazine is loaded with similar shaped cutting tools to potentially reduce overall cycle time.

For those embodiments of the inventive system in which the system is enclosed within a system enclosure, which is described in more detail below, the magazine(s) may be fixed within the enclosure or may be capable of moving laterally to the outside of the enclosure. Removal of sharpened cutting tools may therefore occur either from within the enclosure or from the outside of the enclosure, either manually by an operator, or automatically by machine.

Pick and Place Motion

The trajectory paths of the robotic arm while selecting cutting tools from (and returning cutting tools to) the magazine(s) are pre-programmed robotic motion paths. As will be readily understood by those skilled in the art, all operations of the robotic arm are controlled by a control system that controls its position. While manipulation of the pickup and drop off motion trajectories may be necessary, in a preferred embodiment, the magazine(s) is universal enough to allow most tool shapes and sizes to be picked up and returned without any such manipulation.

A distance sensor may be used in the magazine(s), which monitors the presence of a cutting tool handle. If the distance sensor doesn't recognize the presence of a handle, the system would consider the slot in the magazine to be empty and would index to the next slot until it found another handle.

Vision Station

Since the work of the robotic arm is to manipulate cutting tools, three-dimensional information of the manipulated tools is necessary. The vision station serves this purpose by scanning and determining the entire cutting edge of each cutting tool.

The term "vision station", as used herein, refers to a three-dimensional (3D) scanner system, which is made up of one or more depth cameras or 3D profilometers. The 3D scanner system has an automatic door opening/closing mechanism, which serves to protect the sensitive imaging components from dust generated during the grinding and polishing steps. The 3D profilometer(s) is used in conjunction with movement of a cutting device through its focal area. Multiple line scans are captured and stitched together to form a 3D image of the entire cutting edge of the cutting tool (i.e., machine vision images).

The machine vision images obtained for each cutting tool are translated to robot motion (i.e., sharpening/polishing motion paths arrived at based on the imaging data). More specifically, all necessary measurement data from the tip to the heel (i.e., from the start to the end) of the cutting edge of the blade can be extracted from the machine vision images. The handle, or grind dwell can be used to determine the end of the cutting edge. The tip can be determined by observing when the cutting edge and spine data only are the same (i.e., for a single line scan, there is only one data point). The measurement data can be extracted from the machine vision images using suitable technologies. In one embodiment, the robotic arm is an ABB, Inc. robotic arm and the measurement data or output information is translated into accurate and reproducible motion using, for example, RAPID® high-level programming language (i.e., RAPID instructions), which is transferred to the robotic arm controller for the purpose of guiding the robotic arm through the grinding and polishing steps.

The 3D profilometer(s) can be used to determine the size and surface profile of the entire cutting edge of the cutting tool. The terms "scan width" and "scan length" are intervals in distance at which the profilometer makes measurements. In one embodiment, the 3D profilometer has a known and fixed scan width ranging from about 20 to about 130 mm. The scan length, which may run from about 100 to about 350 mm, can be set by an operator to approximate the length of the largest cutting tool blade loaded on the magazine(s) during each system cycle.

Due to the method of capturing and processing the image for the entire cutting edge of each blade (i.e., the scan and how the sharpening process is executed), the robotic arm can be capable of evenly sharpening a cutting edge with a bend or warp.

Figure 2B:
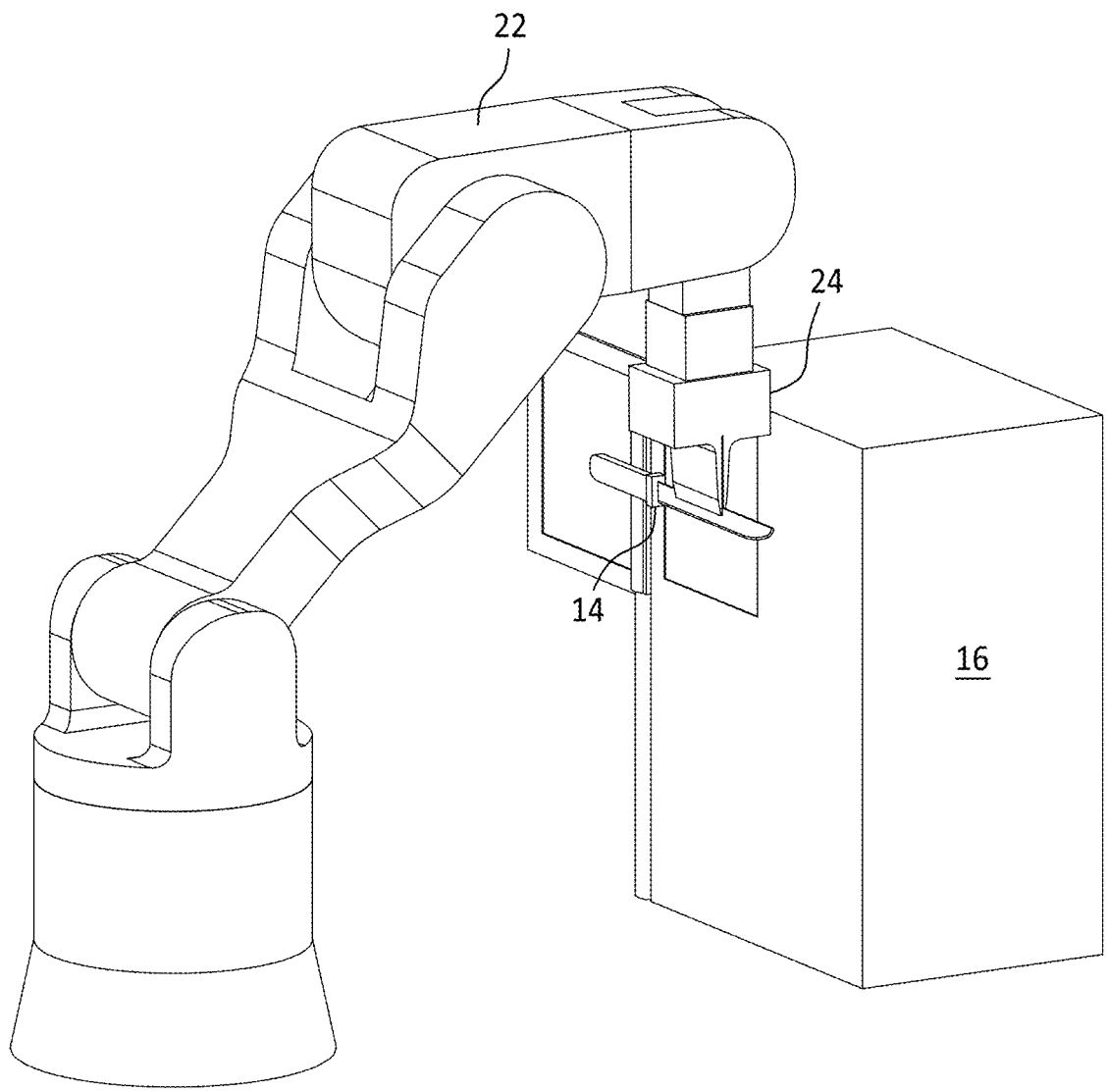
FIG. 2B is a perspective view of the end of arm gripper of the robotic arm providing the cutting tool for scanning one side of the blade at a vision station, in accordance with one embodiment.
Figure 2C:
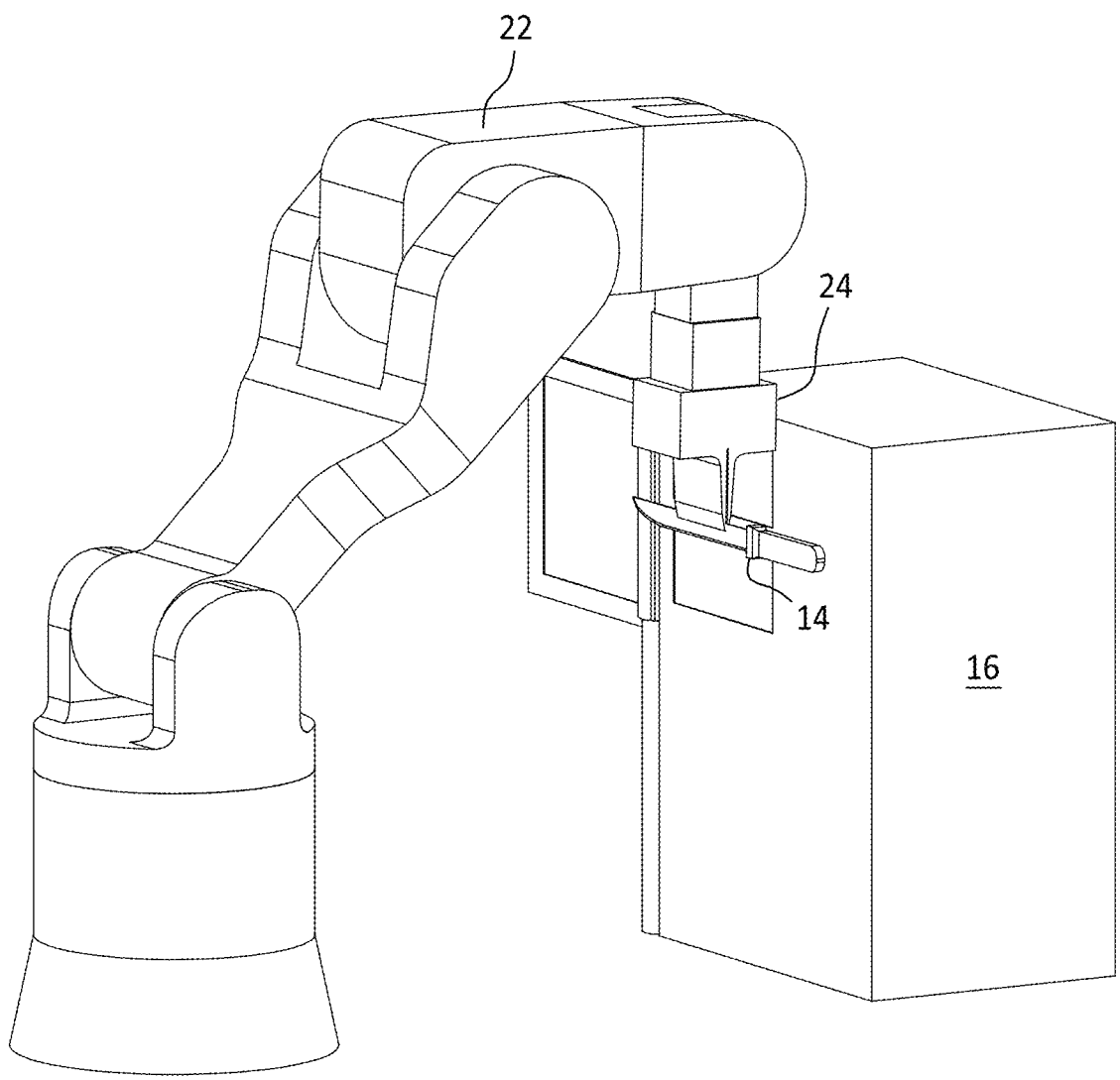
FIG. 2C is a perspective view of the gripper providing the cutting tool for scanning the opposite side of the blade at the vision station.

In one embodiment, the vision station is made up of one 3D profilometer, and as shown in FIGS. 2B and 2C, each side of the cutting device is moved through its focal area in succession and the resulting line scans captured and stitched together to form a 3D image of the cutting tool.

In another embodiment, the vision station is made up of two, oppositely opposed, 3D profilometers, and the cutting device is moved between the profilometers through their respective focal areas, with both sides of the cutting device being scanned at the same time. By scanning both sides of the device simultaneously, machine cycle time is reduced.

In yet another embodiment, the vision station also includes a QR code scanning device. A scannable QR code is added to each cutting device in an area on the main body portion of the blade which is remote from both the area contacted by the gripper of the robotic arm and the cutting edge of the blade. The QR code scanning device may operate concurrently or sequentially with the profilometer(s) scan. After the QR code is scanned, the QR code is identified to obtain data symbol information stored in the QR code. As will be readily appreciated by those skilled in the art, the use of scannable QR codes on cutting tools may be used to track the tools in, for example, processing plants, monitoring persons, shifts and returns of the cutting tools, the number of times each cutting tool has been sharpened and the life of the cutting tool. In this embodiment, the inventive system will recognize a serial number for a tool and store sharpening data/images for that tool to a designated file.

The system may then communicate the collected tool data with a data collection system utilized in the processing facility (e.g., INNOVA ZONES inventory control, inventory management platforms).

Rejects

If the scan data indicates that: (a) the gripper 24 is too close to the cutting edge of the cutting tool 14; (b) the cutting tool does not fit inside the scan window or there is another form of a scan fault; (c) there is a major flaw (i.e., a chip or a gouge) in the surface of the cutting tool; or (d) the cutting edge of the cutting tool is too thin, then the robot can move the tool to a reject location for collection and proceed to load another tool.

The system can also reject a cutting tool if: a system operator stops the system; the air pressure within the system enclosure falls below 415 kilopascals (kPa); or a fault occurs in the form of, for example, a camera communication fault, a grinder or polishing motor fault, or a diameter sensor/DAQ fault or bad diameter reading for a polishing wheel.

Processing Stations

The one or more processing stations of the present inventive system process each side of the entire cutting edge of each cutting tool separately.

Grinding Station

The grinding machine used in the present inventive system achieves a consistent contour and uniform sharpened edge along the blade. The grinding medium used in the grinding machine may be made using any suitable abrasive and in one embodiment is selected from the group of grinding or sanding belts made of zirconium oxide (zirconia) and ceramic abrasives and grinding stones made of diamond, silicon carbide, aluminum oxide, soft and hard Arkansas, ceramic, and Japanese water stones. For those embodiments in which the grinding medium is a grinding stone wheel, a diameter sensor may be employed, allowing the system to compensate for wheel wear, and to alert the user when the wheel needs to be replaced.

Figure 3A:
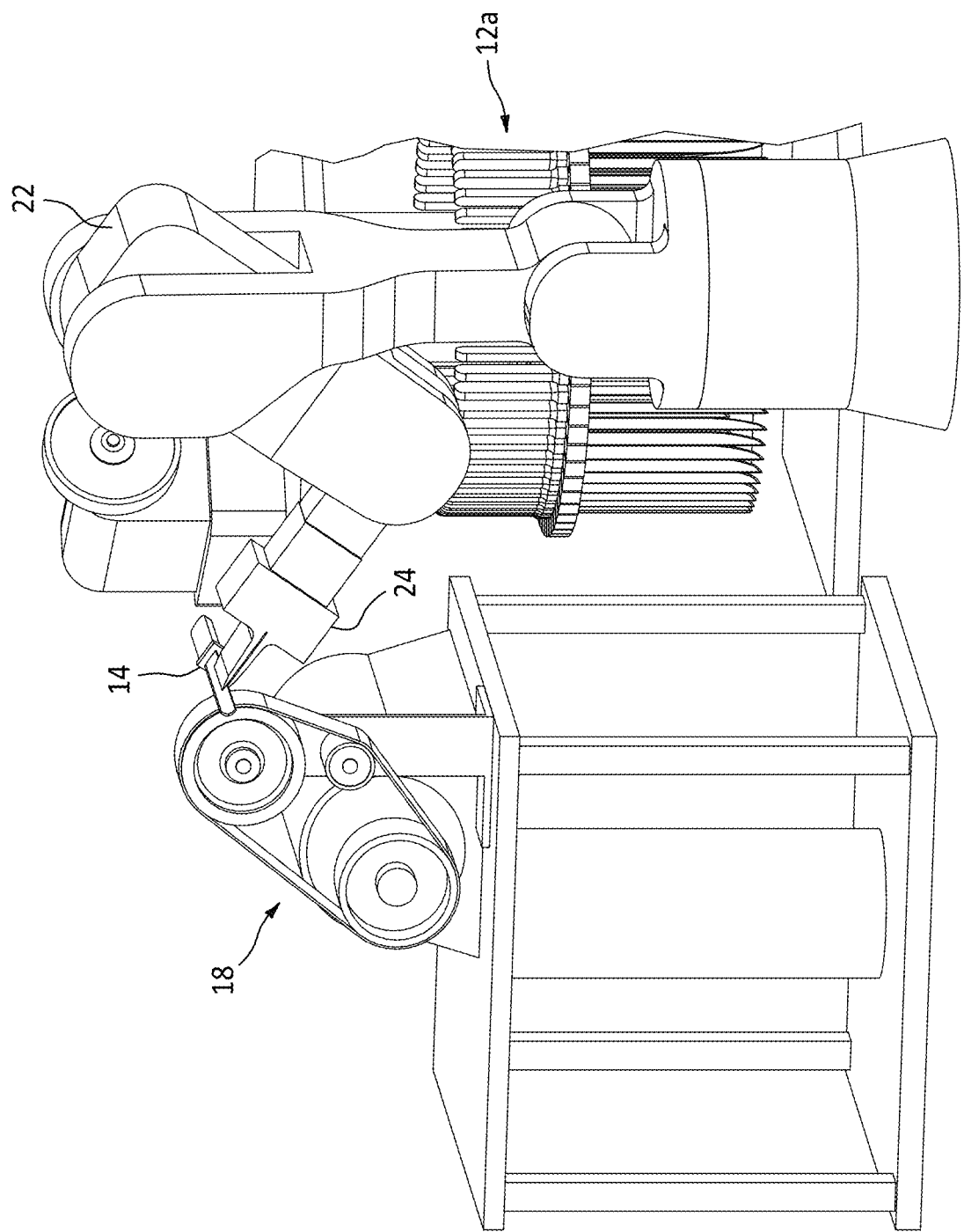
FIG. 3A is a perspective view of the end of arm gripper of the robotic arm providing the cutting tool for grinding one side of the blade at the grinding station, in accordance with one embodiment.
Figure 3B:
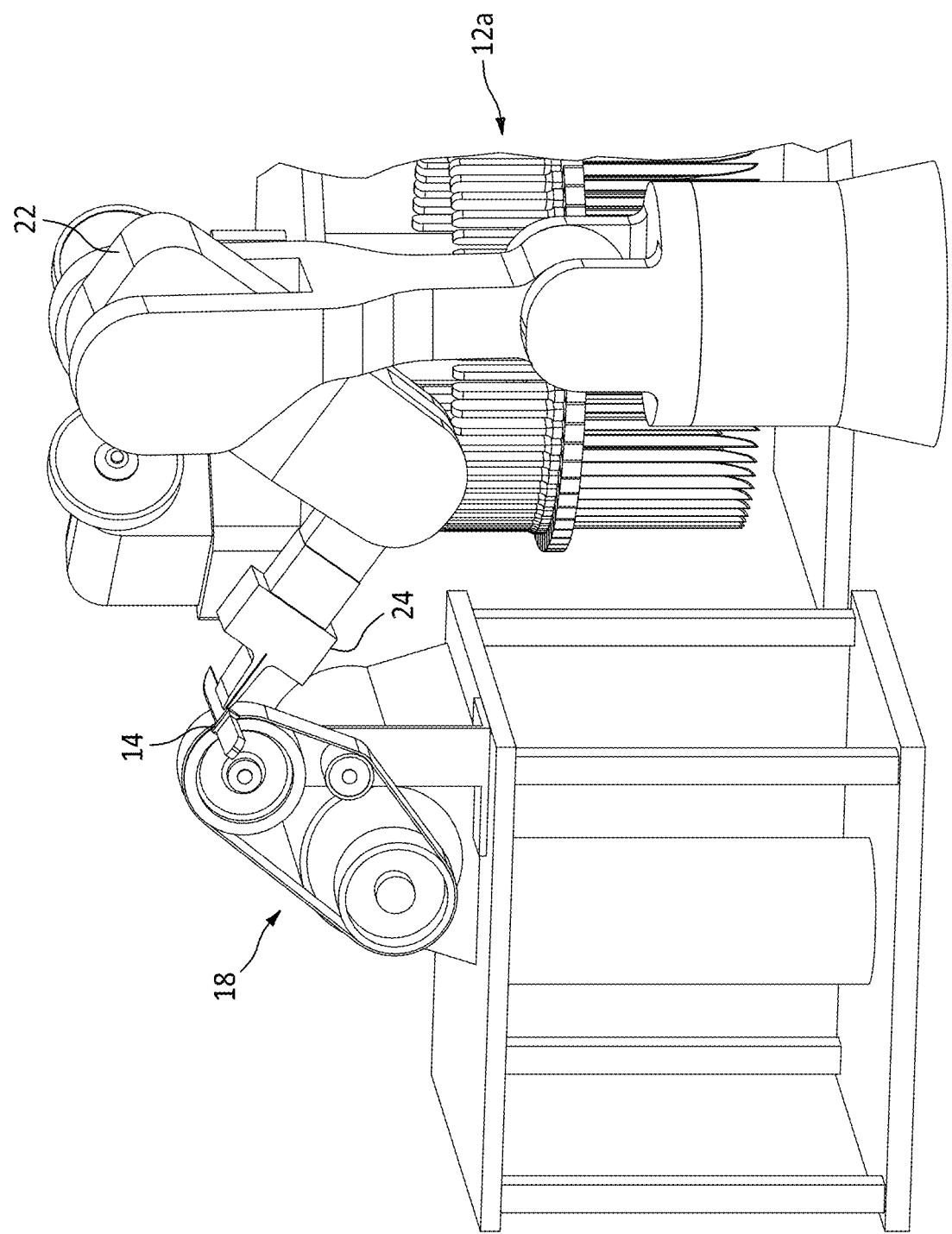
FIG. 3B is a perspective view of the gripper providing the cutting tool for grinding the opposite side of the blade at the grinding station.

In one embodiment, the grinding medium is a zirconia or ceramic sanding belt having various abrasive grain types or shapes. As best shown in FIG. 3A, the grinding machine 18 is a belt grinder, which employs a ceramic sanding belt driven by a motor. In this embodiment, the belt has a ceramic precision shaped grain for optimum belt life, a width ranging from about 2.54 to about 7.62 centimeters (cm), a length ranging from about 119.38 to about 124.46 cm, and a grit ranging from No. 120 grit to No. 400 grit. As best shown in FIGS. 3A and 3B, the grinding machine 18 sharpens each side of the entire cutting edge of each cutting tool separately and in succession.

Suitable grinding machines in the form of belt grinders and belt sanders are widely available from known manufacturers.

The angle of the grinding medium to the edge of the blade preferably ranges from about 25 to about 45 degrees. As will be readily appreciated, when sharpening longer blades, the cycle time will and should be longer than when sharpening a shorter blade. As noted above, 100% of the cutting edge of the cutting tool is sharpened during this process.

Sharpness levels obtained by the disclosed system can be represented by Anago Scores of greater than or equal to 8.0, preferably, greater than or equal to 8.5.

The inventive system may be configured to indicate when the grinding belt must be replaced. In one embodiment, the system is configured to calculate the length of cutting edges sharpened, and when that value exceeds a set number, the system will indicate to the user that the grinding belt needs to be replaced.

Polishing Station

Figure 4A:
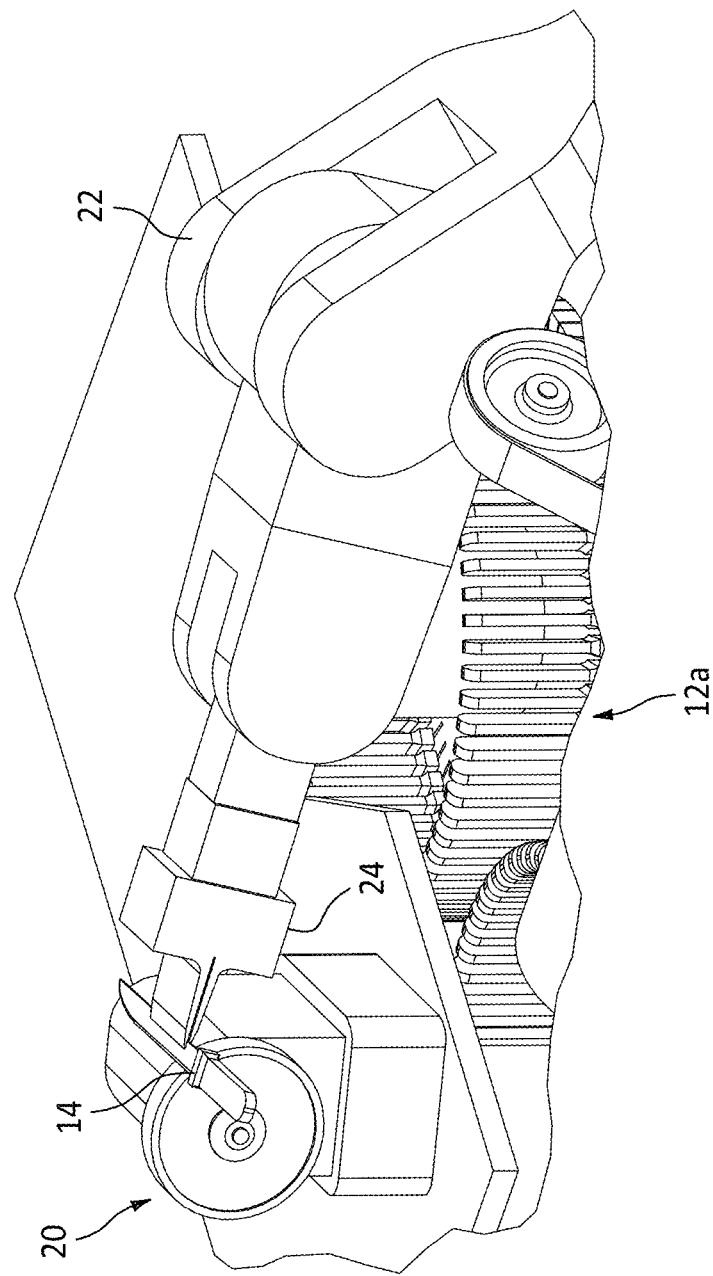
FIG. 4A is a perspective view of the end of arm gripper of the robotic arm providing the cutting tool for polishing one side of the blade at the polishing station, in accordance with one embodiment.

In one embodiment, as best shown in FIG. 4A, the polishing station 20 is made up of a polishing buffing wheel driven by a motor. The polishing station 20 may also include a diameter sensor (not shown) and a polishing compound applicator (also not shown).

Suitable polishing buffing wheels include, but are not limited to, cotton buff, Fixed Abrasive Buff (FAB), muslin buff and leather buffing wheels. A polishing compound is applied to the wheel before polishing. Suitable polishing compounds include, but are not limited to, white or brown rouge in liquid or cake forms.

Suitable polishing units in the form of buffers and polishers are widely available from known manufacturers.

Figure 4B:
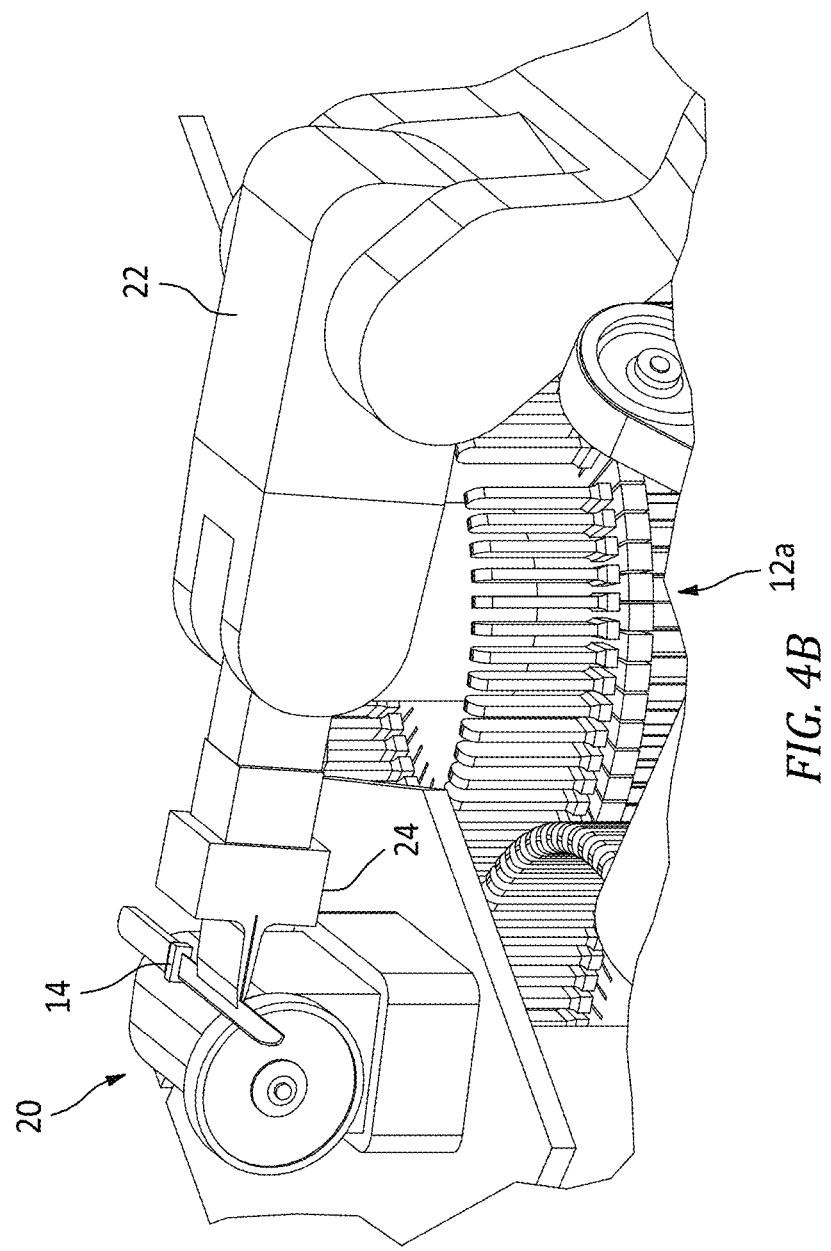
FIG. 4B is a perspective view of the gripper providing the cutting tool for polishing the opposite side of the blade at the polishing station.

The angle of the polishing buffing wheel to the edge of the blade preferably ranges from about 17 to about 30 degrees. As best shown in FIGS. 4A and 4B, the polishing machine 20 sharpens each side of the entire cutting edge of each cutting tool 14 separately and in succession. As will be readily appreciated by those skilled in the art, timing will vary based on the length of the cutting edge.

The inventive system may be configured to indicate when the polishing belt must be replaced. In one embodiment, a distance sensor, which measures the diameter of the buffing wheel, is employed. When the wheel diameter falls below a set value, the system will alert the user to replace the wheel.

The effectiveness of the polishing process is indicated by an Anago Score of greater than or equal to 8.0, preferably, greater than or equal to 8.5.

A polishing wheel laser sensor may also be used in conjunction with the polishing unit to measure the polishing wheel diameter and to use this value to fine-tune the robot polishing motion profile. In one such embodiment, diameter sensor data is fed back to the controller to update the robotic arm's move positions for the polishing operations (e.g., in RAPID®, the data is used to update the Tool Center Point by establishing an offset from the original wheel diameter).

Sharpness Testers

One or more sharpness testers may be positioned within the inventive system.

In one embodiment, a sharpness tester is positioned after the grinding and polishing stations to test whether the blade sharpening process was efficient. If the sharpness tester indicates an Anago Score below an established level, the cutting tool would be reimaged and resharpened while the robotic arm was holding it. If the sharpness tester indicates on two consecutive occasions an Anago Score below the established level, the cutting tool would be sent to a reject location for collection. In another embodiment, a sharpness tester is also positioned before the Vision Station to test whether a blade needs to be sharpened before sharpening the blade. If the sharpness tester indicates an Anago Score at or above an established level, the cutting tool would be returned to its slot in the magazine.

Suitable knife sharpness testers (e.g., KST300E with Automation Module) are available from Anago Limited, Hamilton, New Zealand.

Such a sharpness tester provides the system with a blade sharpness profile. This profile gives a visual indication of the blade's sharpness measured at 2 mm intervals along the length of the blade. The results help determine the sharpness of the blade and any dull/sharp areas as well as nicks in the blade.

Acceptable Anago Scores for blade sharpness range from 8.0 to 9.0, preferably, from 8.5 to 8.7 or from 8.5 to 9.0.

Robotic Arm

In one embodiment, the robot arm is a compact industrial robot arm with unlimited sequence control, such as the IRB 1200 from ABB Inc.

As will be readily understood by those skilled in the art, all operations of a robotic arm are controlled by a control system that controls the mechanism position. Since the work of the robotic arm is to manipulate cutting tools, three-dimensional information of the environment or manipulated cutting tools is necessary.

The trajectory paths to a magazine to extract a cutting tool, from the magazine to the vision station, while at the vision station, from the vision station to the grinding and polishing stations, to a reject collection location, and from the polishing station back to the magazine are pre-programmed sequences.

The trajectory paths while at the grinding and polishing stations, however, are defined by the output information from the vision station using an algorithm to locate the beginning and the end of the cutting edge of the cutting tool from the three-dimensional image, extrapolating X, Y and Z cutting edge data, conveying the extrapolated data to a robotic arm controller, which converts the extrapolated data to motion instructions and conveys the motion instructions to the robotic arm.

The end of arm gripper 24 of the robotic arm 22 is selected from the group of parallel grippers, pneumatic parallel grippers and electric parallel grippers, and may be configured in different sizes to handle a range of cutting tool sizes.

In one embodiment, as best shown in FIG. 1, the end of arm gripper 24 is a pneumatic parallel gripper with a pair of fingers. Suitable pneumatic parallel grippers are available from known manufacturers. In another embodiment, the gripper is a slip resistant gripper, which is coated with a material such as rubber or urethane to increase friction to resist axial or rotational movement while the cutting tool is gripped. In a preferred embodiment, a tear resistant urethane material is coated onto contact surfaces of the gripper fingers.

In yet another embodiment, at least a portion of a contact surface of a gripper finger is textured in, for example, a hatch pattern, to further increase the slip resistance of the gripper.

Figure 5A:
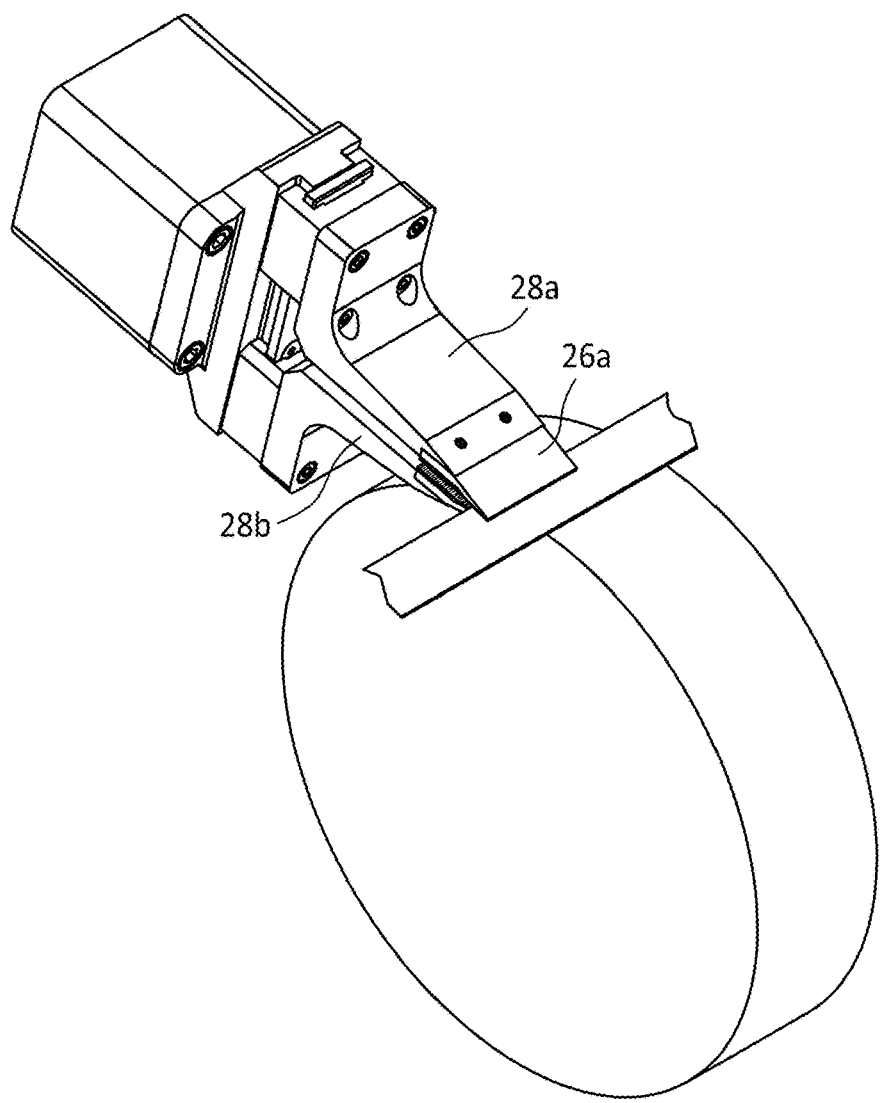
FIG. 5A is a perspective view of the end of arm gripper of the robotic arm, which has two gripper inserts, each mounted on one oppositely disposed gripper finger, in accordance with one embodiment, the gripper inserts holding one side of a blade against a grinding wheel.
Figure 5B:
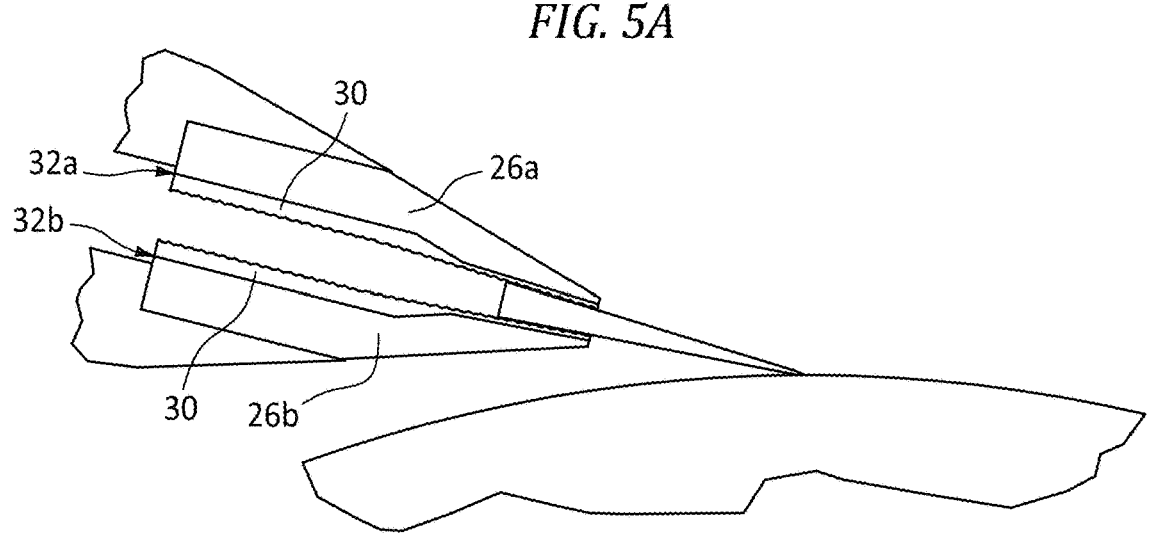
FIG. 5B is an enlarged side perspective view of the gripper inserts of FIG. 5A, showing a slip-resistant material applied to inner contact surfaces of the gripper inserts.

In yet a further embodiment, as shown in FIGS. 5A and 5B, two gripper inserts 26a, 26b, are each mounted (e.g., using 2 flat head screws per insert) on one oppositely disposed gripper finger 28a, 28b. The position of these gripper inserts is therefore fixed (i.e., not being able to be adjusted). Each gripper insert 26a, 26b, which represents an extension of its respective gripper finger, is tapered at an angle from the gripper finger 28a, 28b. The two gripper inserts are made from a material different than that used to make the gripper 24 (e.g., a hardened A2 tool steel (58-60 RHC)) and thus can overcome the stresses during the clamping, grinding and polishing operations. An optionally textured, slip-resistant material 30 (e.g., a tear resistant urethane material) may be applied to the inner contact surfaces 32a, 32b, of the gripper inserts 26a, 26b.

In another embodiment, the pair of gripper fingers 28a, 28b, are not used with one or more gripper inserts, but instead the end of the gripper fingers adopt the geometry of the gripper inserts shown, for example, in FIGS. 5A and 5B.

As noted above, the robotic arm is configured to locate and grip a cutting tool at a specific distance away from the inner cutting edge of the blade, to remove the cutting tool from its location in a magazine and then to convey the cutting tool to the vision station, to the one or more processing stations and then back to the same location in the magazine, and then to repeat the above sequence until all of the cutting tools in the magazine(s) are sharpened or resharpened.

The robotic arm grasps the blade of each cutting tool at a set distance away from the cutting edge. In one embodiment, the end of arm gripper grasps the cutting blade at a distance of at least about 8 mm away from the cutting edge, preferably from about 8 to about 10 mm. In another embodiment, the end of arm gripper grasps the cutting blade at a distance of at least about 5 mm away from the cutting edge, preferably from about 5 to about 10 mm. If the end of arm gripper grasps the blade at a distance of less than 8 mm away from the cutting edge in one embodiment, or 5 mm away in another embodiment, then the gripper may be damaged during the grinding and polishing operations. If grasped at a distance of more than 10 mm away, then the robotic arm may not be able to consistently pick-up the cutting tool or may drop the tool during the sharpening or polishing process.

System Enclosure

The inventive system is preferably housed within an enclosure. The enclosure provides important benefits, namely, it protects operators from the robotic arm, and it helps to protect the robotic arm from being damaged by other equipment. The enclosure also serves to contain sharpening debris (e.g., metal shavings/polishing compound). The enclosure can be made from any suitable material including expanded metals, sheet metals (e.g., aluminum sheet metal) and plastic sheet materials (e.g., polycarbonate) and may be customized by adding options such as safety lights to signal when access doors are open, emergency stop buttons, door interlocks for safety, etc.

One or more outer (or front) guard doors provide an operator with access to the magazine(s) for loading and unloading of cutting tools. One or more inner guard doors provide the robotic arm with access to the magazine(s) for sharpening and polishing.

User Interface

The inventive system is controlled by a controller having a user interface (e.g., a touch screen user interface, a keyboard/mouse user interface). The user interface allows an operator to manually lock/unlock the system enclosure, open/close the magazine access doors in the enclosure, manually move the robotic arm, toggle actuators in the system, and adjust a number of thresholds and settings including, but not limited to, sharpening angle(s), belt replacement, buffer wheel replacement, buffer calibration, stock-keeping units (SKUs) in magazine, grinding/polishing speeds and review of alarm/error codes.

Sequence of Operation

Figure 6:
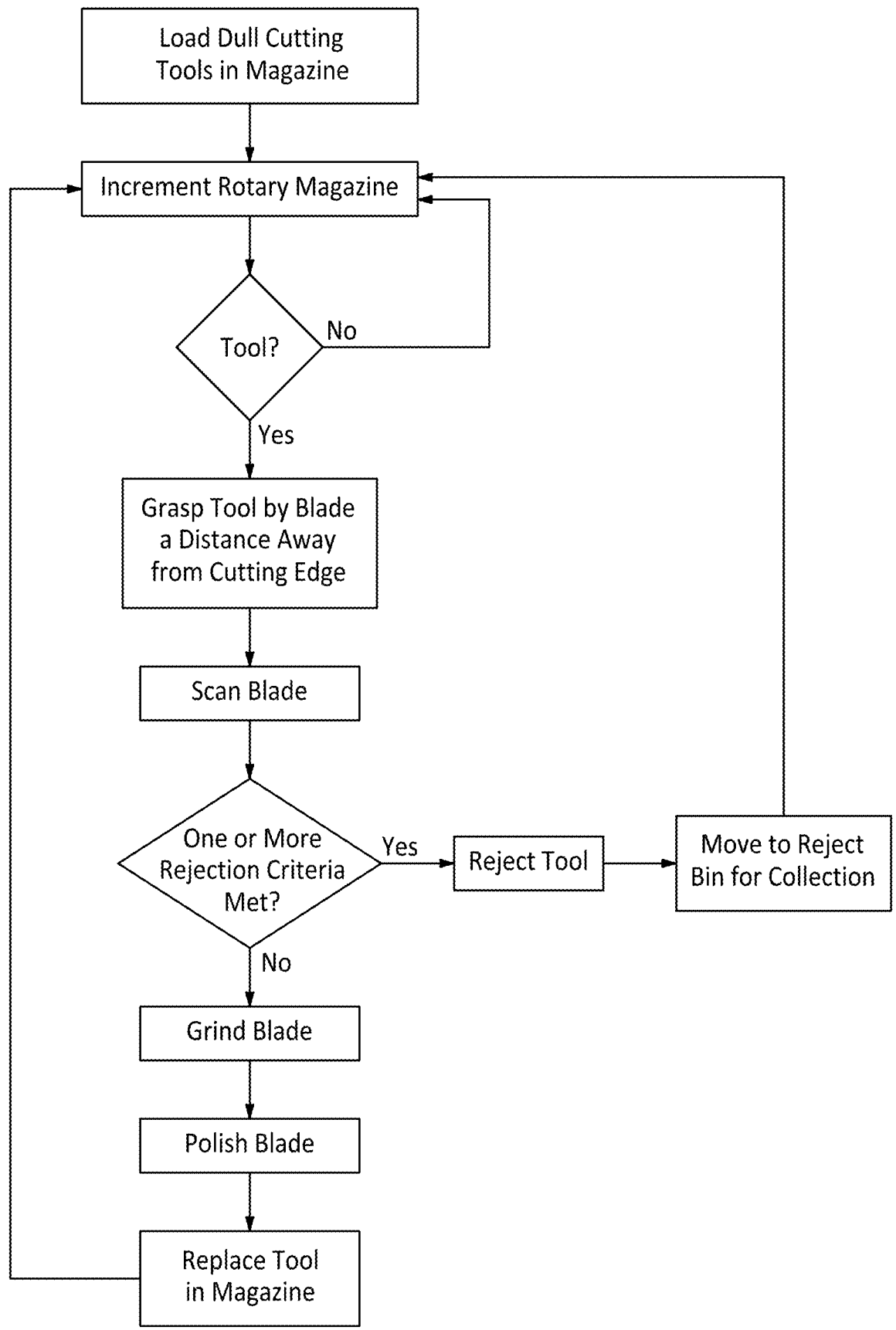
FIG. 6 illustrates a sequence of operation of the system in accordance with one embodiment.

FIG. 6 illustrates a sequence of operation of the system in accordance with one embodiment. In accordance with the embodiment, an operator opens front guard doors to load two magazines of dull knives and then closes the guard doors and starts the system. The gripper grabs the blade of the knife a distance away from the cutting edge and the robotic arm presents the blade to the vision station where the blade is imaged. The blade edge data is extracted from the blade images, converted to robotic arm targets or points in space that can be followed by the robotic arm and then a file with these targets or points in space opened with the robotic arm controller and converted to move instructions using the controller. The robotic arm uses the instructions to maneuver the blade across a grinding belt at the grinding station in two passes to sharpen both sides of the blade. The robotic arm then maneuvers the blade past the polishing wheel in two passes to polish both sides of the blade. Optionally, the robotic arm moves the blade into an Anago unit for sharpness reading. The robotic arm then places the blade back into the same location in the same magazine. The sequence is then repeated for additional knives.

During auto cycle, an operator can open the front guard doors to unload the finished magazine and load it with dull knives. Then, close the front guard doors. When the left-side magazine has been fully processed, the left-side tray cover closes, the right-side tray cover opens, and the robotic arm continues with the right-side magazine. This may of course also progress in the opposite direction, namely, when the system is finished with the right-side magazine and moves to process the left-side magazine, the right-side magazine can be unloaded/loaded while the left-side magazine is being processed.

The inventive system and method permits a precise, reproducible grind or regrind of cutting tools having widely varying sizes and degrees of wear, with high efficiency and grinding/polishing quality.

Operation of the Robotic Arm and 3D Scanners

Figure 7A:
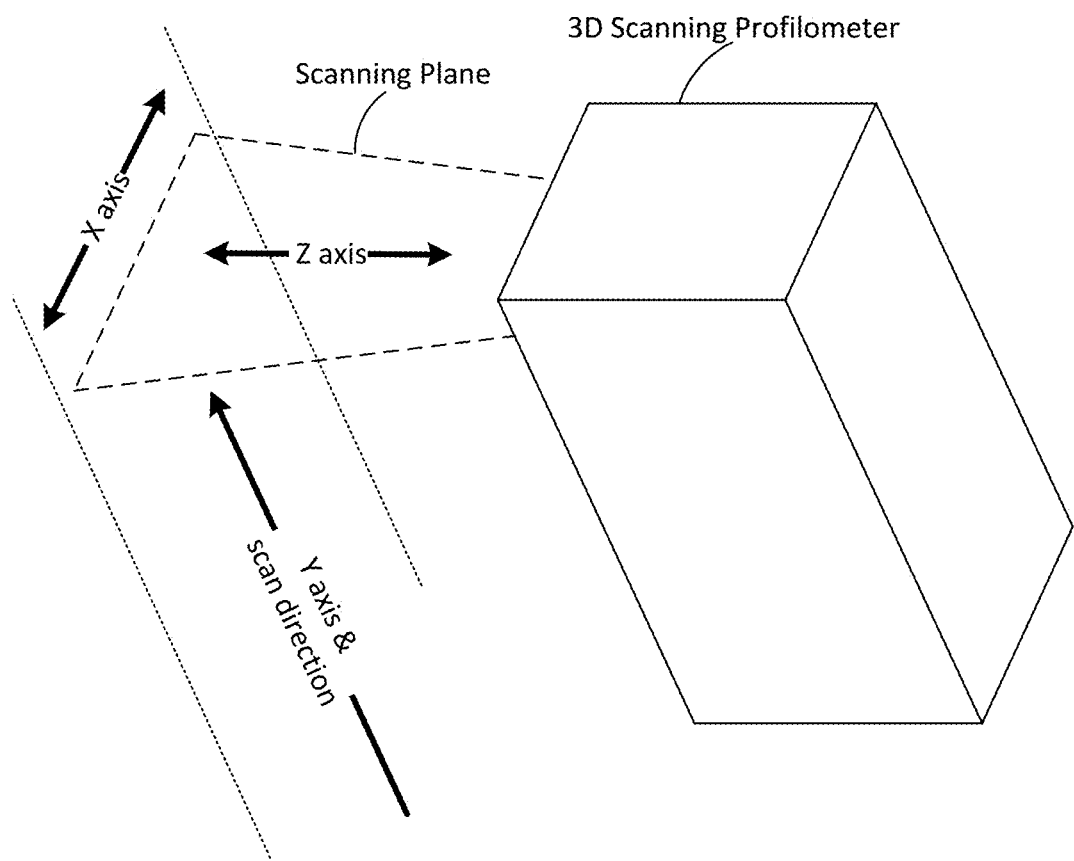
FIG. 7A illustrates a general schematic showing operation of a 3D scanner or scanning profilometer.

FIG. 7A illustrates a general schematic showing operation of a 3D scanner or scanning profilometer. As shown in FIG. 7A, the scanner detects a profile of an object that is passed in a scan direction along a Y axis relative to the scanner. The scanner scans a laser beam generally across an X axis as the object passes through a scanning plane disposed in the X and Z axes. The scanner makes repeated scans across the X axis to detect precise distances from the scanner in the Z axis based on monitored reflections from the laser. The result, through repeated scans as the object is passed along the Y axis through the scanning plane, is a capture of a 3D height, depth, or distance profile of the object relative to the scanner.

Figure 7B:
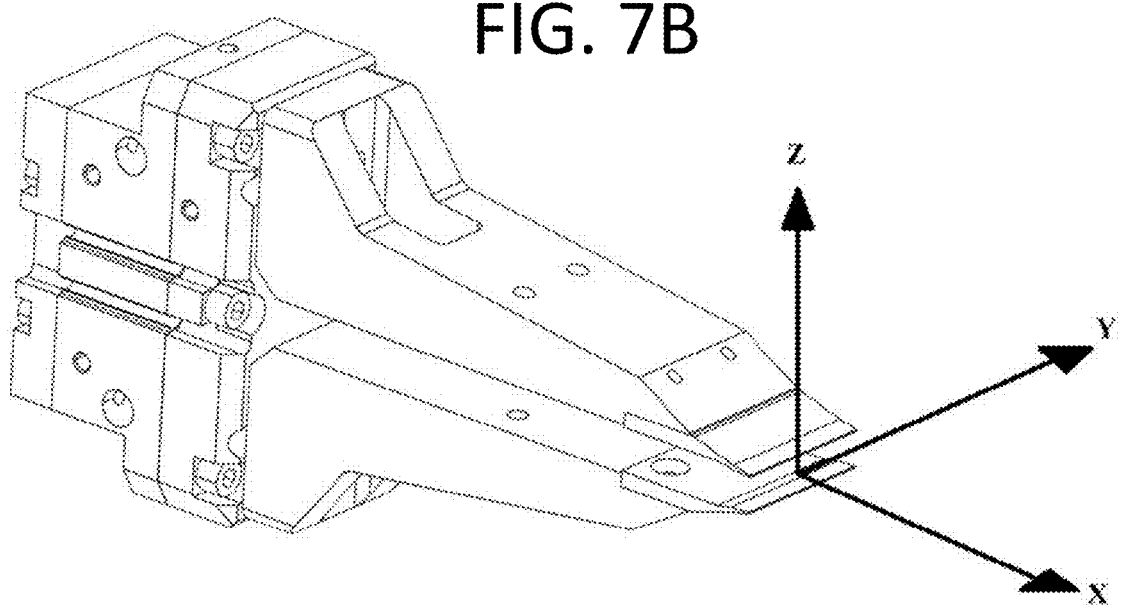
FIG. 7B illustrates a robot arm gripper in accordance with one embodiment in relation to the X, Y and Z axes corresponding to those in the schematic of FIG. 7A.
Figure 7C:
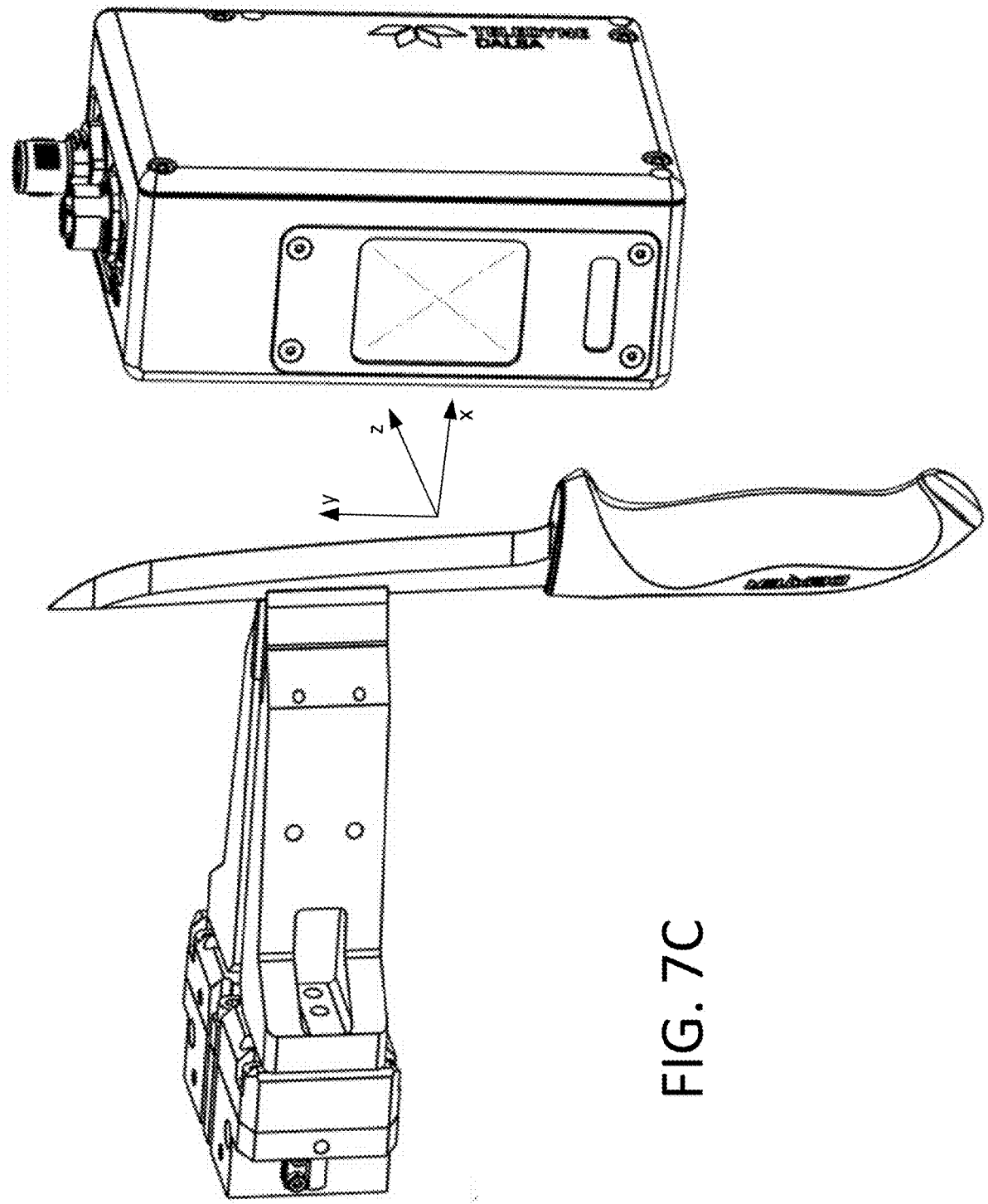
FIG. 7C illustrates the robot arm gripper holding a knife in positional relationship to a scanner during a profilometer scan.

FIG. 7B illustrates a robot arm gripper in accordance with one embodiment in relation to the X, Y and Z axes corresponding to those in the schematic of FIG. 7A. FIG. 7C illustrates the robot arm gripper holding a knife in positional relationship to a scanner during a profilometer scan (a profilometer scanning sequence during which an object is passed through a profilometer's scanning plane). The X, Y and Z axes corresponding to those in the schematic of FIG. 7A are also shown superimposed on the illustration. To capture the 3D profile of the knife blade during a profilometer scan, the robot can move the body of the knife blade aligned in the XY axis plane and upwards in the direction of the positive Y axis. By using two oppositionally disposed scanners, both faces of the knife blade can be captured simultaneously. In one embodiment, a Teledyne Dalsa V2K-0100-B3 scanner is used, which has a Z resolution of 8-14 µm, an X resolution of 50-95 µm and a 97-185 mm field of view along the X axis.

Figure 7D:
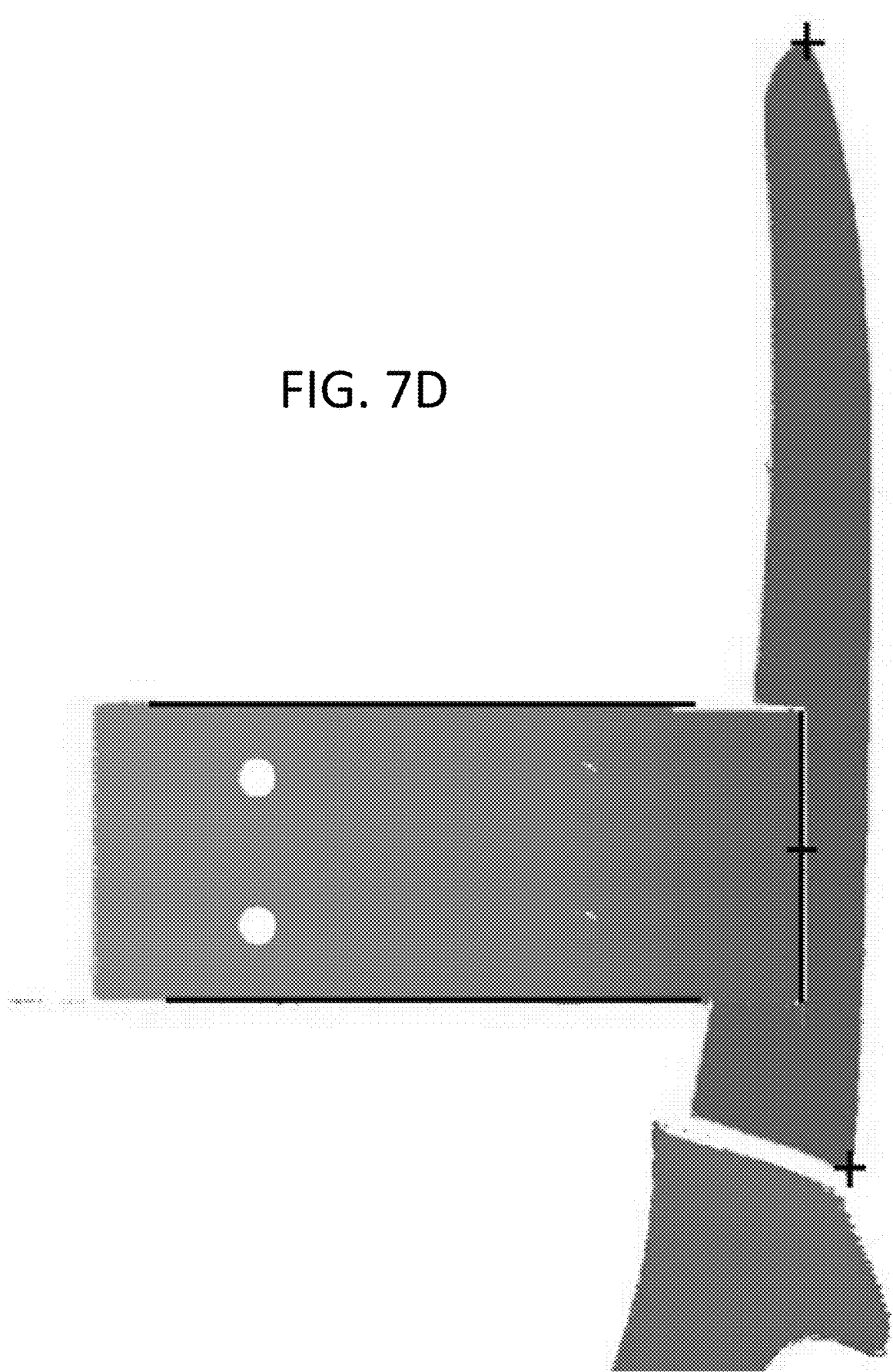
FIG. 7D illustrates an annotated 2D rendering of a 3D map that can be created by software operating and receiving data from a scanning profilometer.

FIG. 7D illustrates an annotated 2D rendering of a 3D map that can be created by software operating and receiving data from a scanning profilometer. In the 2D rendering showing data from one of the scanners, depth is indicated by shades of grey where darker shades indicate increased depth or features that are further away. It will be noted that the shading as illustrated is subtle, but the illustration should show that the left side of the gripper fingers are shaded lighter than the knife blade on the right.

The control system and/or software operating on the control system can be configured to extract and identify various features from a scan. In the map illustrated in FIG. 7D, the software has identified the straight edges of the gripper fingers (in black lines), the outline of the gripper fingers and the blade (in blue lines), a center of the robot end-effector or gripper (a cross at the center tip of the gripper fingers), a first point of the knife blade (a cross where the blade meets the handle) where sharpening will begin, and a last point on the knife blade (a cross at the tip of the knife) where the sharpening will end. An annotated rendering such as the one in FIG. 7D can be displayed on a user interface of the system.

Knife Edge Profiles

The system's robotic arm needs to be controlled by programming and/or logic in order to achieve desired results. In particular, a minimal amount of material should be removed in order to achieve a required sharpness while increasing the useful life of any cutting instrument subjected to a re-sharpening process.

Once an edge profile of a cutting instrument is determined by the vision station or scanning profilometer, the determined edge profile can be extrapolated or offset into the knife body by a predetermined amount to achieve a desired or target profile. The amount of extrapolation can be, for example, a measure, amount, thickness or distance, that in turn can be varied or based on the particular kind or type of cutting instrument being sharpened. The control system can use the target profile to control the robot arm to actuate and engage the cutting tool with each of the processing stations, such as the grinding belt of the grinding station and the polishing wheel of the polishing station. The process of extrapolation of the edge profile of the cutting instrument can change for different types of cutting instruments. The extrapolation can be determined based on straight and curved regions of the cutting instrument. The extrapolation can be determined for any configuration of cutting edge, whether straight or curved, and does not need to be predetermined.

The target edge profile for a knife to be sharpened can include both a new extrapolated profile of the cutting edge of the knife blade as well as angles at which the edge(s) of the blade are to be ground by or at the grinding station and polished by or at the polishing station. The amount of material to be removed (the inward movement of the knife edge into the body) and angles at which the target edge is to be ground can be set through one or more user-configurable parameters. The user-configurable, parameters can be adjusted depending on the desired profile of the knife edge. Different cutting instruments, which can be identified by scanning QR codes on the instruments, can be configured to receive different target profiles, which in turn can be stored in a computer database. Also configurable can be the speed, duration and/or amount of polishing applied to each instrument as it is polished, as well as an amount of polishing compound sprayed onto the polishing wheel during polishing.

In one embodiment, the vision station can identify certain defects in a knife blade that may affect the amount of material that may need to be removed in order to obtain a desired result. If larger defects are present on the blade, or if the edge angles are significantly different from a target profile, then more material can be removed accordingly. If a knife edge is detected to be only minimally out of specification, the target profile can also adjusted accordingly to remove less material. It may the case the a scanned knife edge is detected to be substantially or nearly within specification, in which case a grinding operation can be skipped altogether and a knife may be only polished at the polishing station.

In one embodiment, a new extrapolated edge profile is determined by offsetting the detected edge profile approximately 100 µm, by default, into the body of the knife edge. Adjustments from a default offset can be made depending on analysis of the high-resolution 3D profile scan of the blade. More significant defects or nicks in the blade can indicate an increased offset, while indications of a blade in good condition can indicate a decreased offset.

Robot Calibration and Control

In order for the robot's control system to precisely operate the robot arm to achieve the desired results, the position and orientation (which together are referred to as "pose") of operating feature(s) of the various processing stations need to be known precisely. For example, the control system needs to know the precise pose of: the grinding surface of the grinding station, the polishing surface of the polishing station, and each 3D scanning profilometer in order to obtain a precise result. The system also needs to know, though with less precision, the expected pose of a knife blade to be picked up by the gripper from a magazine or storage carousel, as well as an expected pose of the knife blade when being replaced by the gripper in a magazine or storage carousel.

In accordance with one embodiment, a calibration procedure includes adding or defining one or more 3-dimensional calibration targets proximate to, on, or temporarily grasped by the robot arm gripper. One or more calibration targets can additionally or alternatively be mounted to or on the robot arm. Multiple calibration targets in multiple locations, some of which can be temporarily mounted, and some of which can be permanently mounted can be optionally used to perform and/or maintain calibration.

Figure 8B:
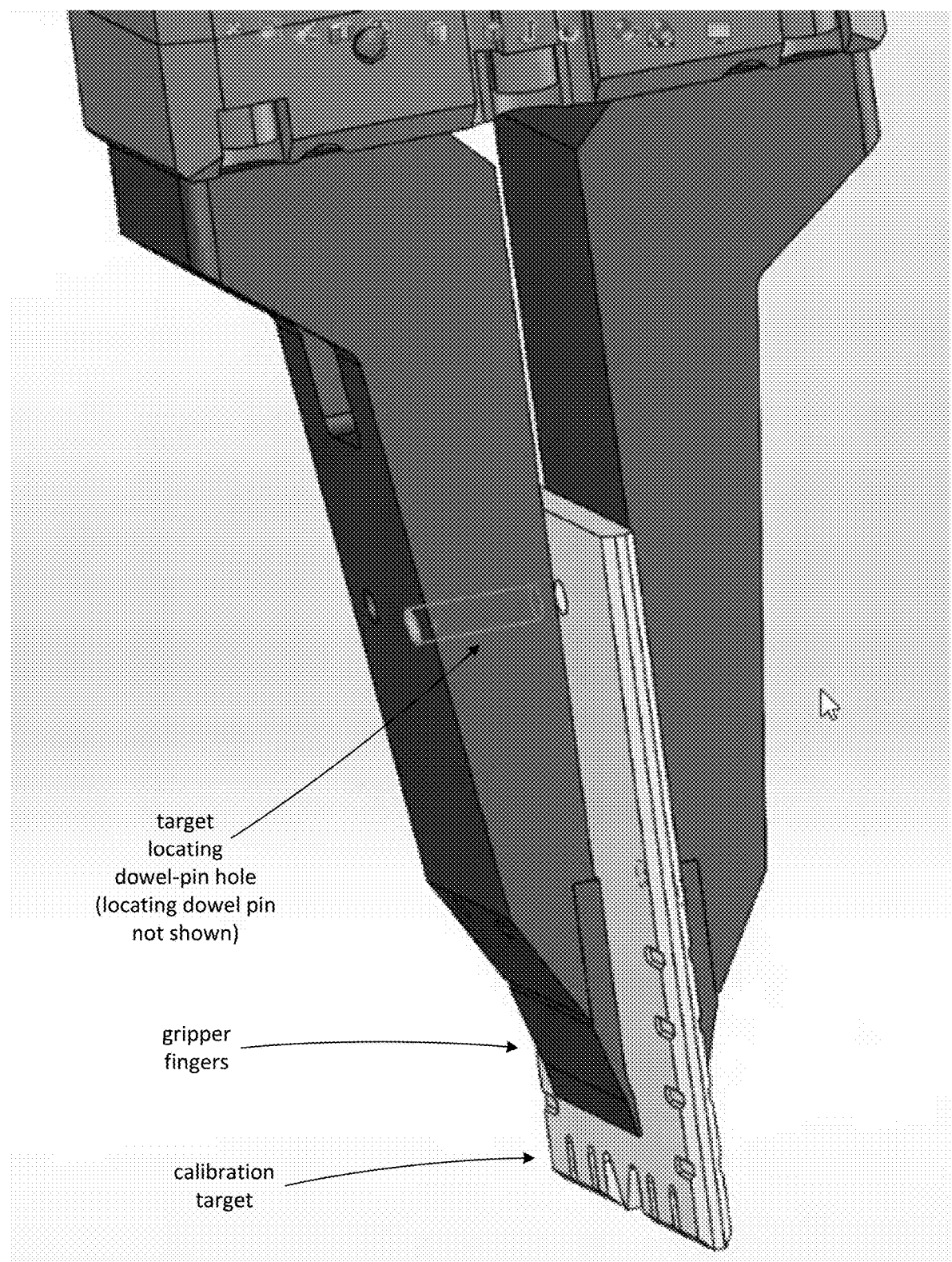
Figure 8C:
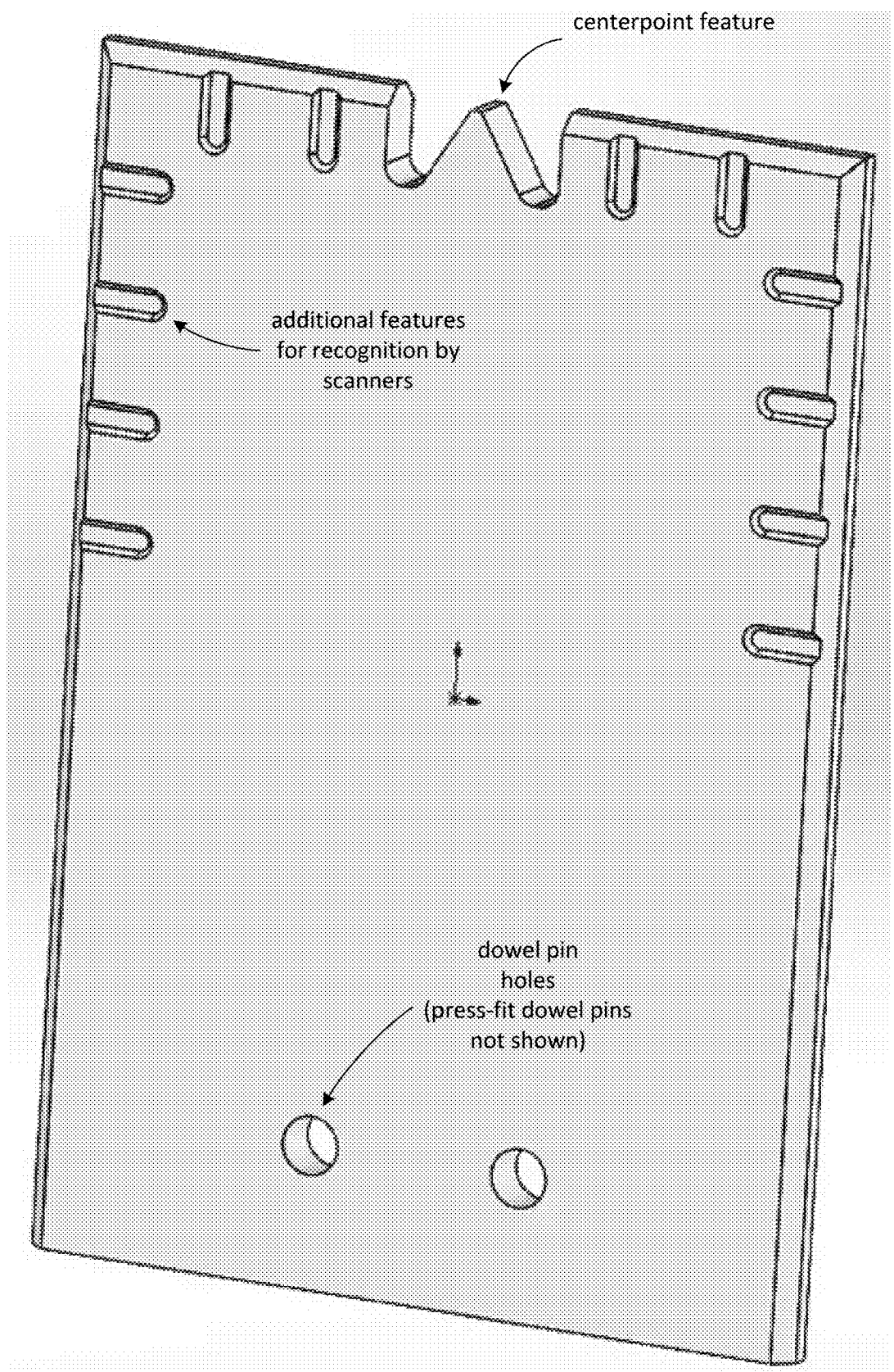

FIGS. 8A-C illustrate a temporary calibration target that can be used during a calibration procedure to calibrate the robot relative to the vision station. Referring to FIG. 8A, the illustrated calibration target can be grasped by the robot arm gripper (also referred to as an end-effector) during a calibration procedure. Referring to FIG. 8B, the target can be precisely positioned in the robot arm gripper by two dowel pins (not shown) that can be press-fit into the target and can extend from one side of the target into locating holes in one the gripper fingers. In order to secure the target, the gripper fingers can be opened, the target's dowel pins can be inserted into the locating holes on one of the gripper fingers, and then the gripper fingers can be closed.

The calibration target(s) can have a predefined, definite, and precise, surface profile that can be scanned by the 3D profilometer(s) in order to determine a precise pose of the target relative to the profilometer(s). Features can be machined into the target to assist in recognition by the 3D scanners. The target can have precision ground surfaces with high flatness, and the features can be precisely cut or formed to improve calibration results. In one embodiment, the calibration target can be scanned by the vision station during a separate calibration pass of the robot arm.

Referring to FIG. 8C, the calibration target can include a precisely defined centerpoint feature that establishes a tool centerpoint for the robotic arm. The centerpoint, in turn, can be scanned and precisely recognized by a 3D scanning profilometer as the robot arm passes the calibration target through the scanning plane during a calibration profilometer scan. The profilometer can be used to determine a precise pose of the tool centerpoint, and this pose can be associated with or related to a registered pose of the robotic arm, according to the robot's controller internal coordinate system, as the calibration target is passed through the profilometer's scanning plane. In this way, the position of the tool centerpoint and/or pose of the calibration target and the scanning profilometer can be established relative to the pose of the robot's end effector or gripper as registered by the robot controller's coordinate system.

The calibration target's tool centerpoint feature can also be used to precisely determine the position, the orientation, or both (the pose) of an operating feature of each of the workstations with which the robot interacts while performing its task. For example, as noted above, the control system needs to know the precise pose of the grinding surface of the grinding station in order to be able to articulate the trajectory of a knife blade across the grinding surface so as to remove a desired amount of material.

Using known techniques, a human operator can manually control the robot arm to bring the centerpoint feature of the calibration target into contact with a feature of an object in order to determine the location of that object within the robot controller's coordinate system. In one embodiment, using a known technique referred to as the "3 point teach method" described by ABB in their user manual, a tool centerpoint is used to approach and physically touch a feature from 3 separate axes. When contact is made, the position of the robot arm can be recorded or registered and then associated with the location of the object's feature.

In some cases, it may not be possible to have the centerpoint touch the actual operating feature of a processing station (e.g. an expected location of a knife blade when the knife is in a magazine), in which case one or more other static points on a workstation can be located and then offset using otherwise known or measured vectors to locate the feature point on the workstation where processing occurs. A pose of a feature can similarly be determined by locating multiple points on the feature.

FIG. 8A also shows a laser distance sensor that can be temporarily mounted on the robot arm and used to measure distances from the robot arm, in various positions. The relative location of the laser distance sensor to the robot arm centerpoint can be measured and then entered into the control system. The robot arm can then be oriented to point the laser distance sensor at various components of the system, e.g. the grinder wheel, to determine their relative locations to the robot arm when the robot arm is in various positions.

As noted above, the position, and optionally the pose, of each operating feature of each workstation can be determined based on a registered pose of the robot arm within the robot controller's coordinate system. The position and pose of the robot arm can also be registered during the calibration profilometer scan of the calibration target. The profile scan data from the profilometer scan of the calibration target and the registered pose(s) of the robot arm during the calibration scan as well as during the touching of the centerpoint feature of the calibration target to the operating features can be combined to determine the relative positions and optionally poses of the profilometer and of each of the operating features of the workstations within the robot's coordinate system.

In one embodiment, a temporary calibration target as well as one or more permanent targets are attached to or defined by the robot arm and/or its gripper and scanned during a calibration procedure. During the calibration procedure, the scanning profilometer can scan both the temporary target as well as the one or more permanent targets relative to each other during a single scan. Once the calibration procedure has been completed, which can include determining positions and poses of the profilometer and the operating features of various workstations, the temporary target can be removed and then the permanent targets can be used by the profilometer(s) to locate the robot arm gripper(s) during a scan of a knife blade edge. The permanent targets can be positioned in a location that will be scanned in conjunction and simultaneously with each scan of a knife edge to determine the edge profile.

Referring again to FIG. 7D, in one embodiment, the lateral and distal straight edges of each gripper finger (shown by dark black lines) are defined to be permanent targets that are scanned on each profilometer scan while scanning a knife blade. These edges are precisely located and then can be used, in turn, to determine the pose of the robot arm gripper fingers as well as the knife edge profile relative to the edges of the gripper fingers. Based on the simultaneous scan of the temporary and permanents targets during the calibration procedure, their relative poses can be used with the registration data determined from the poses of the various operating features relative to the temporary target to calculate a proper trajectory of the robot arm to achieve the desired target edge profile.

Figure 9B:
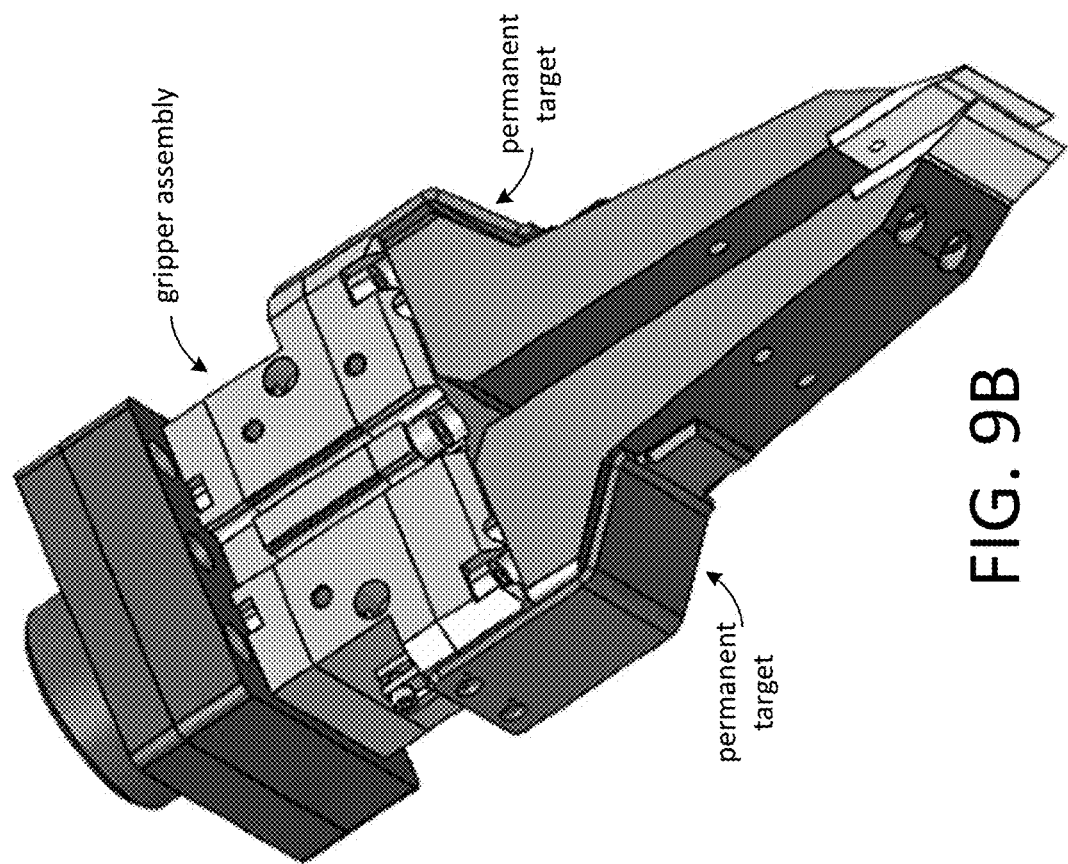
FIGS. 9A-B illustrate an embodiment where a separate and permanent fixed position target is attached to each of two opposite sides of a base of a gripper assembly.
Figure 9A:
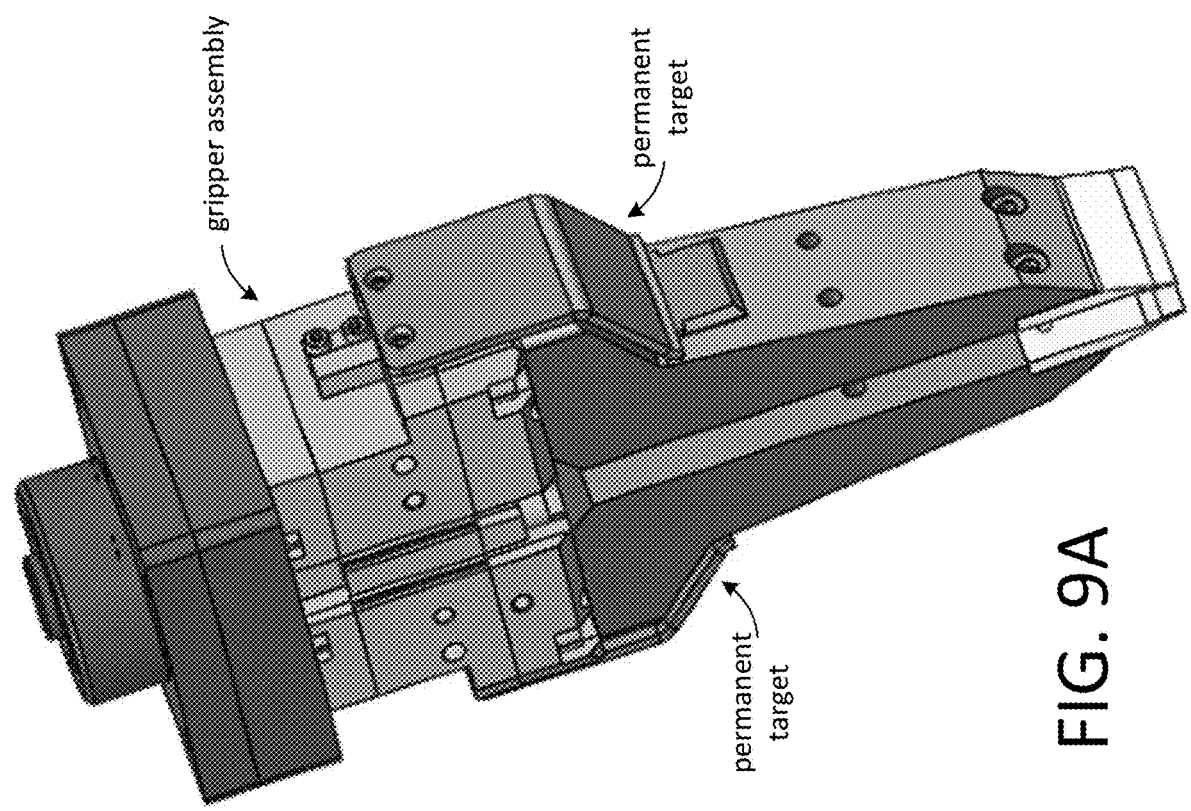

FIGS. 9A-B illustrate an embodiment where instead of using the straight edges of the gripper fingers as the permanent targets, a separate and permanent fixed position target is attached to each of two opposite sides of a base of a gripper assembly that includes the gripper fingers. As opposed to the gripper fingers, which necessarily move in relation to the base and robot arm in order to perform their function, the separate permanent targets can be fixed relative to the base and robot arm. Since the separate targets do not move, a potential source of variability in their position relative to the robot arm is eliminated, and a more accurate result can be obtained when the scanning profilometer is scanning the targets to determine relative positions and poses between the targets and the knife edge profile.

Figure 10B:
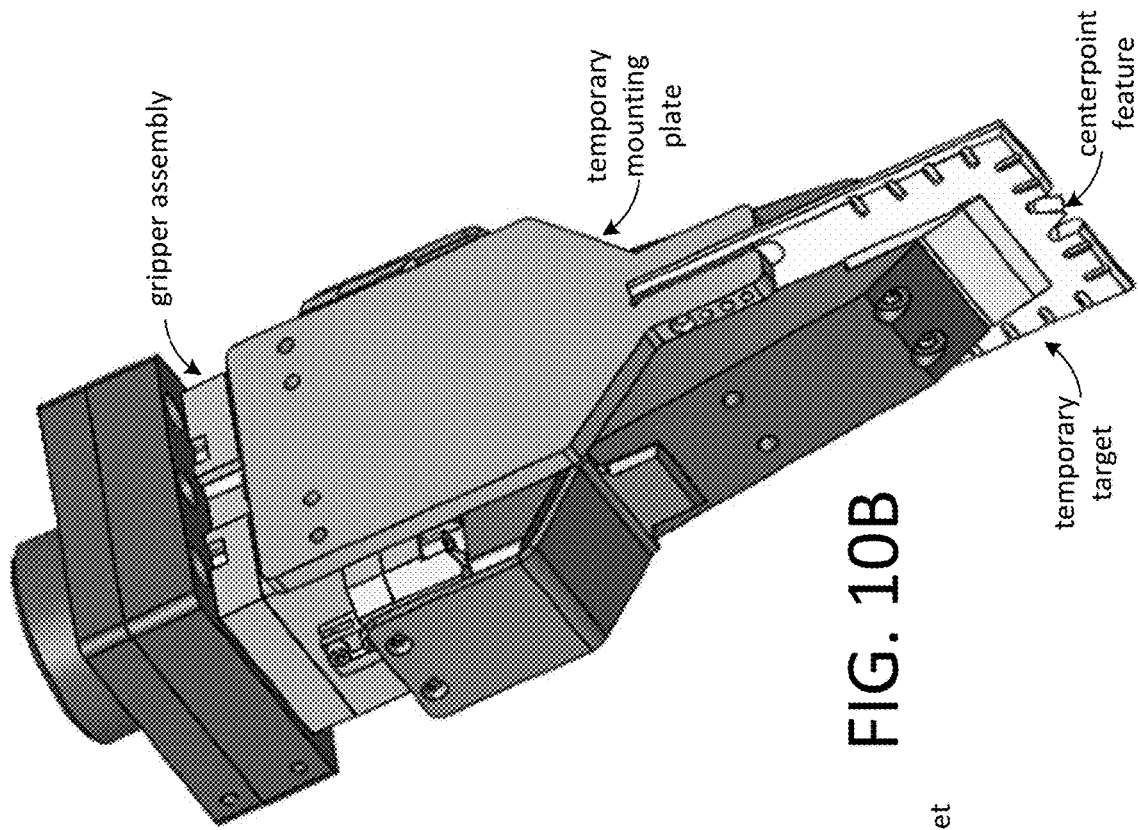
FIGS. 10A-B illustrate an embodiment where a temporary calibration target is temporarily secured to the base of the gripper assembly using a temporary mounting plate.
Figure 10A:
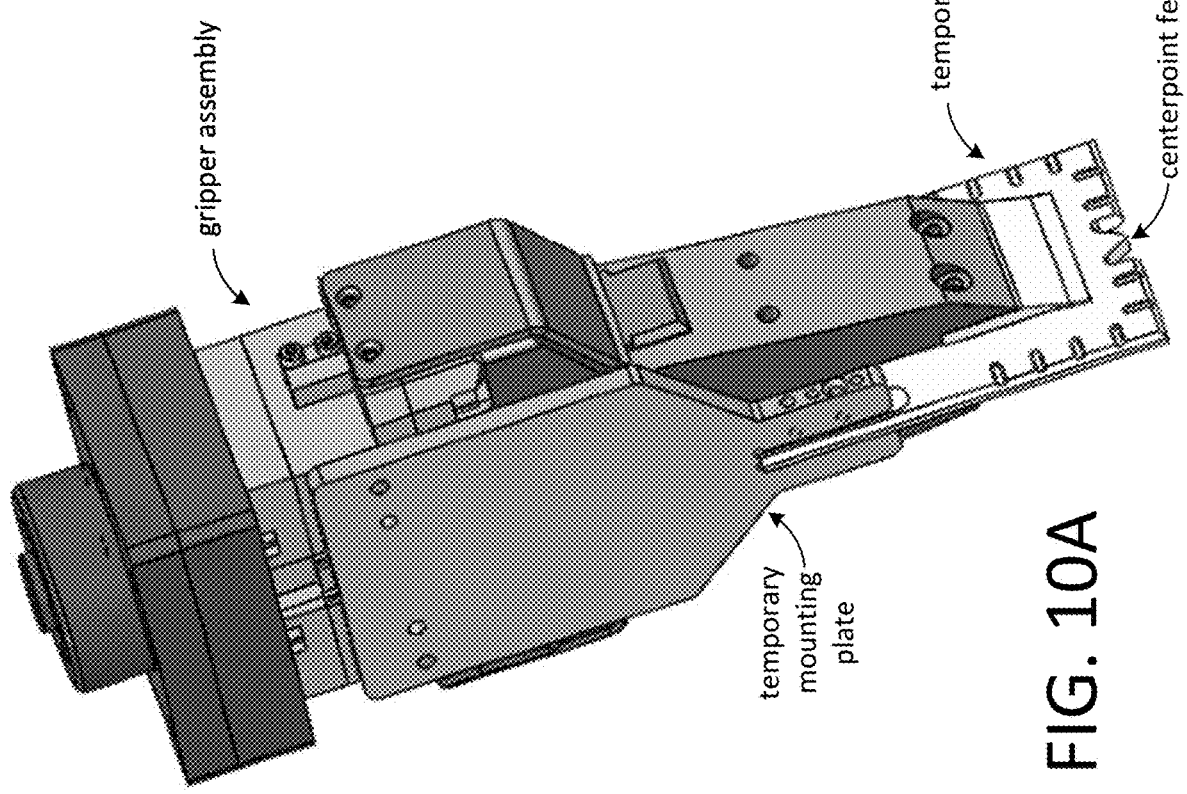

FIGS. 10A-B illustrate yet another embodiment where the temporary calibration target is temporarily secured to the base of the gripper assembly using a temporary mounting plate during the calibration procedure. Securing the temporary calibration target using a mounting plate avoids possible variations in position of the target that could be introduced by having the target grasped by the gripper fingers themselves during a calibration procedure. Once the calibration procedure, which can include locating various operating features of workstations with the target's centerpoint feature has been completed, the temporary mounting plate and target can be removed.

In one embodiment, not illustrated, a single calibration target can be permanently mounted to the robot arm proximate, but separately from the robot's end effector gripper mechanism. The target can be mounted in a location where it can be scanned along with and simultaneously with the profilometer scan of each knife blade. By mounting the calibration target permanently and scanning it along with the knife blade, the precise profile of the knife blade can be determined simultaneously and relative to the calibration target. The single calibration target can also include a calibration point or centerpoint that can be used to using the 3 point teach method referenced above to locate the various operating features of the various workstations. This embodiment also avoids variations in the positioning of the robot's gripper fingers when used as permanent targets, since the gripper fingers positions may drift over time as well as between the process of holding a temporary calibration target and then subsequently holding a knife blade.

Over time, the calibration of the robot's arm, which depends on sensors and servo motors, can drift enough that it will adversely affect sharpening results. In one embodiment, a knife can be scanned by the vision station after it has been ground, polished, or both, and the results analyzed to determine whether the robot is or has remained properly aligned relative to the grinder, the polisher or both. If sufficient resolution scanners are used, the control system can be configured to automatically recalibrate the monitored locations of the stations and/or adjust the trajectories used with respect to the stations based on analysis of the post-operation scan results.

General Method of Controlling a Robot Arm

Figure 11:
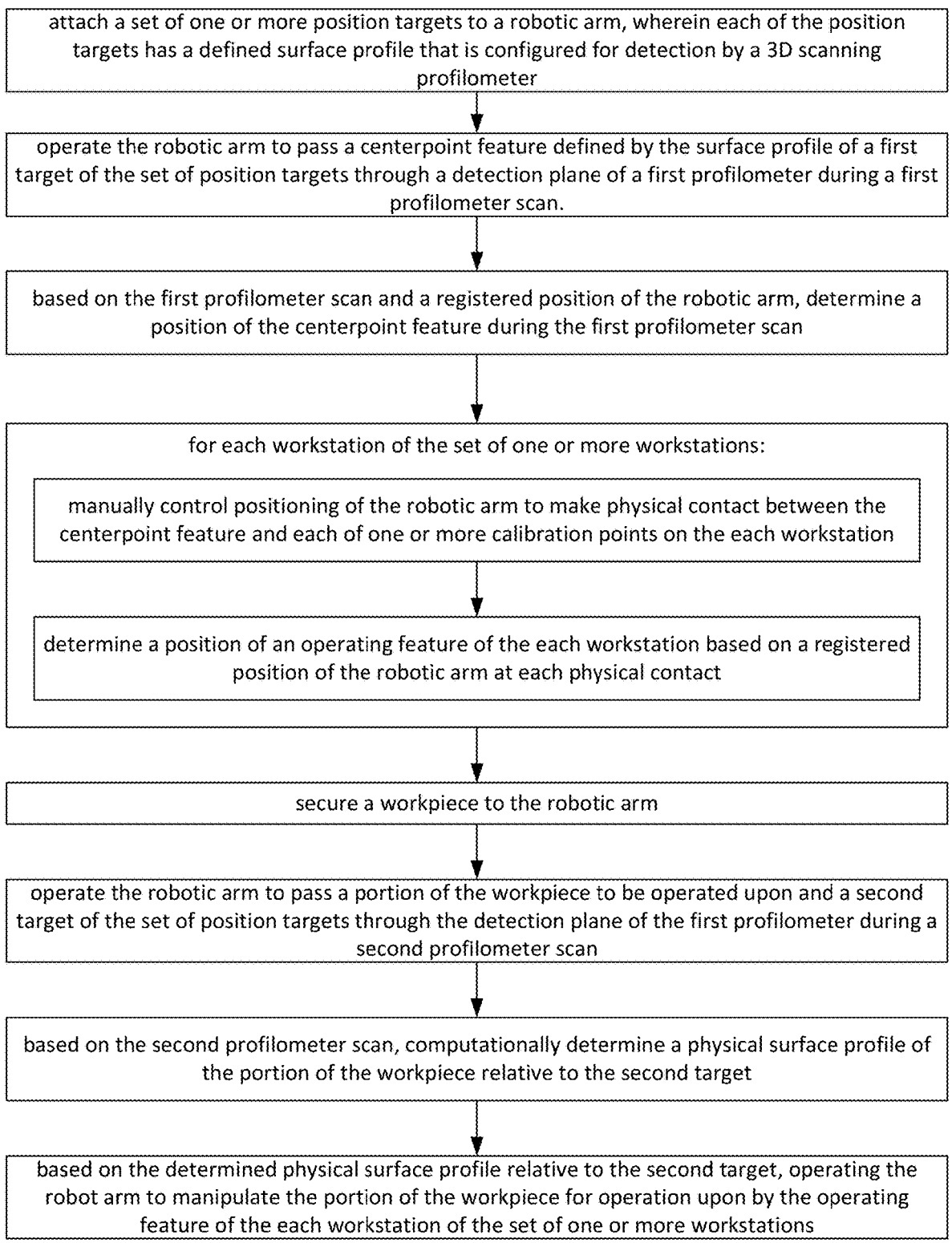
FIG. 11 illustrates a general method, in accordance with one embodiment, of operating a computer-controlled industrial robotic arm to perform operations by a set of one or more workstations upon a workpiece.

FIG. 11 illustrates a general method, in accordance with one embodiment, of operating a computer-controlled industrial robotic arm to perform operations by a set of one or more workstations upon a workpiece. The method can be performed by a system including the computer-controlled industrial robotic arm and the set of one or more workstations, and computer code configured to cause the system to perform the method can be stored on a non-transitory computer storage medium.

The methods described herein could, in addition to being used to sharpen knives, be used to perform operations on workpieces other than knives. Other types of workpieces may require the physical profile of a workpiece to be precisely determined before precision operations are performed on the workpiece. By way of example, similar techniques could be used to sharpen other types of blades or cutting instruments, such as ice skate blades or circular saw blades. The techniques could be used, for example to perform operations on jewelry or other small objects that require precision. More generally, a single robot can be controlled to consolidate and perform multiple different precision machining processes, such as milling, grinding, cutting and drilling. By way of example, a roughly extruded 3D printed part can be manipulated by a robot through multiple downstream precision processes, such as machining, grinding and polishing to create a precision 3d printed part.

Computer Implementation

The above-referenced control system that controls the robotic arm and which can also be configured to control all other aspects of the system, such as the grinding station, the polishing station, the compound sprayer, and the magazine carousels, can be implemented using one or more computer systems. Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 12:
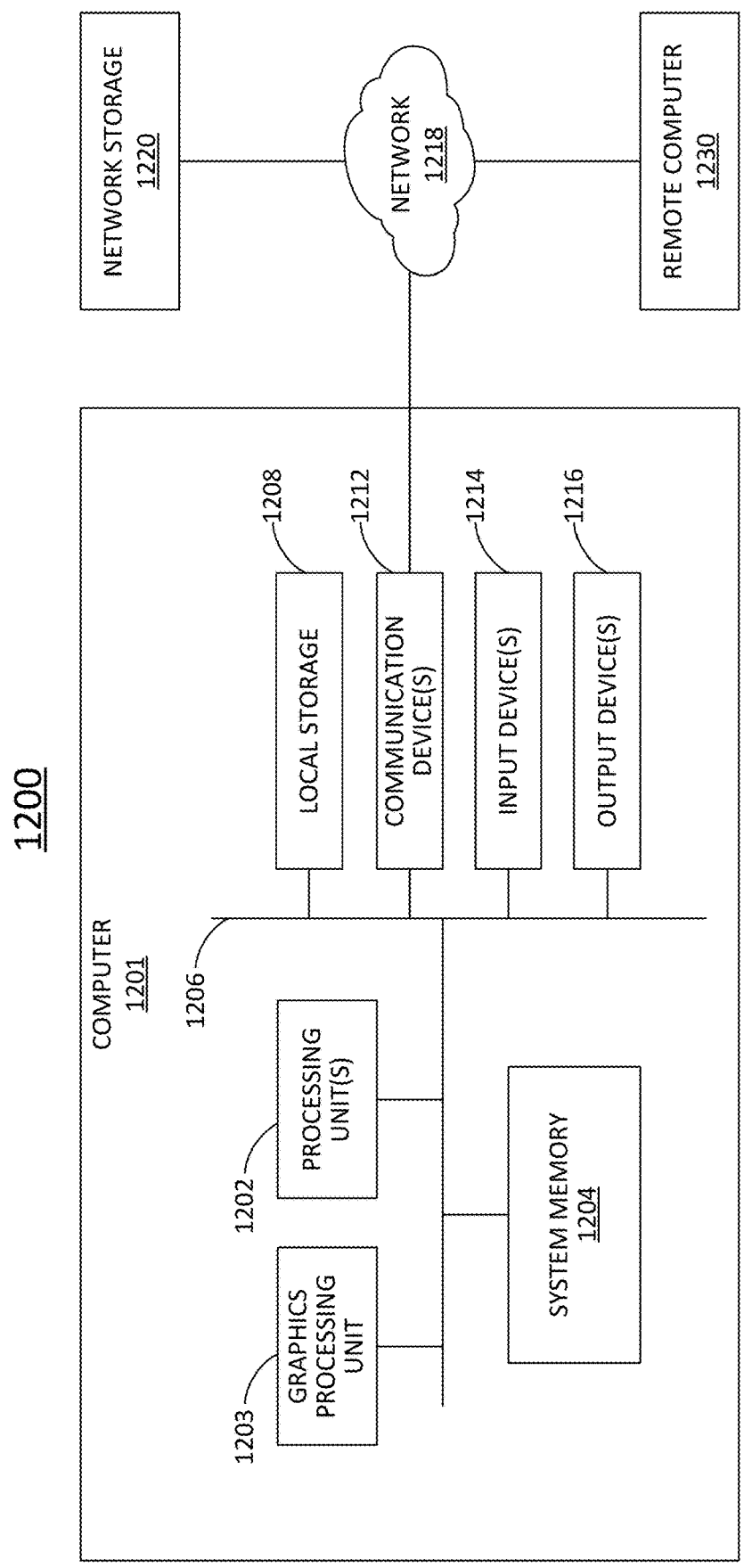
FIG. 12 illustrates a general computer architecture that can be appropriately configured to implement components disclosed in accordance with various embodiments.

FIG. 12 illustrates a general computer architecture 1200 that can be appropriately configured to implement components disclosed in accordance with various embodiments. The computing architecture 1200 can include various common computing elements, such as a computer 1201, a network 1218, and one or more remote computers 1230. The embodiments disclosed herein, however, are not limited to implementation by the general computing architecture 1200.

Referring to FIG. 12, the computer 1201 can be any of a variety of general purpose computers such as, for example, a server, a desktop computer, a laptop computer, a tablet computer or a mobile computing device. The computer 1201 can include a processing unit 1202, a system memory 1204 and a system bus 1206.

The processing unit 1202 can be or include one or more of any of various commercially available computer processors, which can each include one or more processing cores that can operate independently of each other. Additional co-processing units, such as a graphics processing unit 1203, also can be present in the computer.

The system memory 1204 can include volatile devices, such as dynamic random access memory (DRAM) or other random access memory devices. The system memory 1204 can also or alternatively include non-volatile devices, such as a read-only memory or flash memory.

The computer 1201 can include local non-volatile secondary storage 1208 such as a disk drive, solid state disk, or removable memory card. The local storage 1208 can include one or more removable and/or non-removable storage units. The local storage 1208 can be used to store an operating system that initiates and manages various applications that execute on the computer. The local storage 1208 can also be used to store special purpose software configured to implement the components of the embodiments disclosed herein and that can be executed as one or more applications under the operating system.

The computer 1201 can also include communication device(s) 1212 through which the computer communicates with other devices, such as one or more remote computers 1230, over wired and/or wireless computer networks 1218. Communications device(s) 1212 can include, for example, a network interface for communicating data over a wired computer network. The communication device(s) 1212 can include, for example, one or more radio transmitters for communications over Wi-Fi, Bluetooth, and/or mobile telephone networks.

The computer 1201 can also access network storage 1220 through the computer network 1218. The network storage can include, for example, a network attached storage device located on a local network, or cloud-based storage hosted at one or more remote data centers. The operating system and/or special purpose software can alternatively be stored in the network storage 1220.

The computer 1201 can have various input device(s) 1214 such as a keyboard, mouse, touchscreen, camera, microphone, accelerometer, thermometer, magnetometer, or any other sensor. Output device(s) 1216 such as a display, speakers, printer, or eccentric rotating mass vibration motor can also be included.

The various storage 1208, communication device(s) 1212, output devices 1216 and input devices 1214 can be integrated within a housing of the computer, or can be connected through various input/output interface devices on the computer, in which case the reference numbers 1208, 1212, 1214 and 1216 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

Additional Embodiments

Figure 13A:
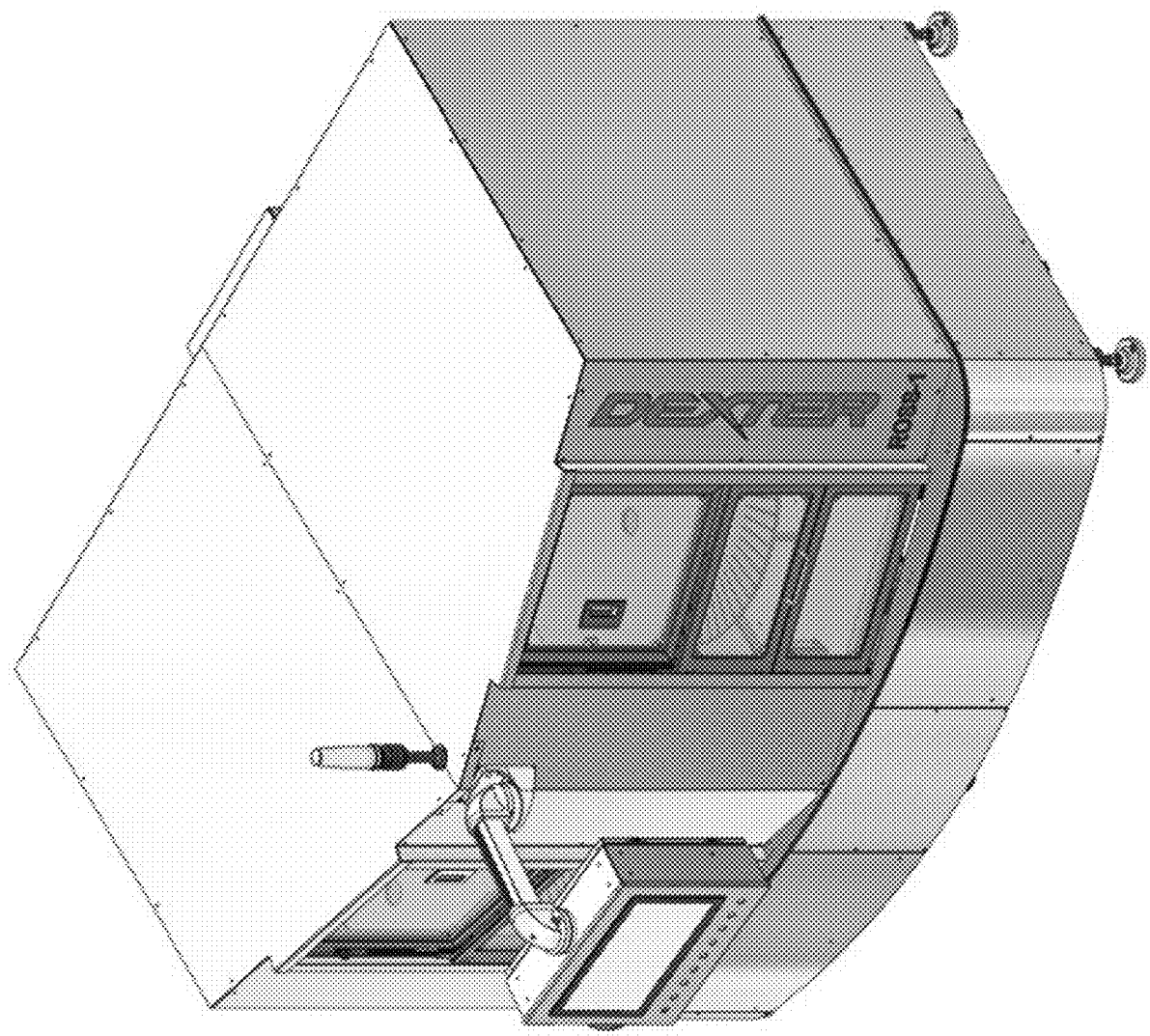
Figure 13B:
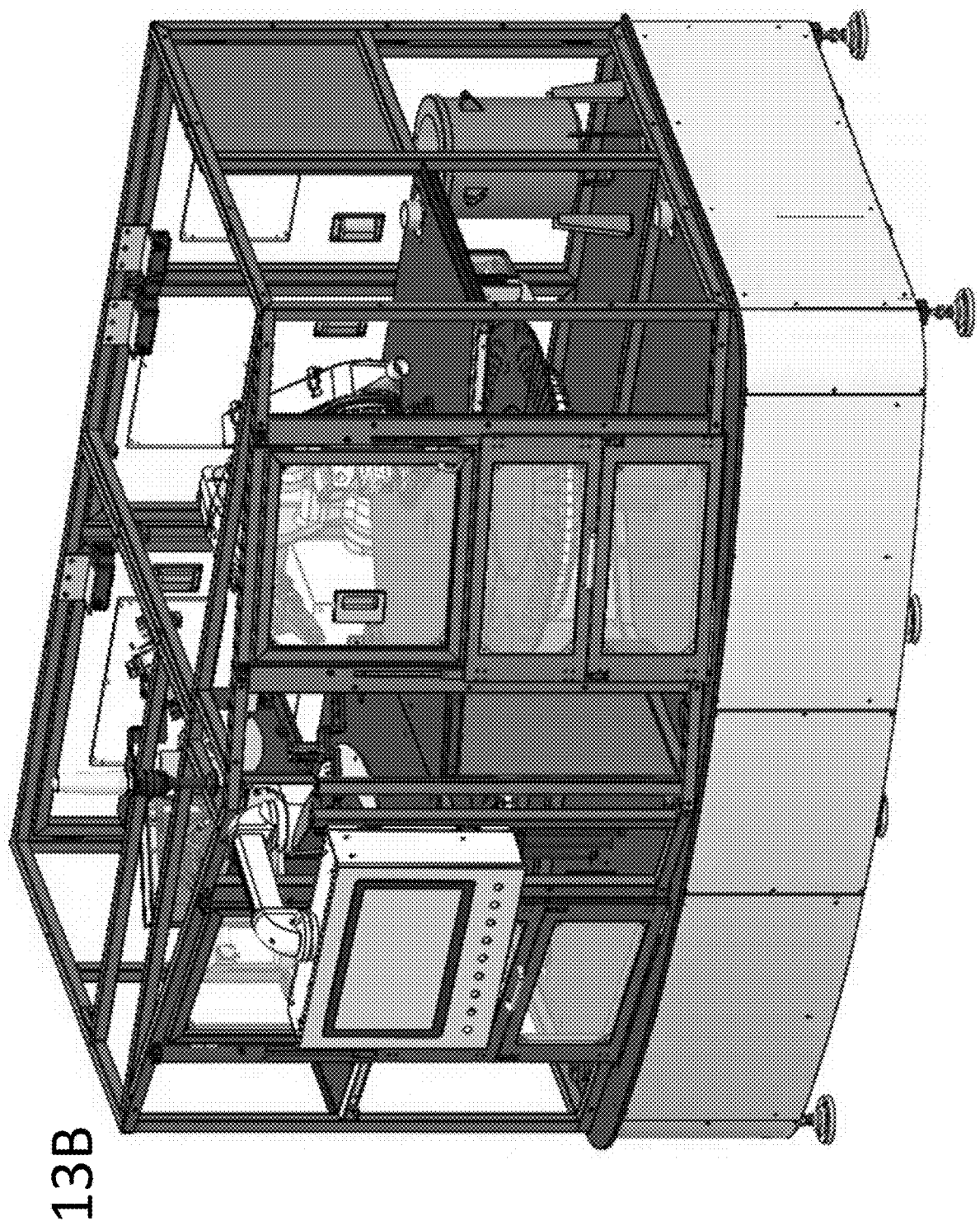
Figure 13C:
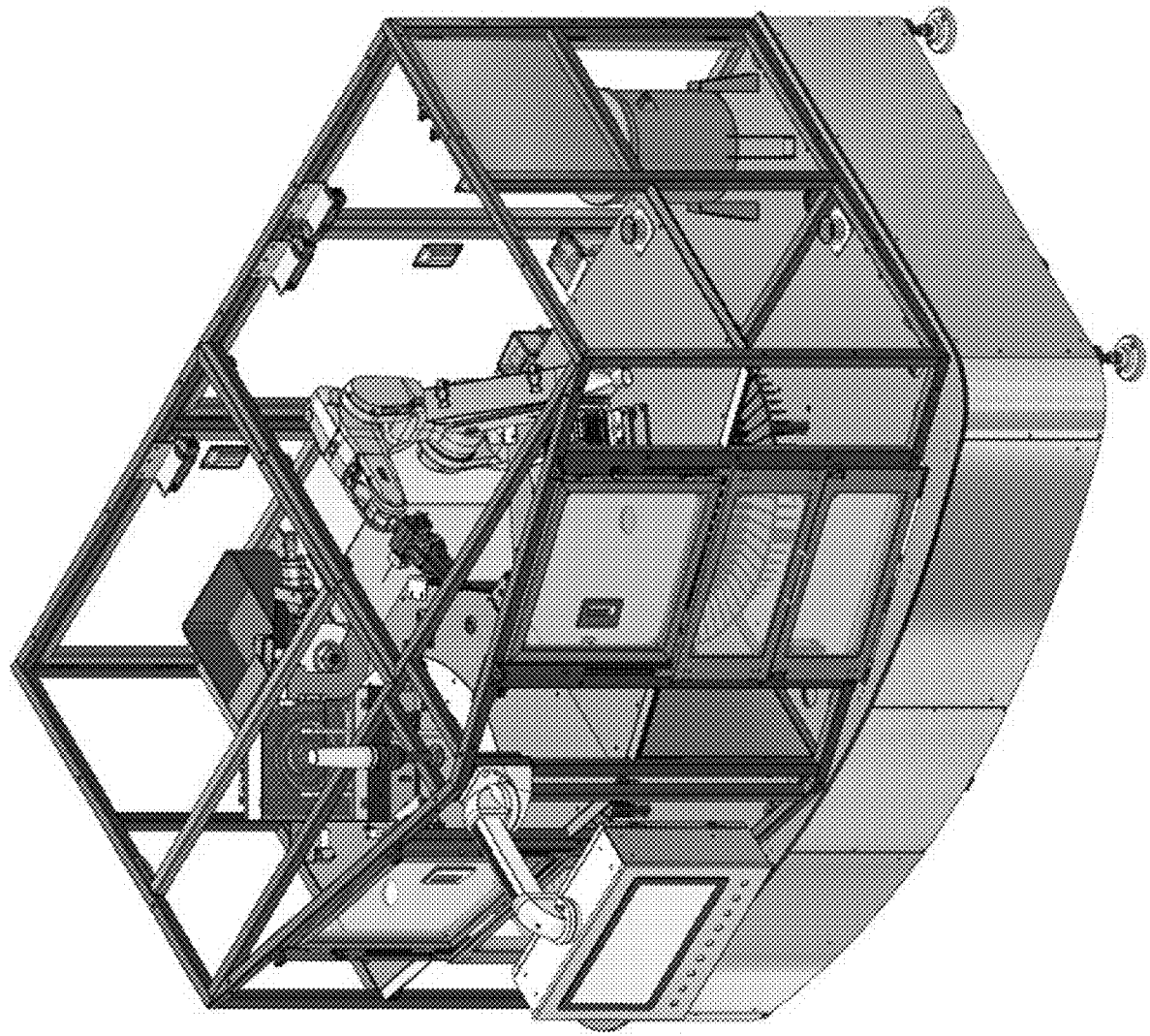
Figure 13D:
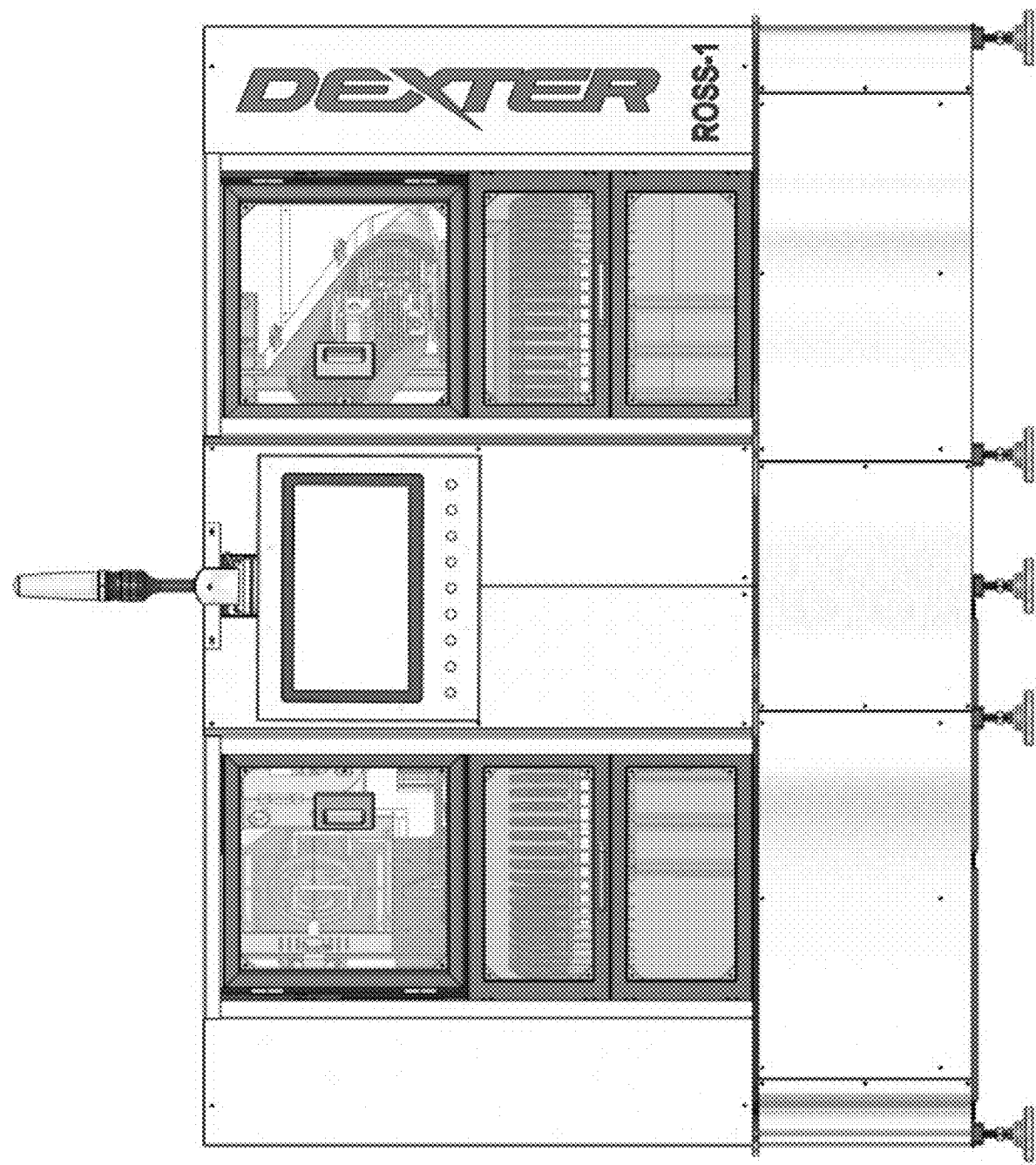
Figure 13E:
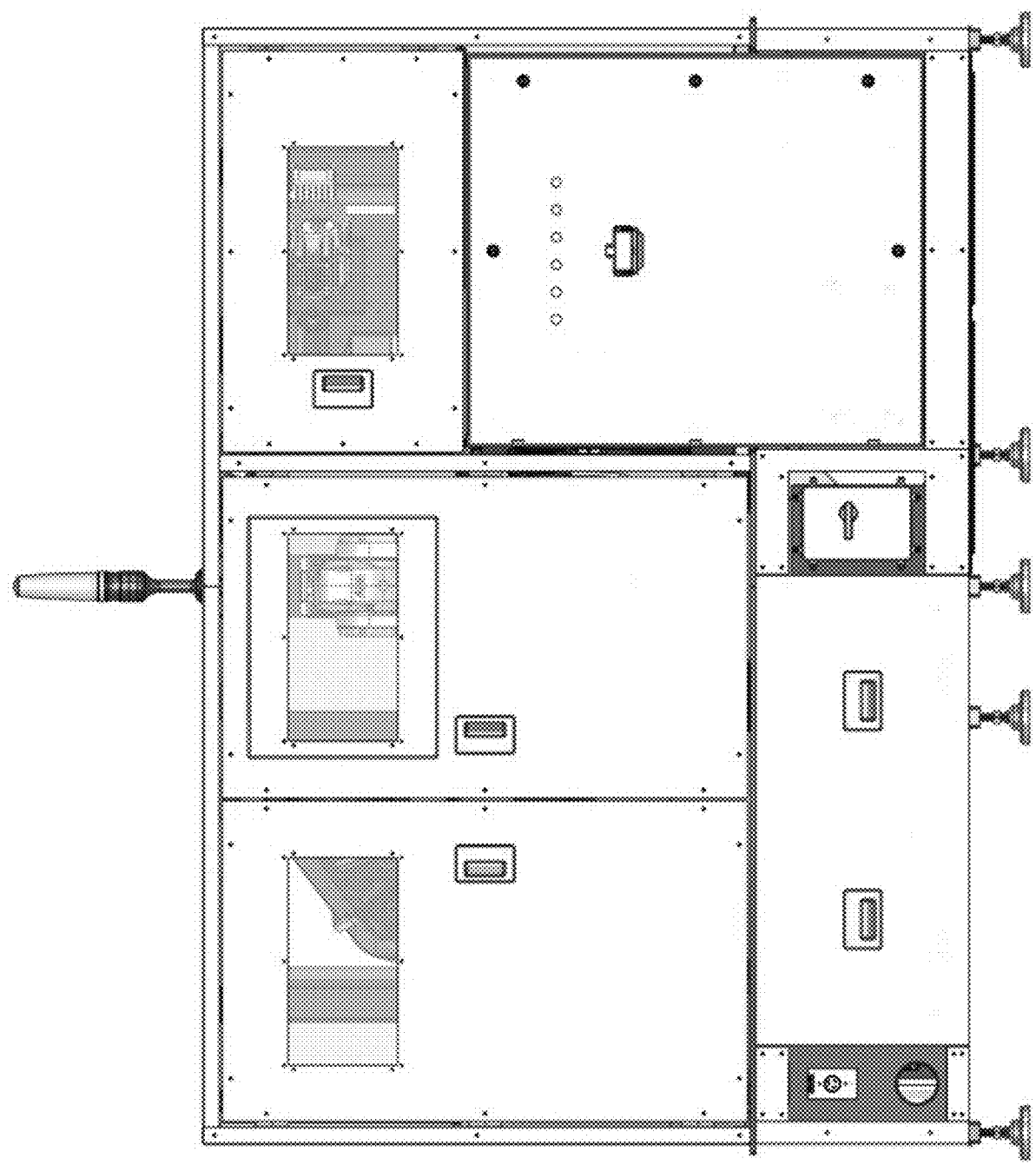
Figure 13F:
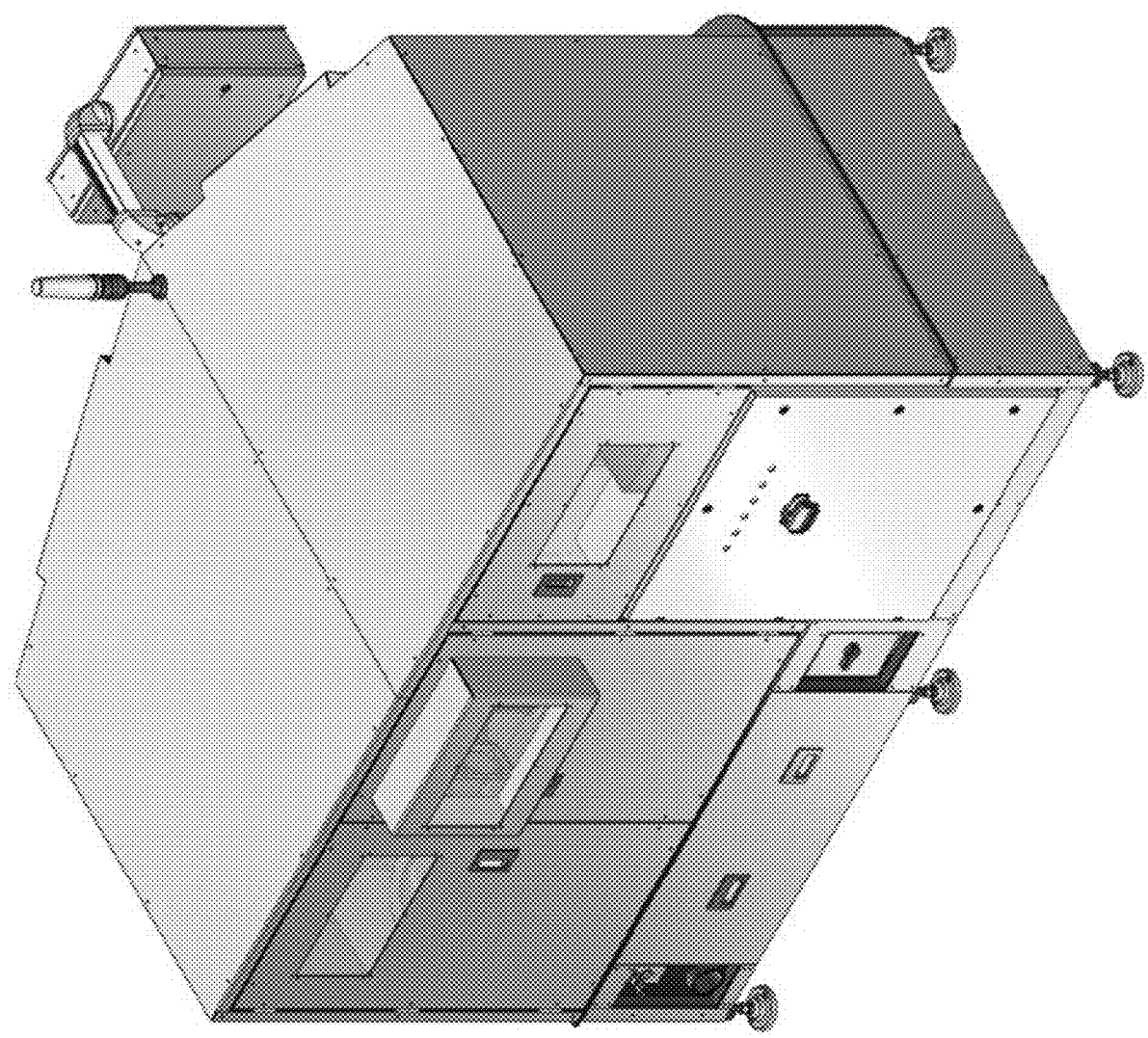
Figure 13G:
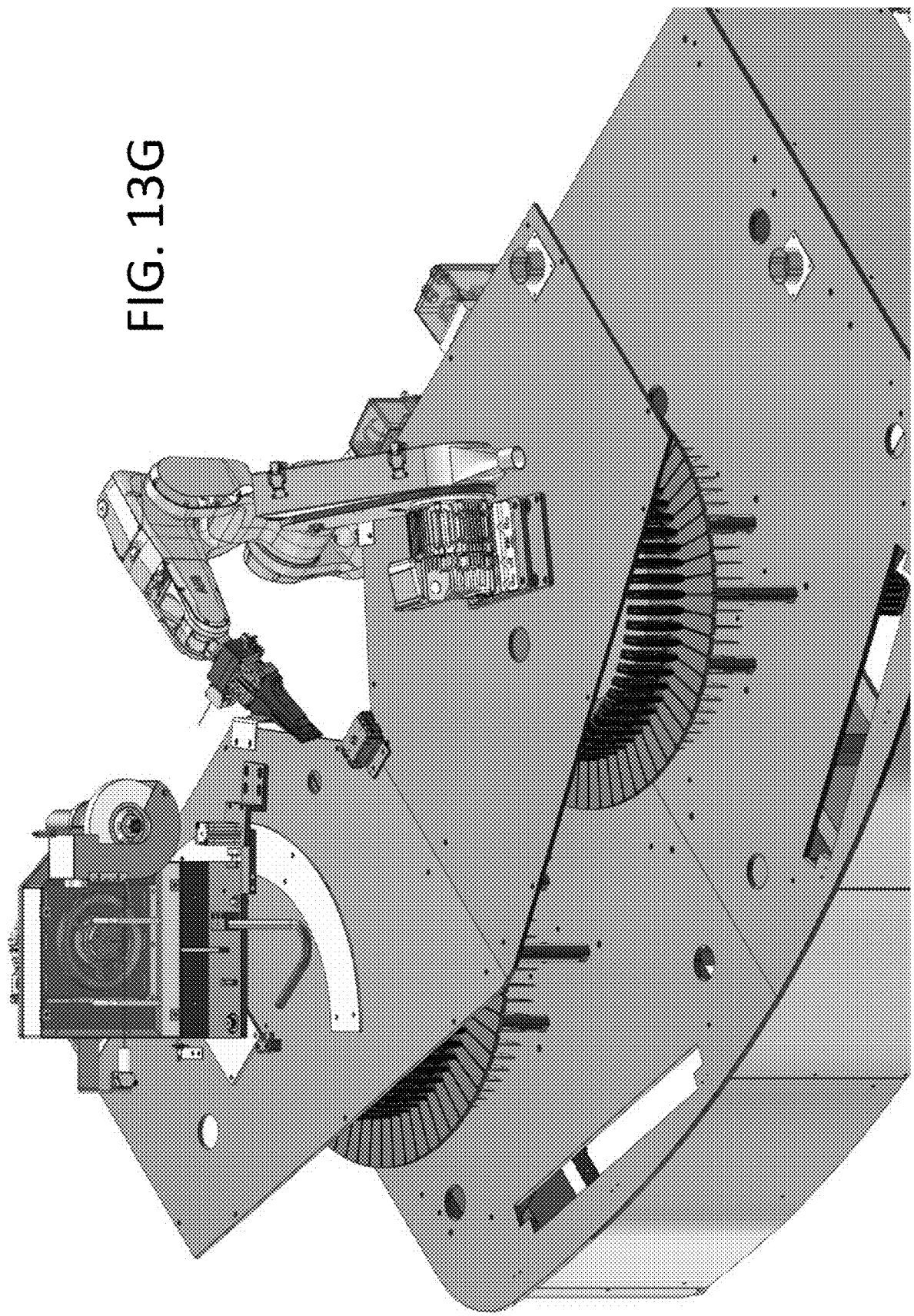
Figure 13I:
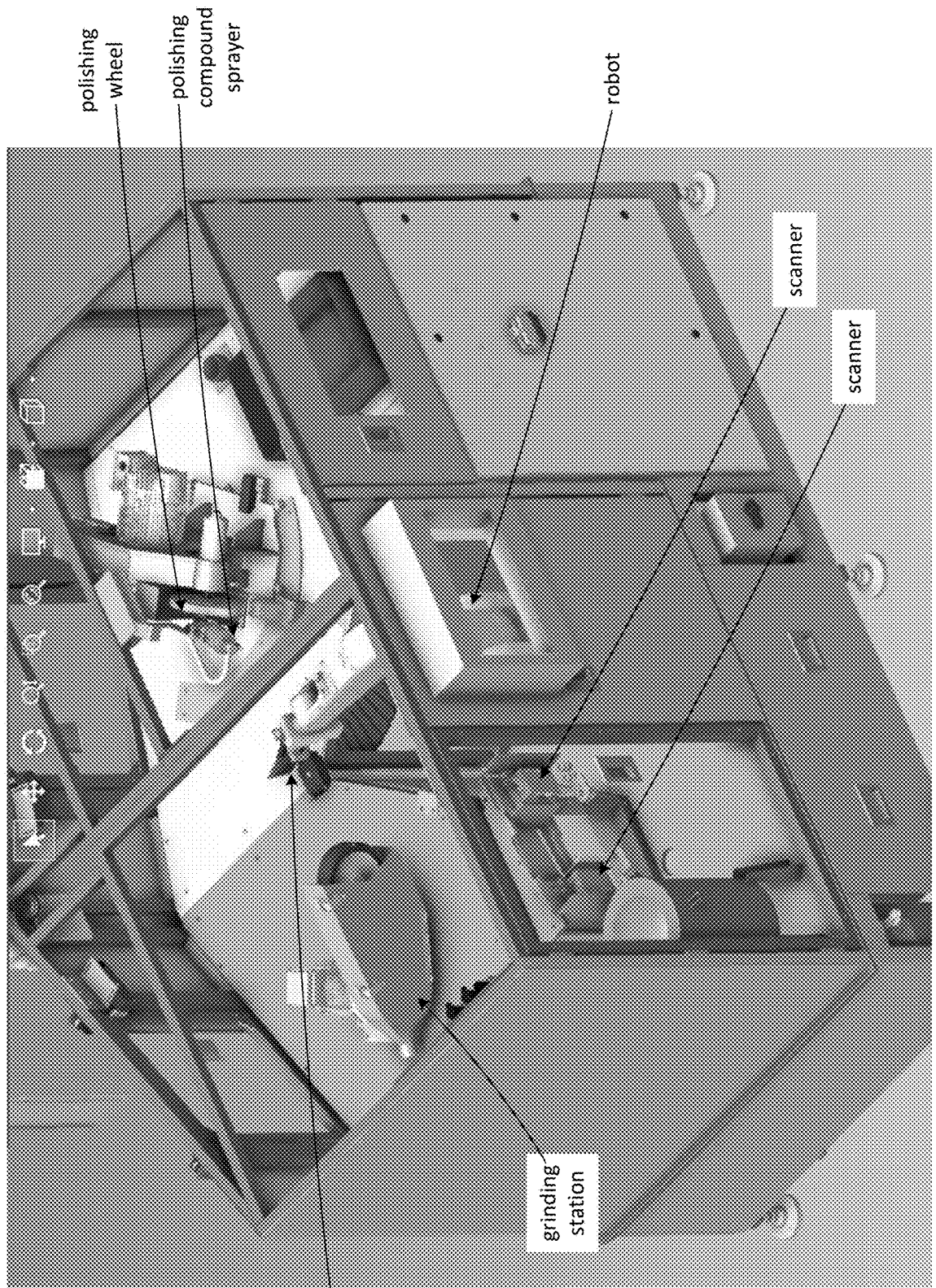

FIGS. 13A-I illustrate computer rendered views of a system in accordance with one embodiment in additional detail. The views include perspective, elevation and subassembly views. FIG. 13I illustrates a partial perspective view of the system with certain components hidden in order to better show locations of other various components as indicated.

Figure 14A:
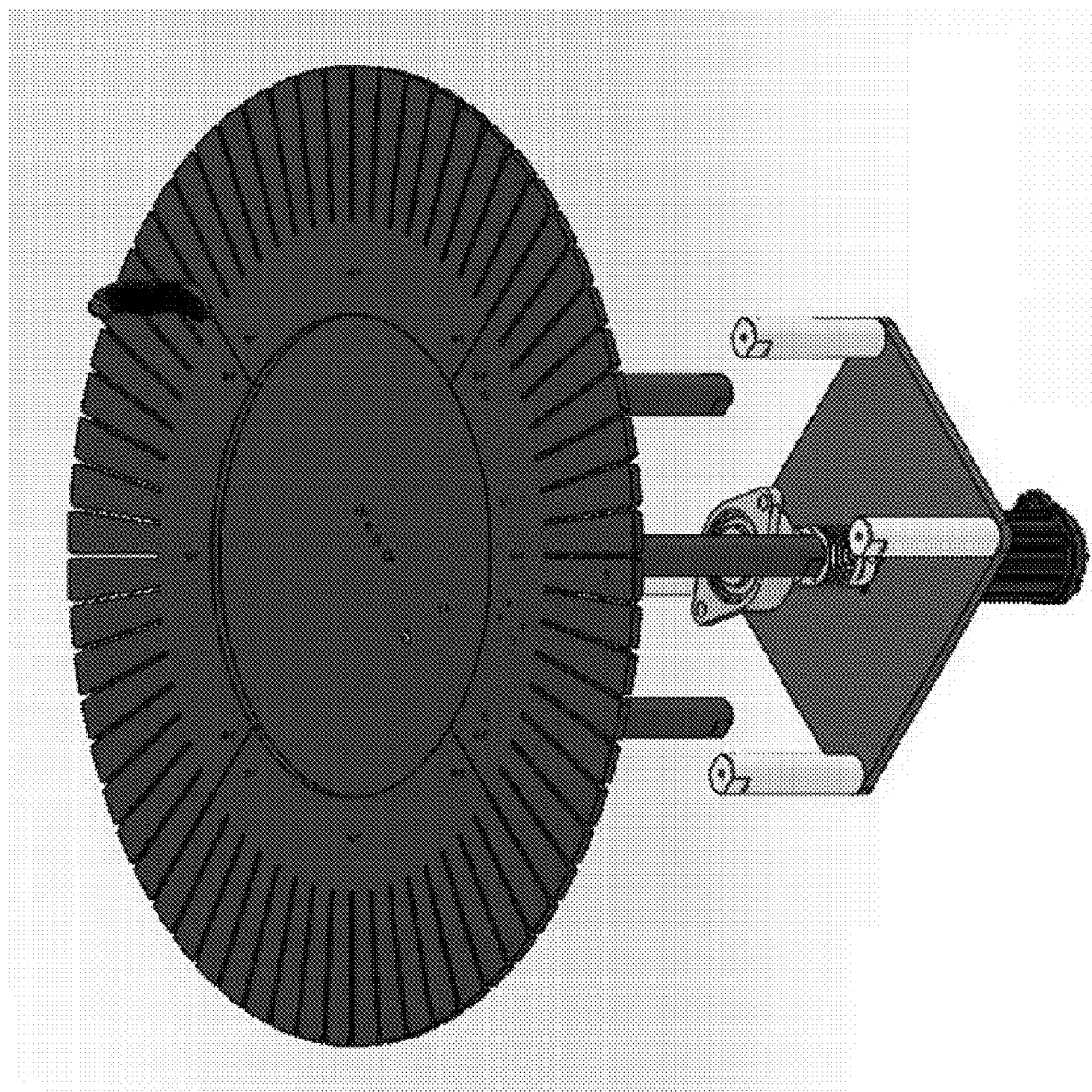
FIGS. 14A-I illustrate computer rendered views of a rotary magazine that holds knives as they are processed by the system.
Figure 14B:
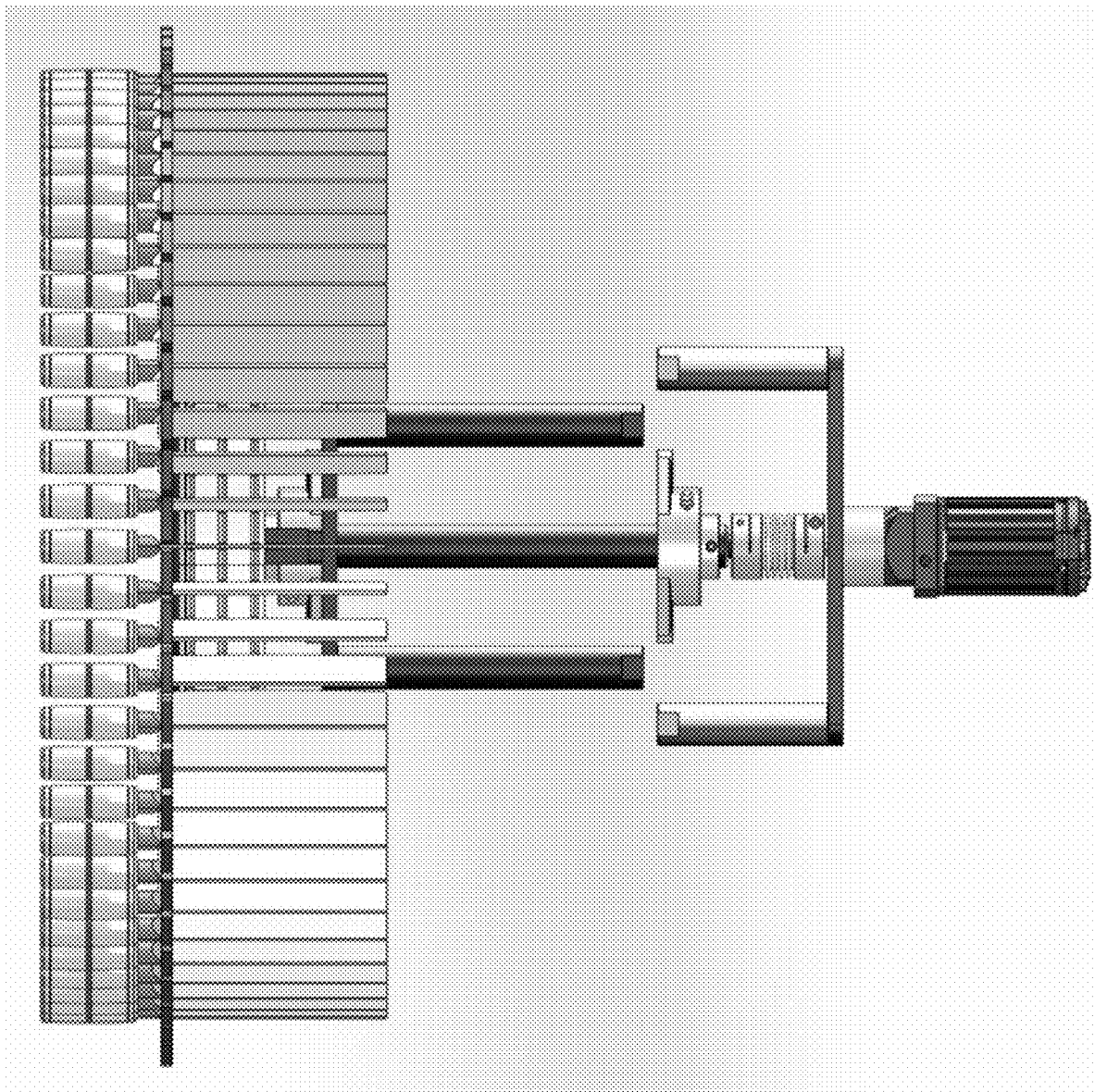
Figure 14C:
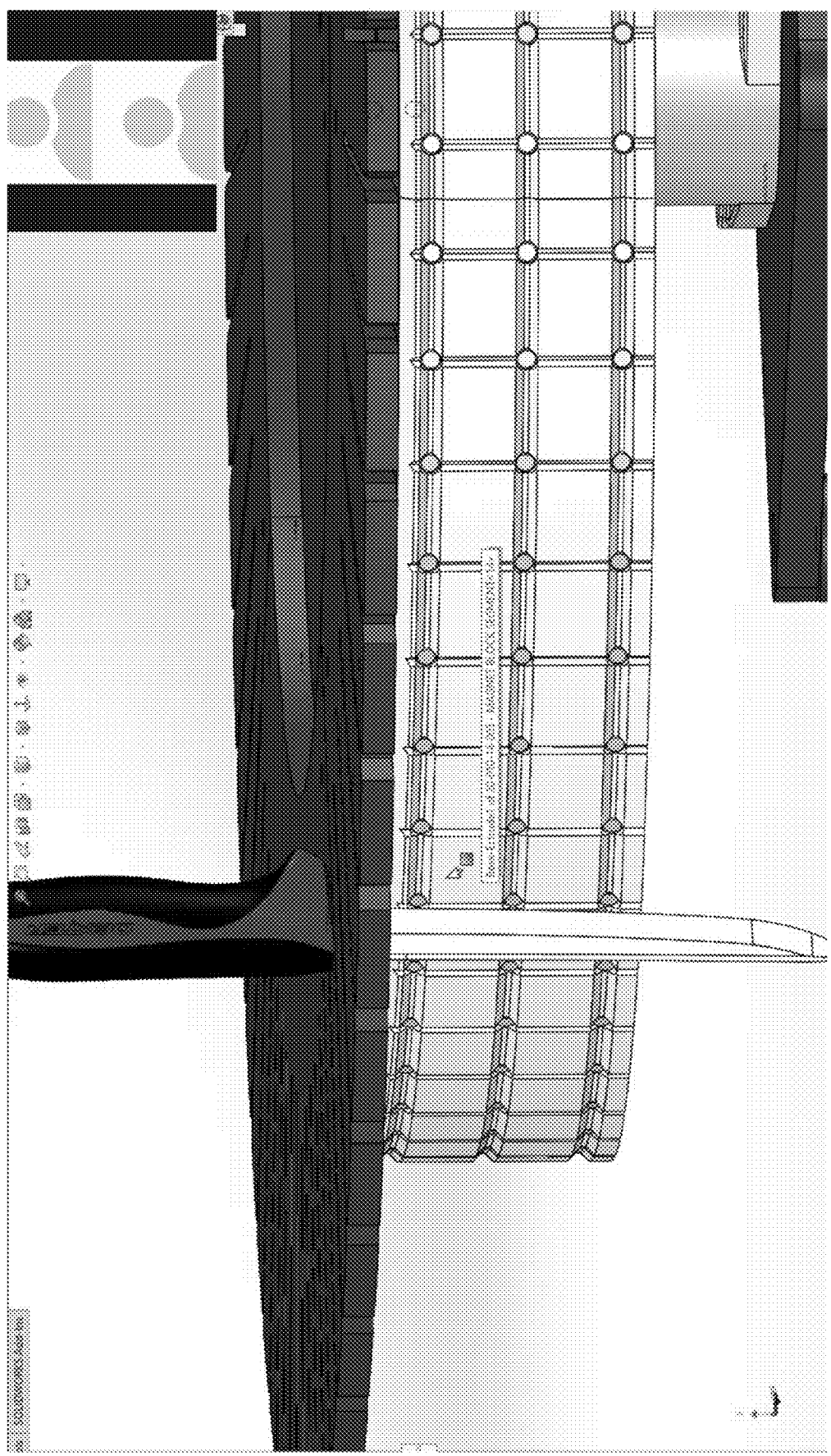
Figure 14D:
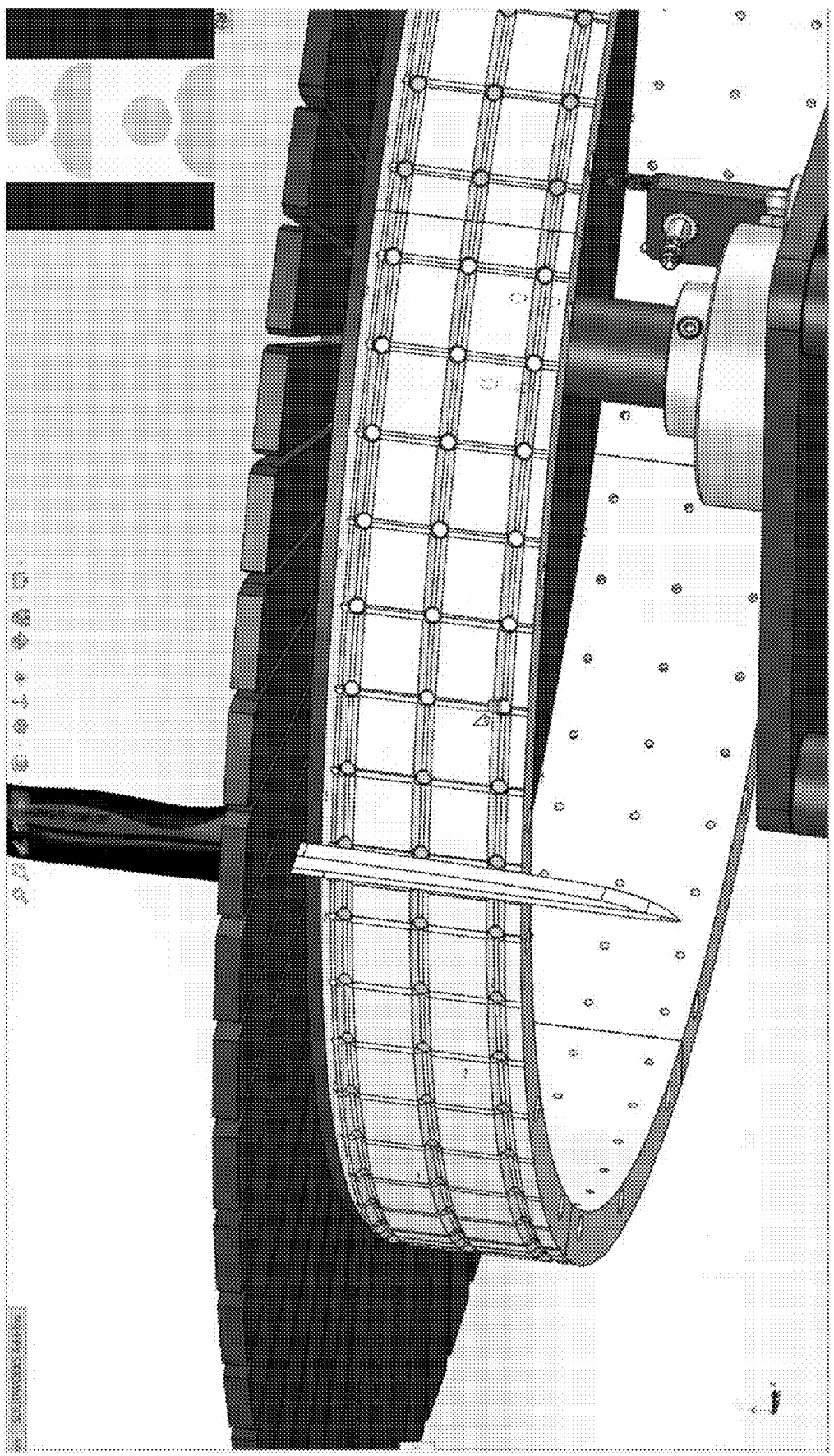
Figure 14E:
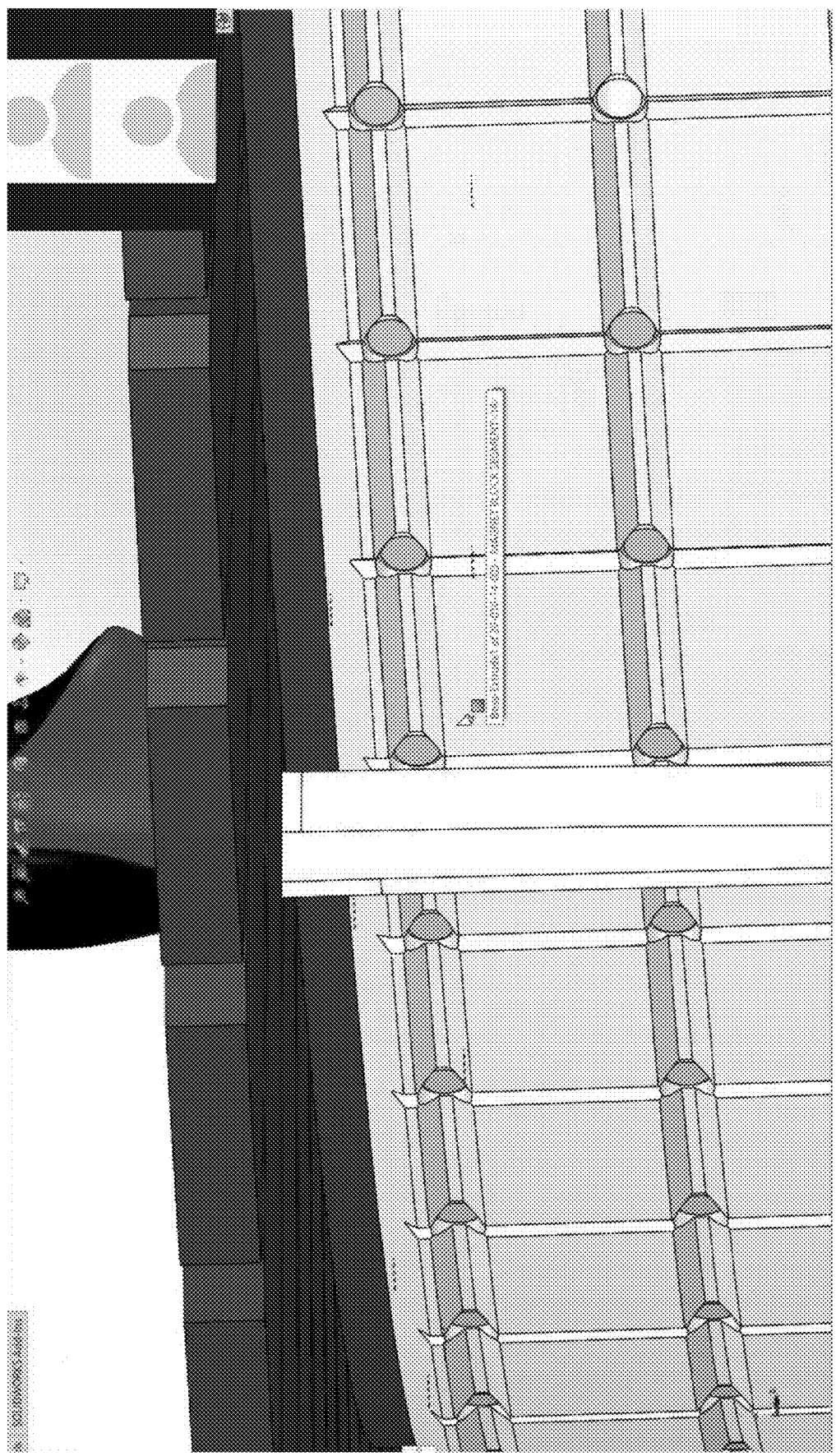
Figure 14F:
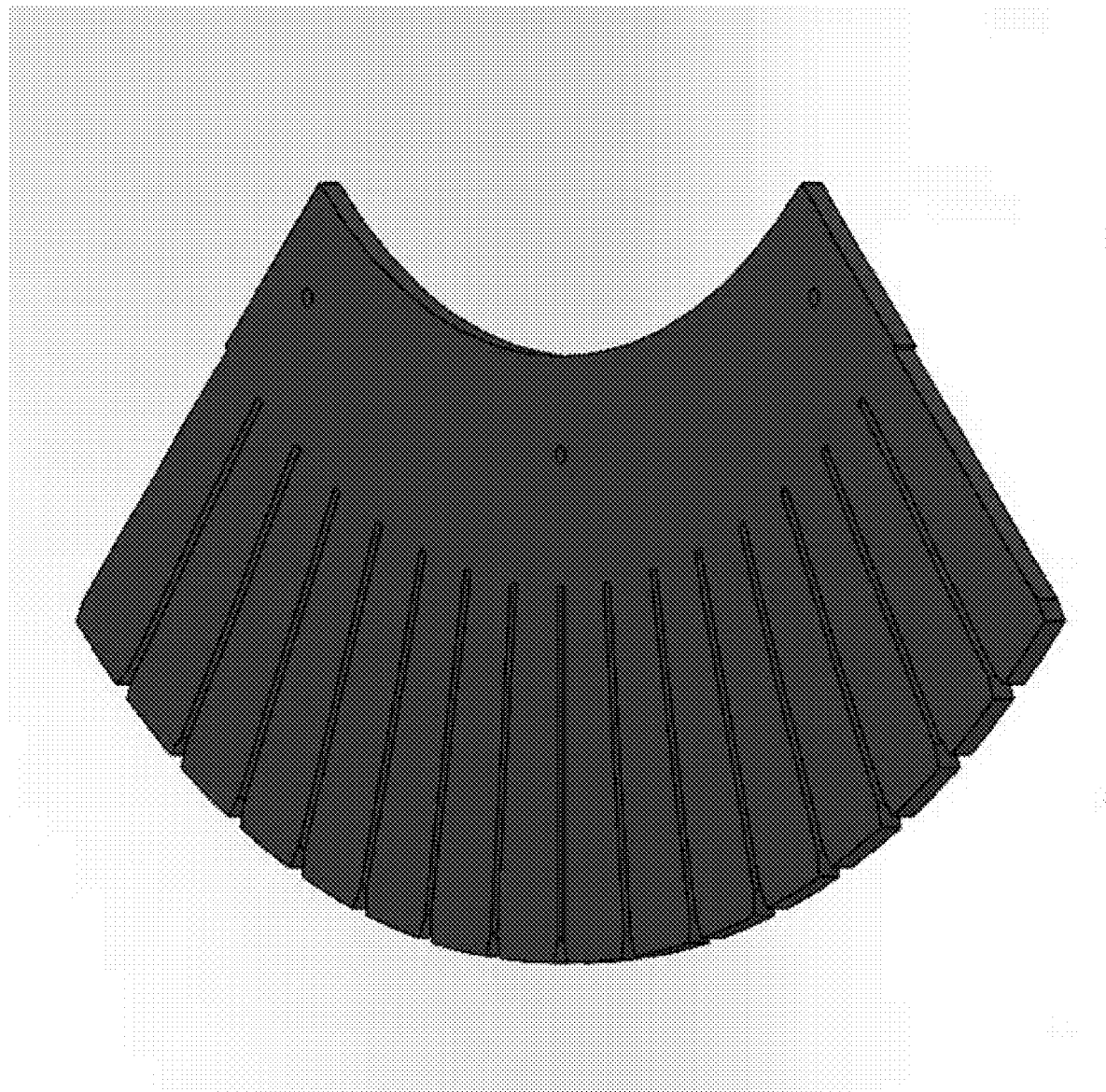
Figure 14G:
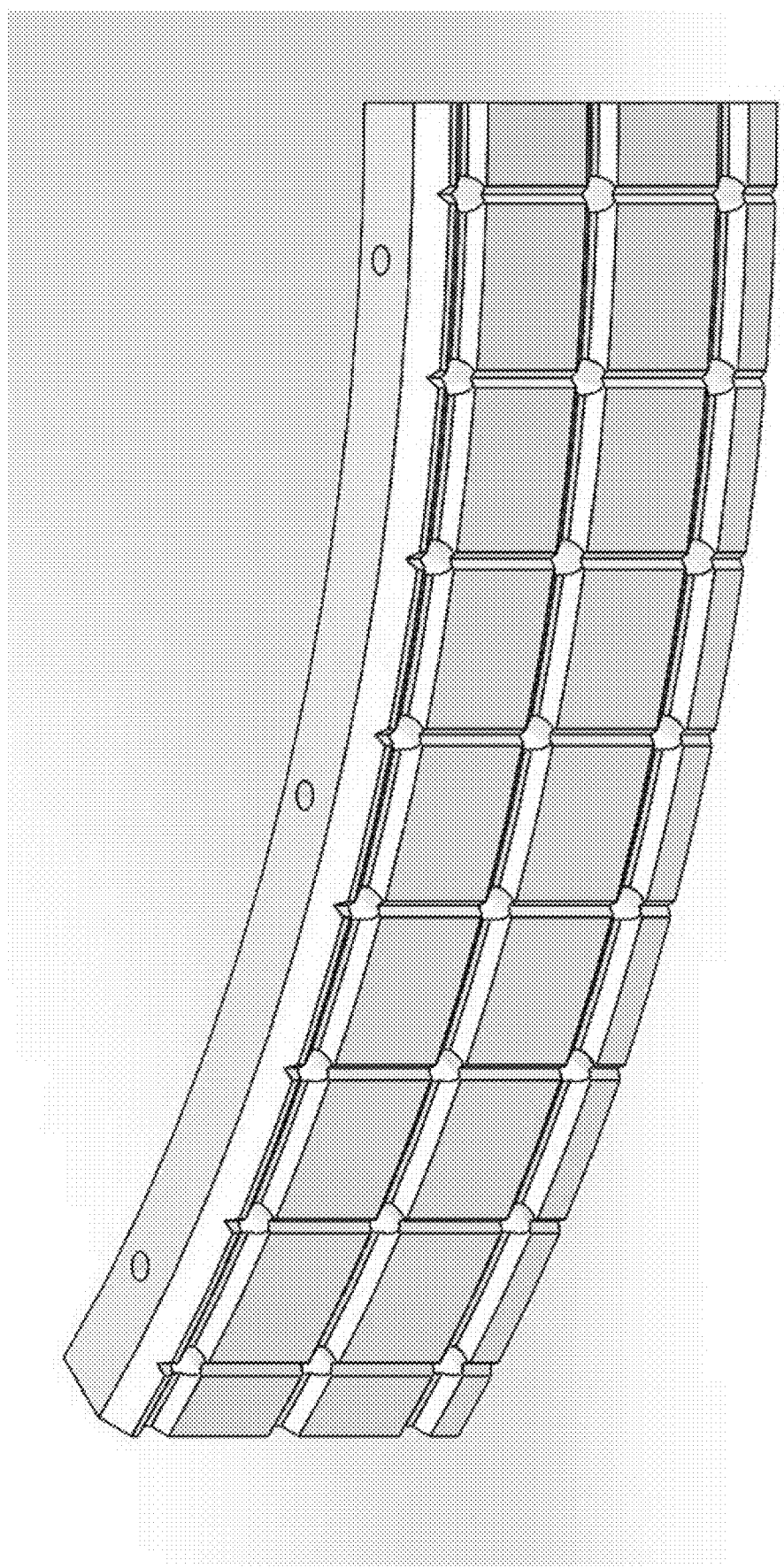
Figure 14H:
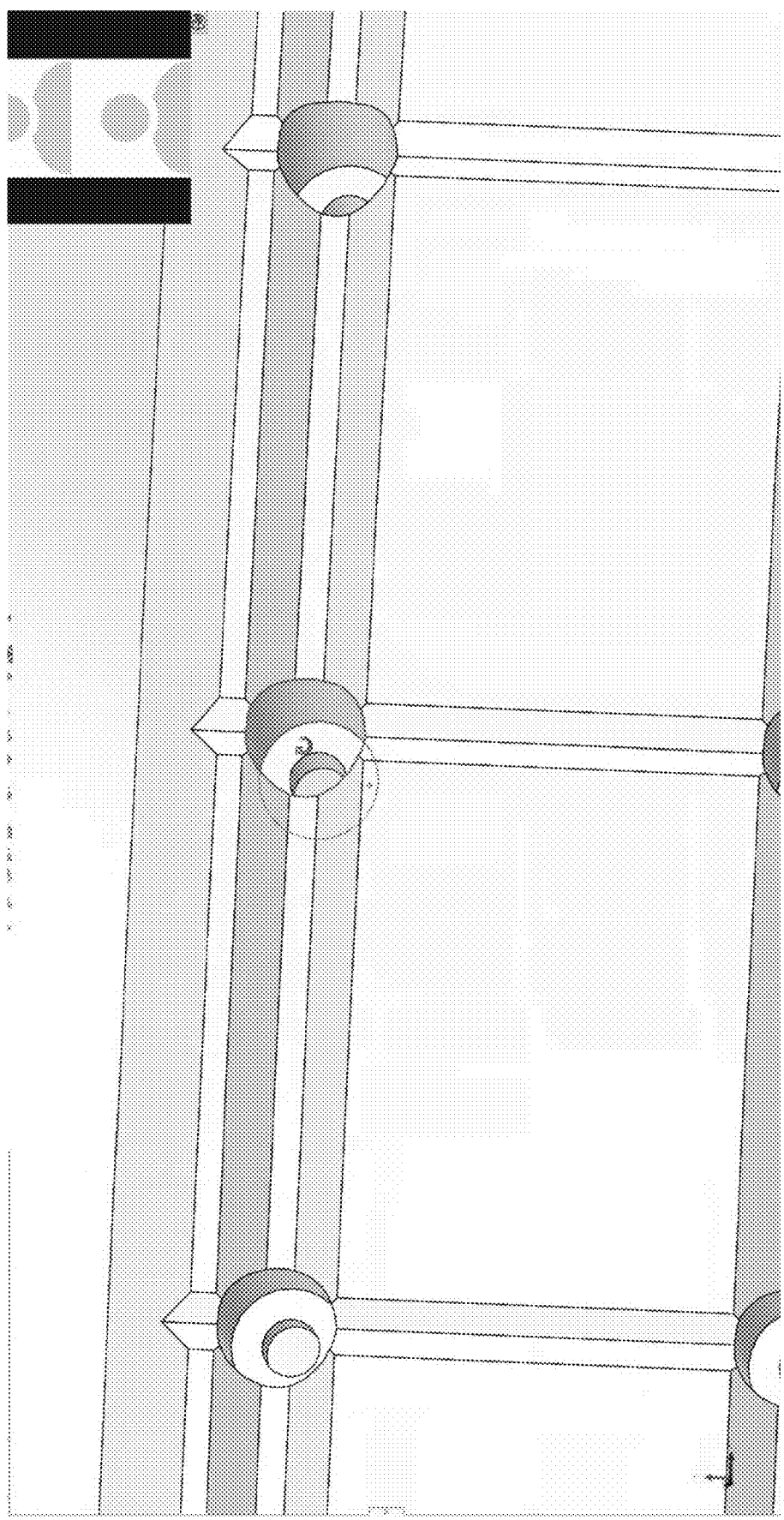
Figure 14I:
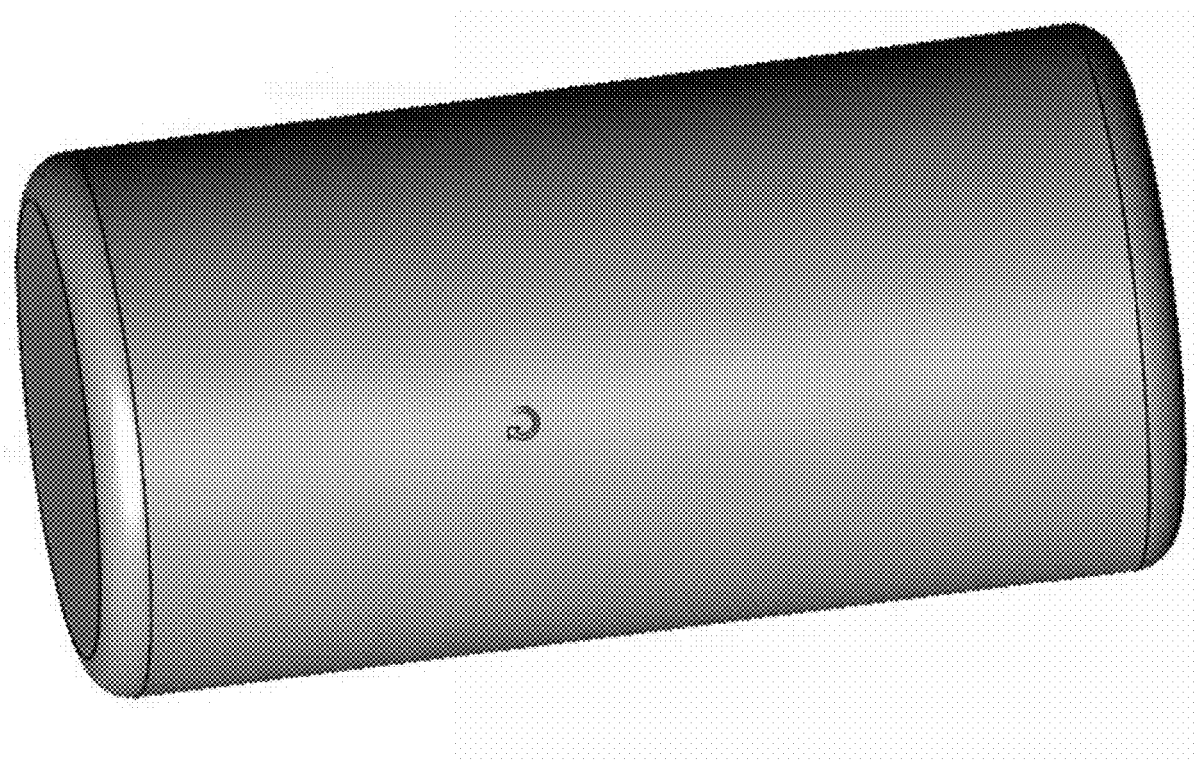

FIGS. 14A-I illustrate computer rendered views of a rotary magazine that holds knives as they are processed by the system. Referring to FIG. 14C, a rotary magazine or carousel is shown with a single knife being held in a slot between two horizontally disposed support members or fingers on the carousel. Below the knife is a knife alignment or securing cylinder, which can be made of a thick plastic, and that contains magnets embedded within the plastic. The embedded magnets are aligned to attract and pull the blade of the hanging knife into a vertically disposed groove formed in the cylinder. In the illustrated embodiment, three magnets are embedded in each groove, and each groove is aligned below a slot between the support members of the carousel. Although three magnets are shown, other numbers of magnets can be embedded, such as one, two, three, four or five. As knives are manually loaded onto the rotary magazine by placing them in the slots, the magnets behind the vertically disposed groove act to secure the knife within the slot and vertically orient the blade profile so that the knife remains in a predicable location and orientation as the carousel rotates and the system operates. By retaining the knife in a predictable position and orientation, the robot arm gripper can more reliably grasp the knife when it is being picked up for sharpening. FIG. 14F illustrates a single section of the carousel showing the slots that hold knives by their handles. FIG. 14G illustrates a single section of the alignment or securing cylinder. FIG. 14H shows a closeup of holes in the alignment or securing cylinder into which the securing magnets can be press-fitted. FIG. 14I illustrates a magnet that can be used in the alignment or securing cylinder.

Figure 15A:
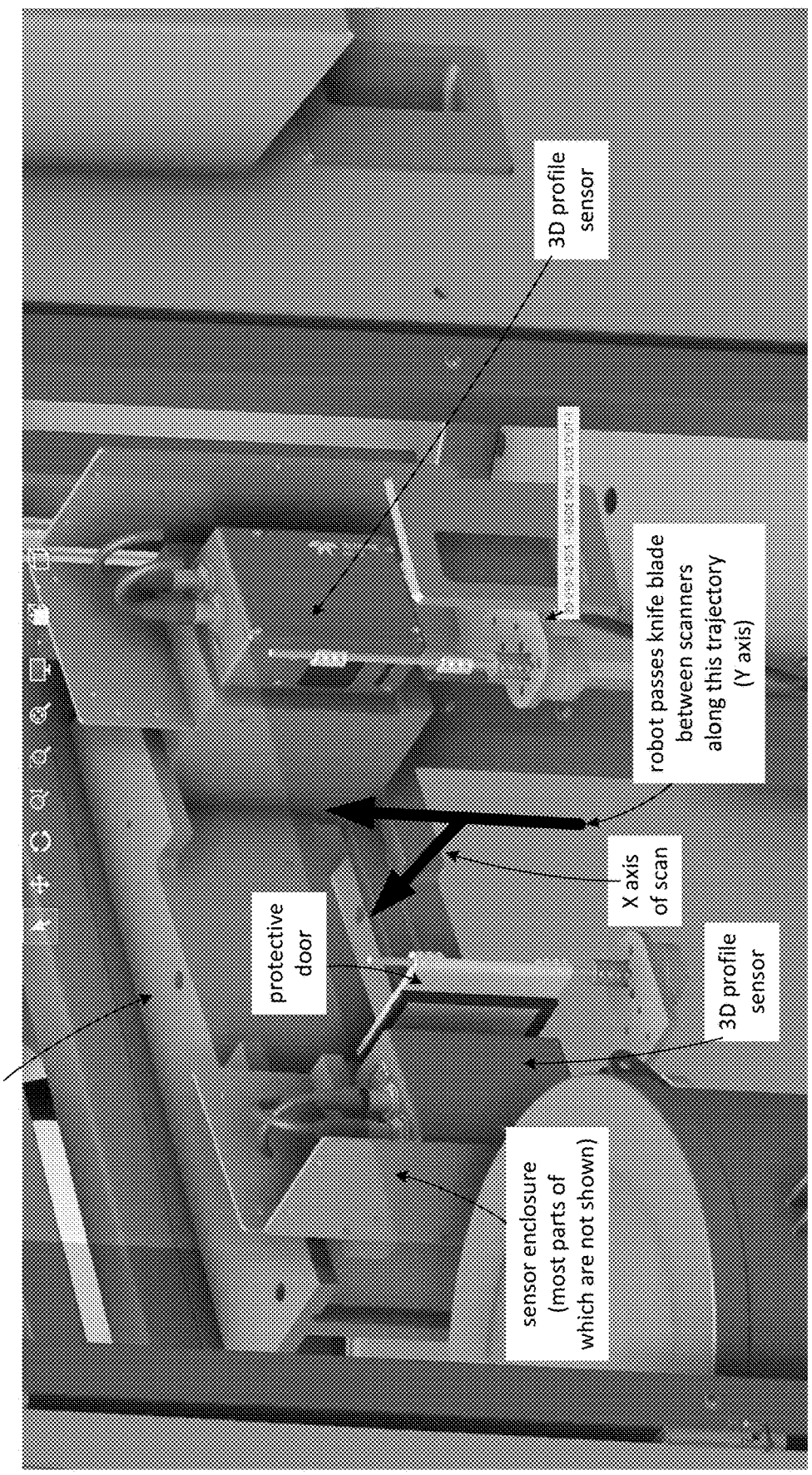
FIGS. 15A-B illustrate aspects of a vision station, profilometer, or profile sensor in accordance with one embodiment.
Figure 15B:
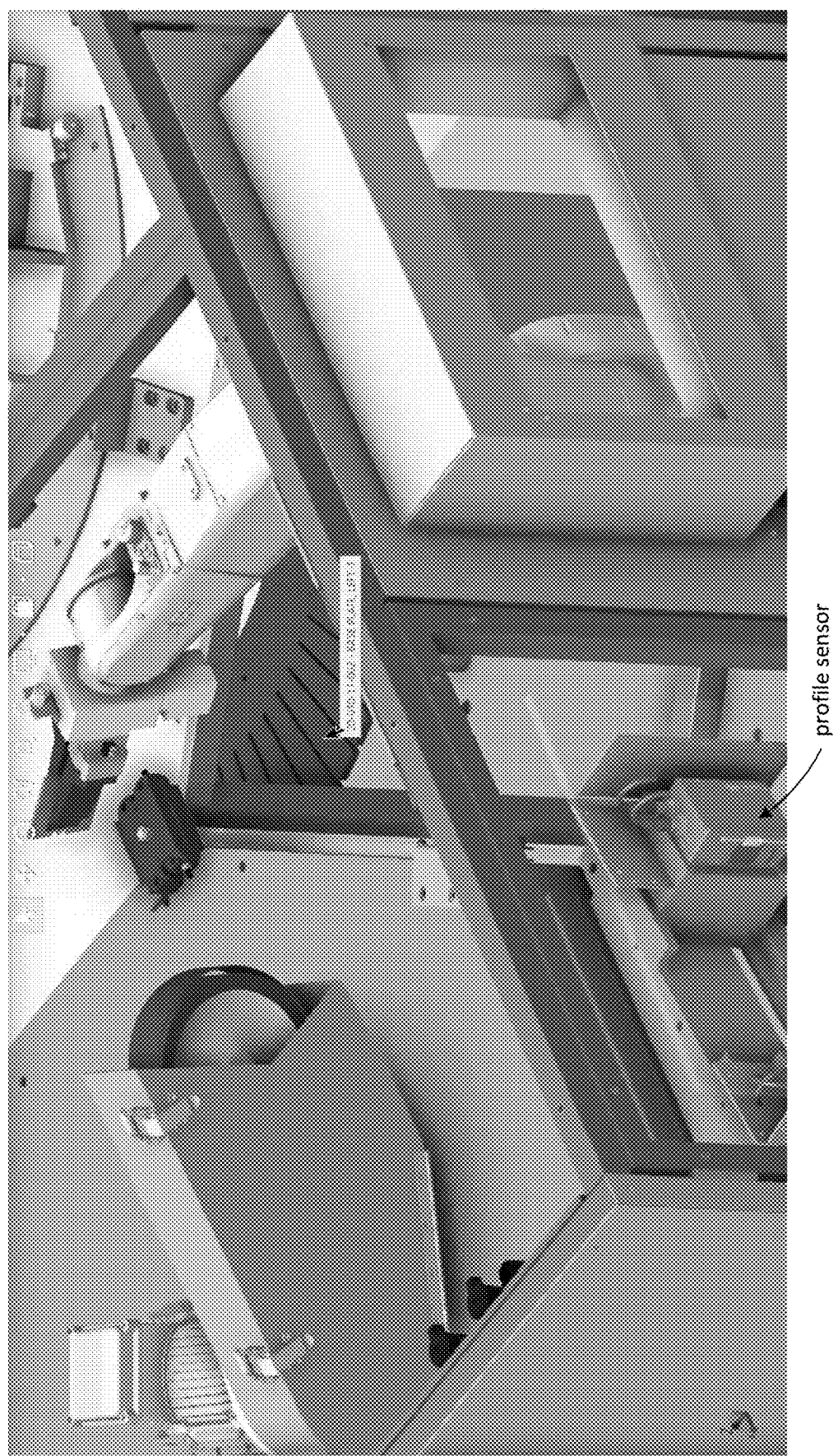

FIGS. 15A-B illustrate aspects of a vision station, profilometer, or profile sensor in accordance with one embodiment. FIG. 15A shows various components of the vision station while FIG. 15B illustrates the positional relationship of the robot relative to the vision station. Each 3D profile sensor is enclosed in a protective case, portions of which are not shown in order to show the profile sensors. Each case has an opening through which the sensor can see a knife as it is passed through the sensor's viewing plane. A protective door opens only while the sensor is scanning a knife that is being passed, and then the door closes again to protect the sensor from sharpening debris from the grinding and polishing stations. Each of the grinding and polishing stations can be configured to completely cease operation and/or rotation while the scanning doors to the profile scanners are open to avoid particulate contamination being thrown upon or about the sensors or their viewing windows.

Figure 16A:
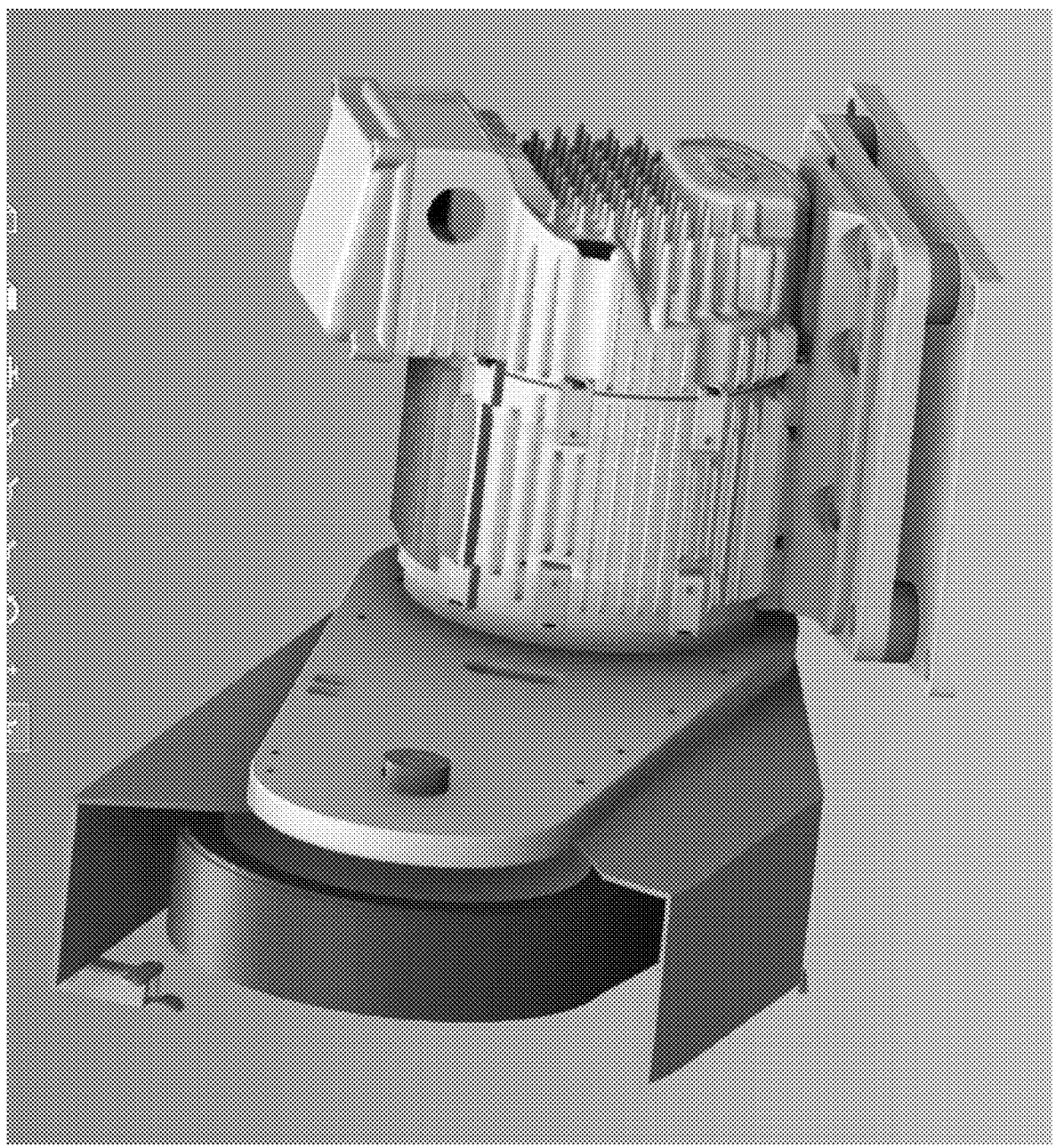
FIGS. 16A-C illustrate aspects of a grinding station in accordance with one embodiment.
Figure 16B:
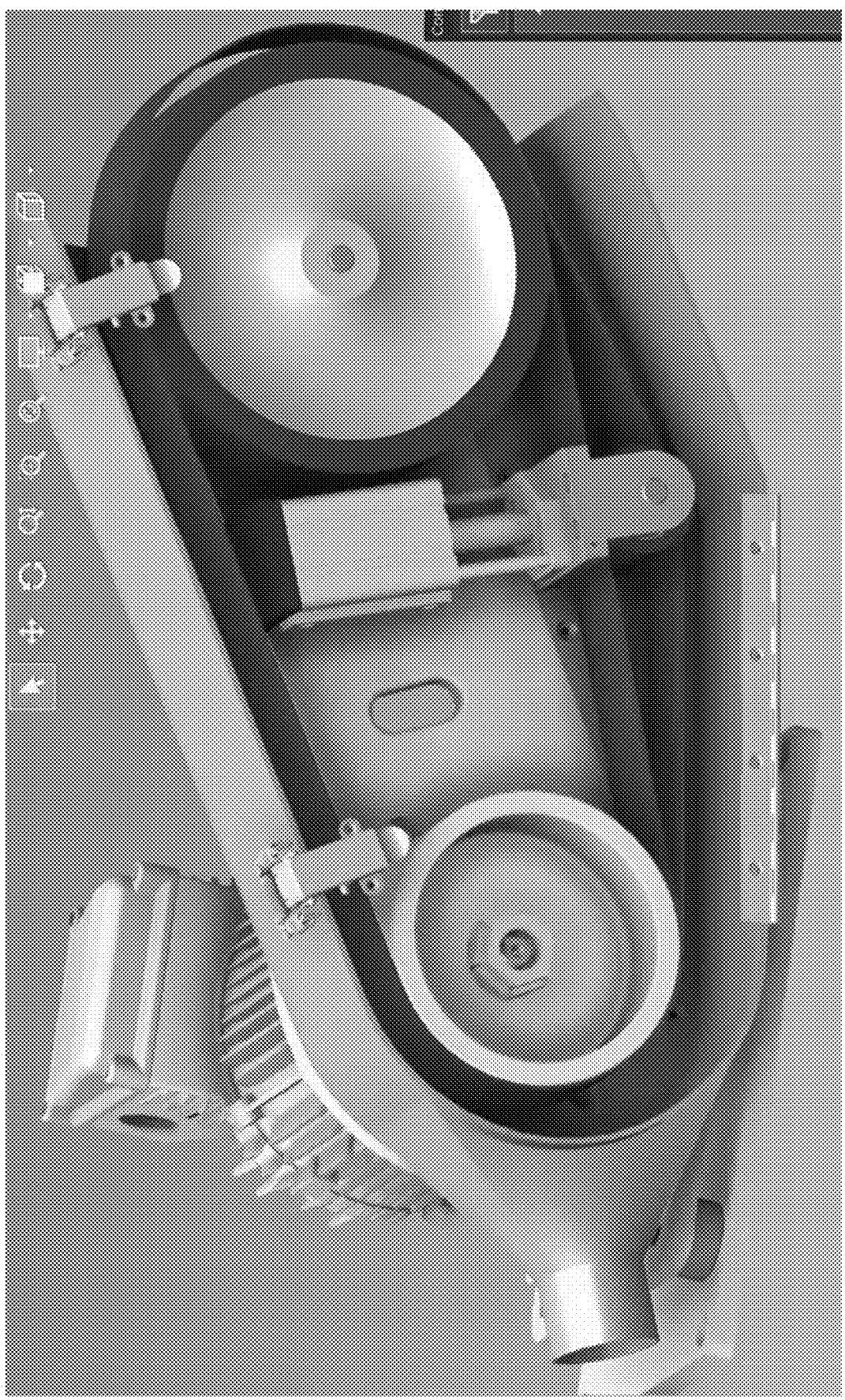
Figure 16C:
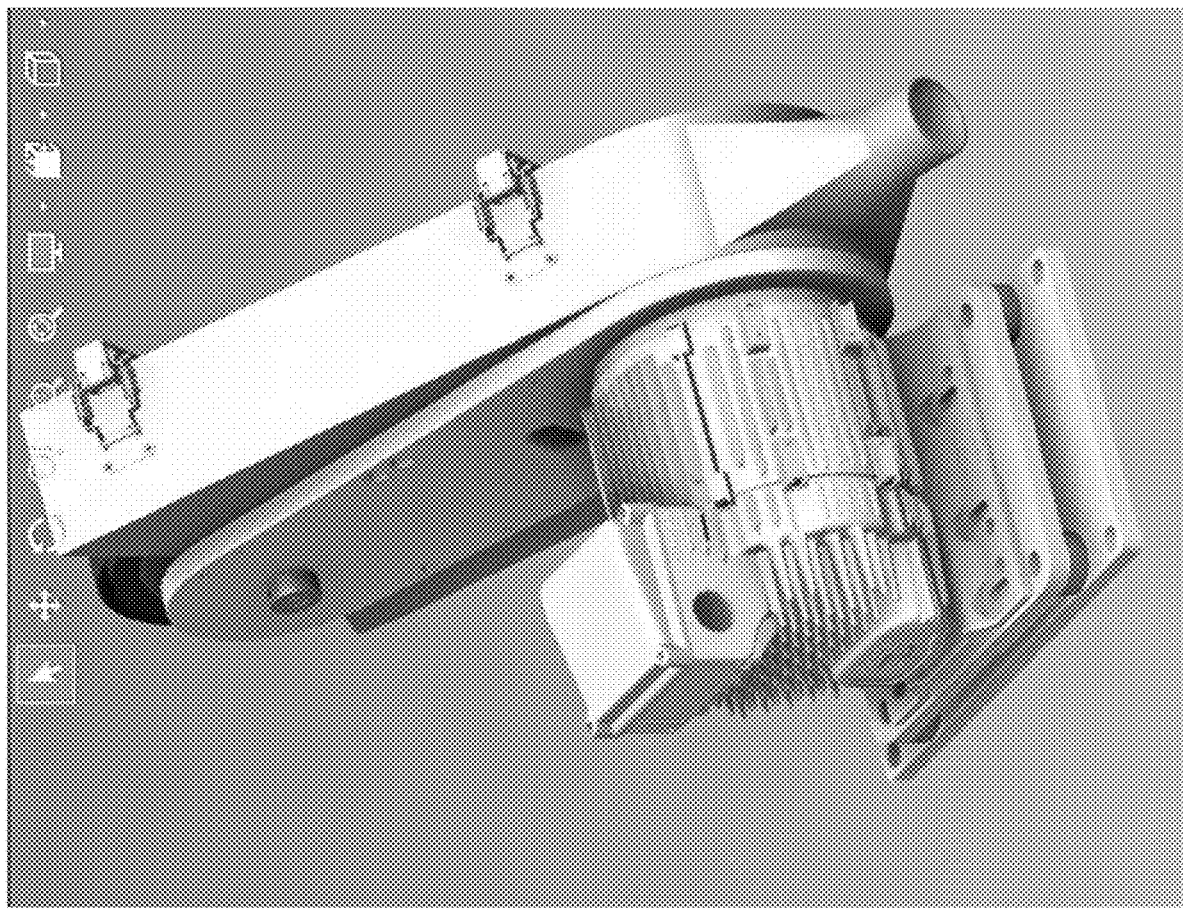

FIGS. 16A-C illustrate aspects of a grinding station in accordance with one embodiment. It will be noted that FIG. 16B illustrates a grinding belt in both a tensioned position and in a loose position, the loose position being for a belt change operation. The tensioned position is associated with the position of a pneumatically actuated tensioner extended as shown in FIG. 16B. A loose position would correspond with the same tensioner being retracted upwards (not shown) to allow for a belt change.

Figure 17A:
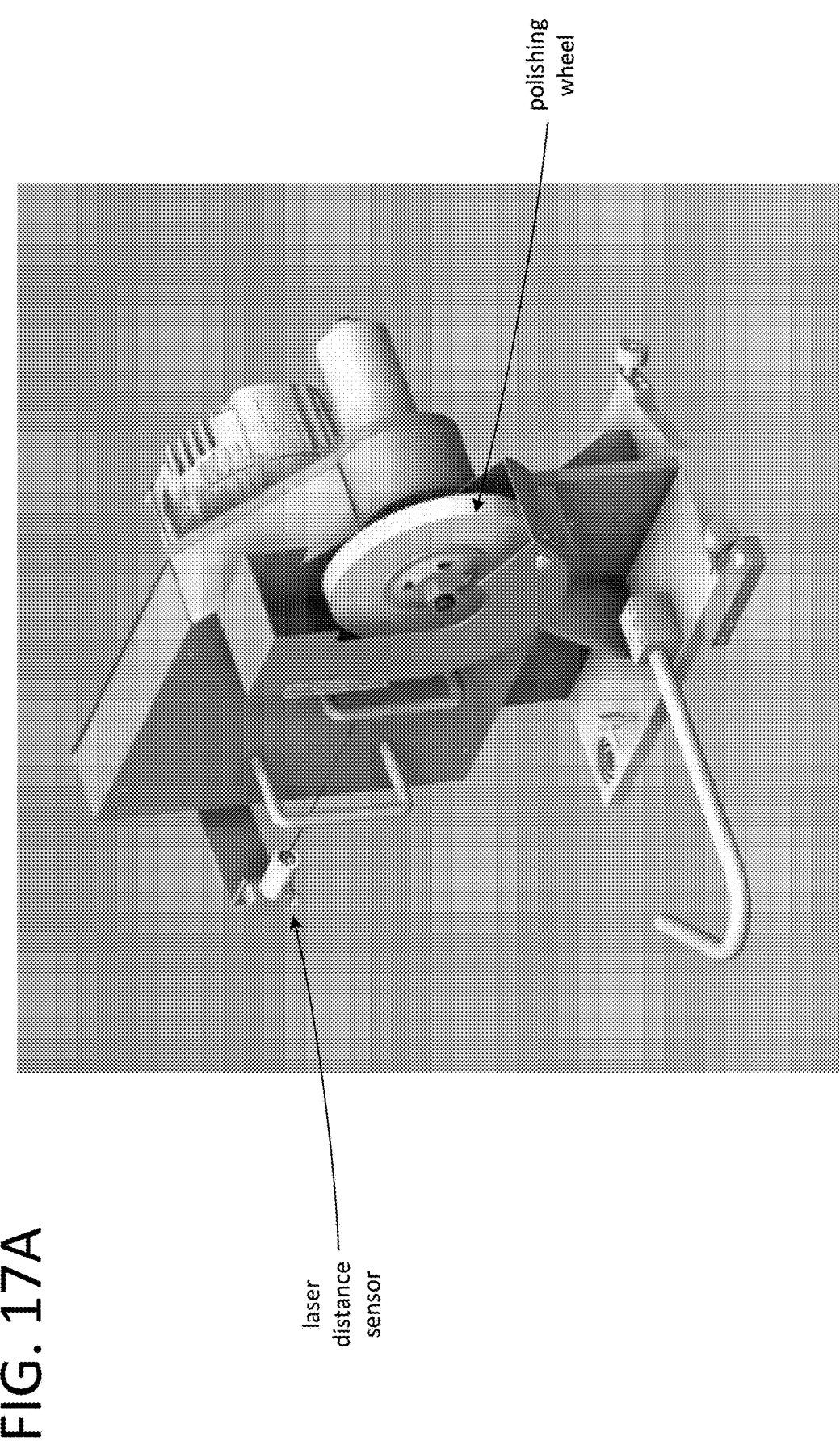
FIGS. 17A-D illustrates aspects of a polishing station in accordance with one embodiment.
Figure 17B:
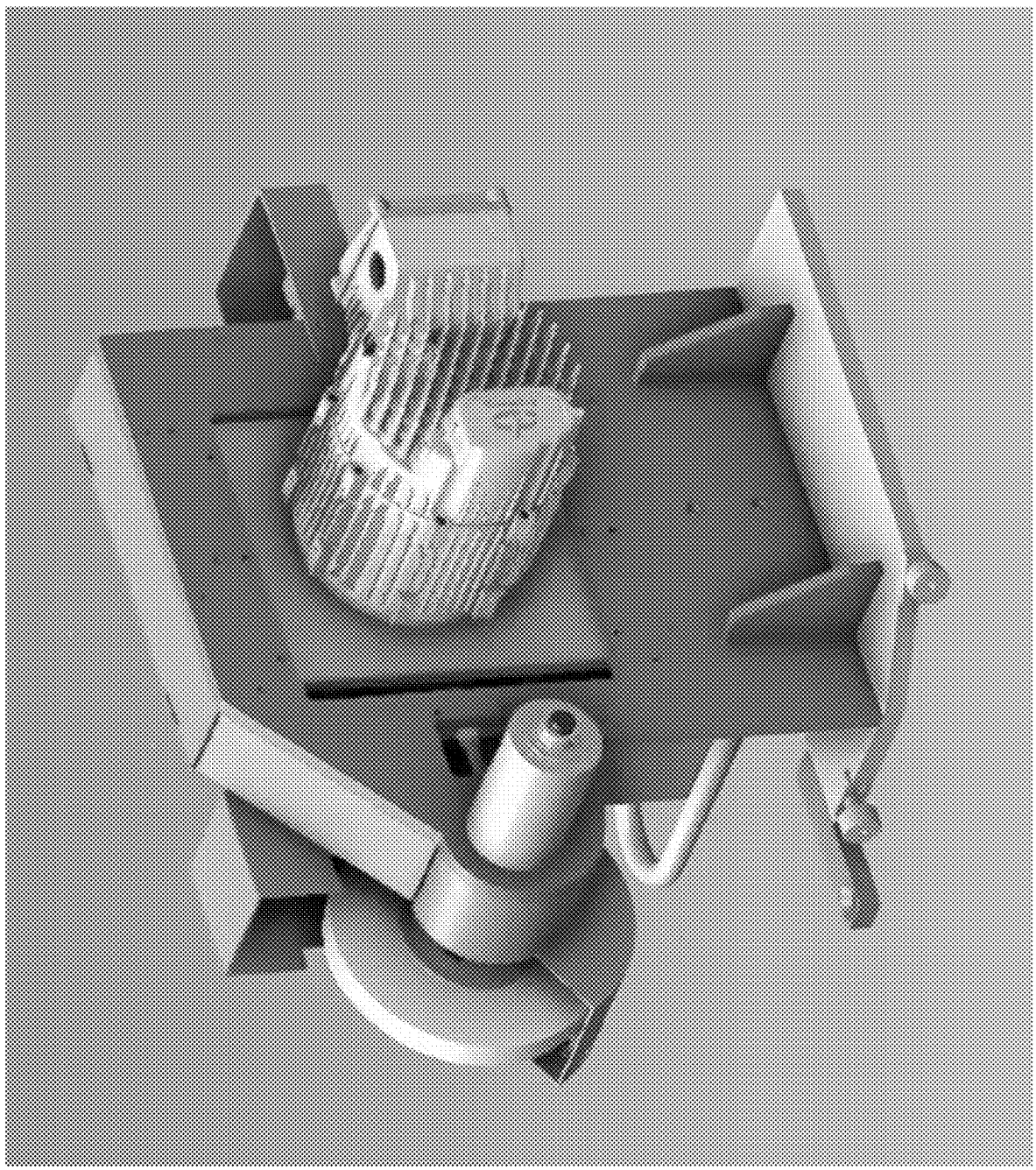
Figure 17C:
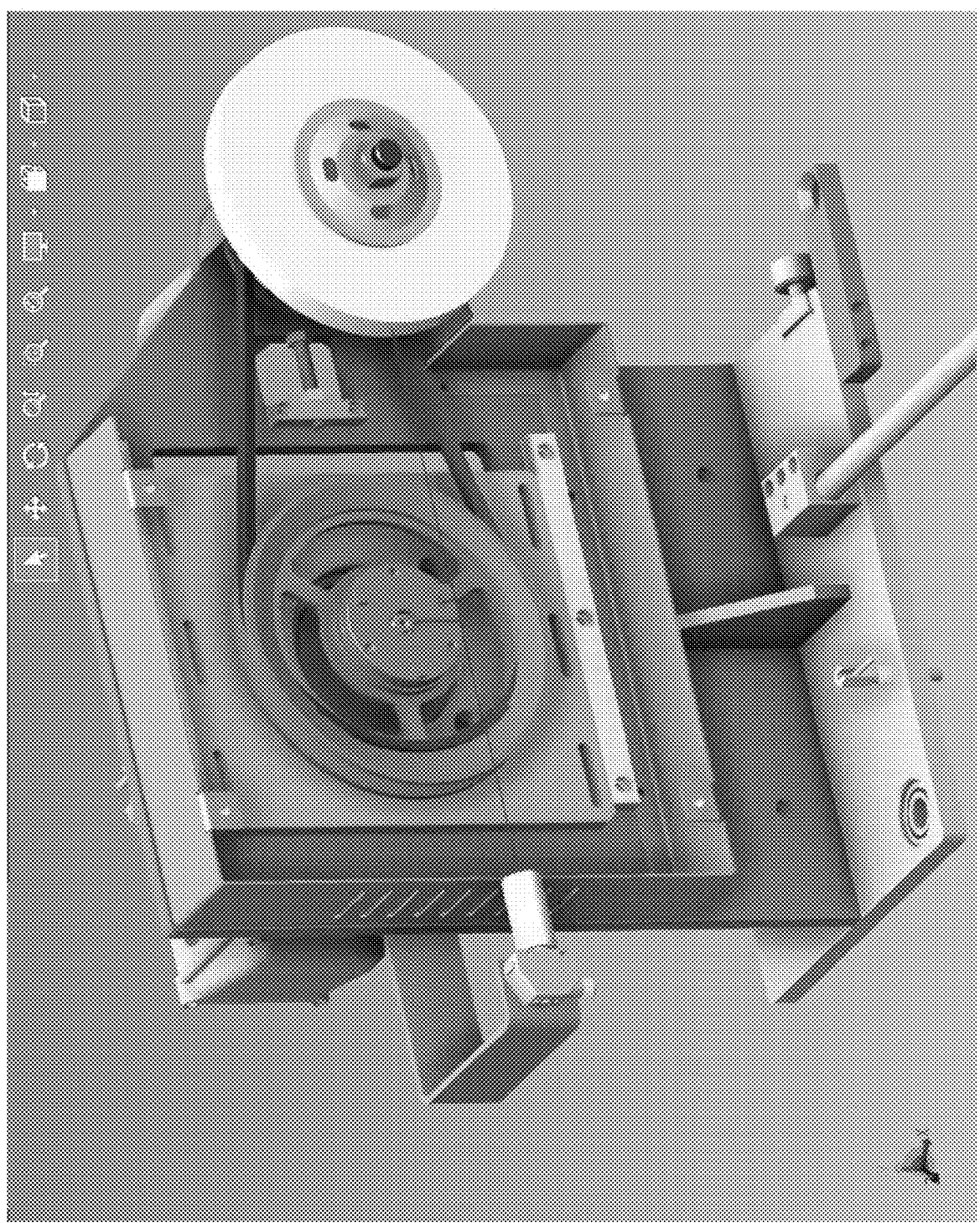
Figure 17D:
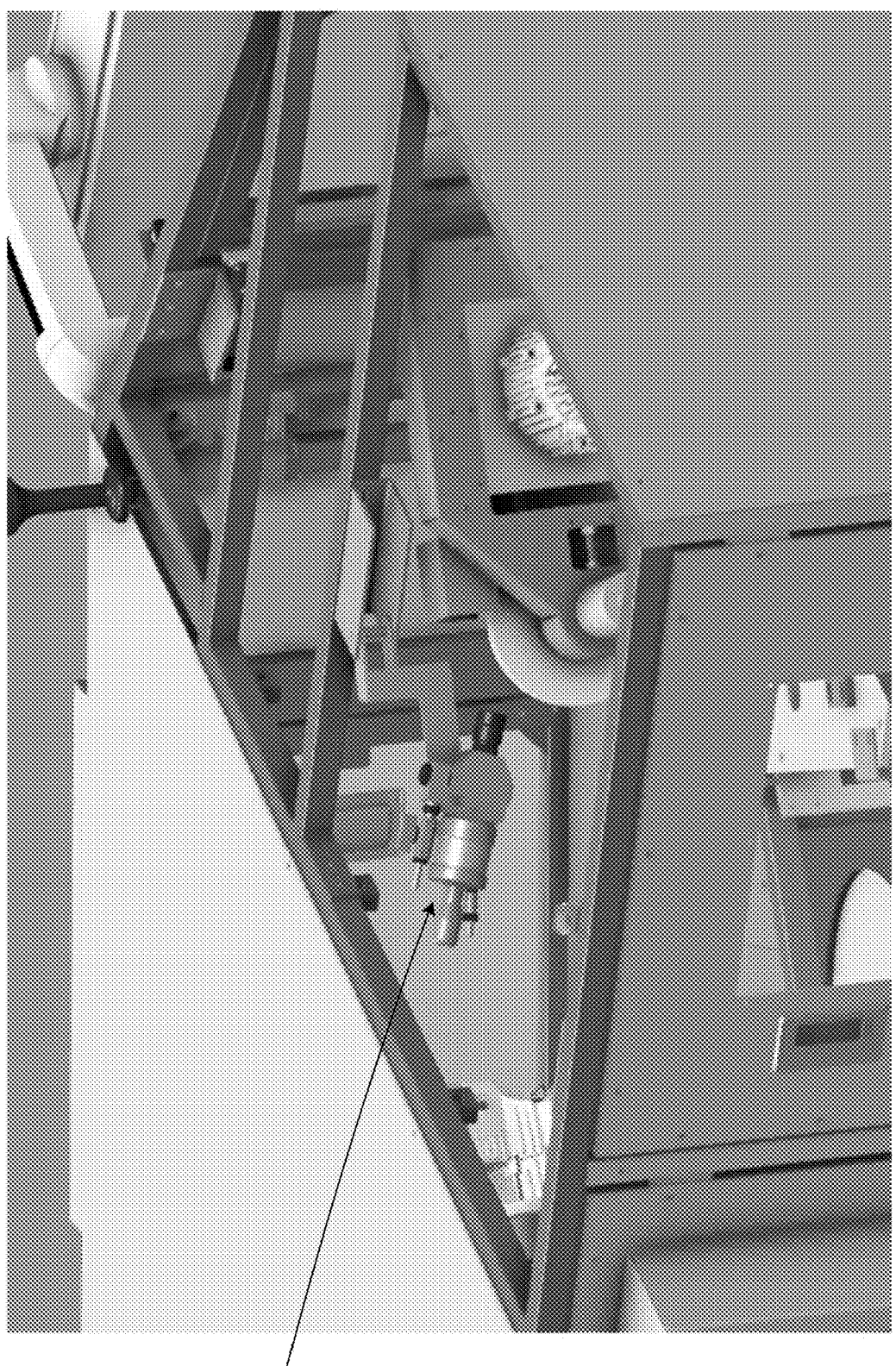

FIGS. 17A-D illustrates aspects of a polishing station in accordance with one embodiment. Referring to FIG. 17A, the polishing station includes a polishing wheel, which can be a cloth or fiber polishing wheel. Since the polishing wheel will abrade over time and decrease diameter, a laser distance sensor is attached to the grinding station and used to measure the diameter of the polishing wheel. Changes in the diameter of the polishing wheel can, in turn, be fed back into the robot control to compensate for the changes in diameter of the polishing wheel. Referring to FIG. 17D, a compound sprayer is attached to the frame of the system and positioned to spray polishing compound onto the polishing wheel as the polishing wheel rotates and polishes a knife.

The grinding station and polishing station can each be configured to use a motor with precise rotational velocity control that can be configured to quickly reach full rotational speed from a stop as well as to stop from full rotational speed. Preferably stop to full speed and full speed to stop can be achieved in under one second each and optionally within 0.5 seconds each. This capability allows the motor to be kept stationary except when performing grinding/polishing so that the wheels are only rotating when the doors to the scanners on the vision station are closed. If a motor that takes a significant time reach full rotational velocity or then reach a stop from full rotational velocity were used, this would significantly lengthen cycle time if the doors on the profile sensor cases were only opened when the station were stopped. In one embodiment, a high torque motor with servo control and rotational velocity control is used for each of the stations, such as the Teknic CPM-MCVC-N0563P-RLS.

CONCLUSION

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

In the claims, the terms "based upon" and "based on" shall include situations in which a factor is taken into account directly and/or indirectly, and possibly in conjunction with other factors, in producing a result or effect. In the claims, a portion shall include greater than none and up to the whole of a thing. In method claims, any reference characters are used for convenience of description only, and do not indicate a particular order for performing a method. In the claims, the ordinal numbers may be used to distinguish between multiple instances of a thing, and such use does not imply an ordering between such instances. In the claims, different ordinal numbers may be used to refer to a single thing or different things in different contexts, such as a first thing being large and a second thing being heavy, wherein the first thing and the second thing may both refer to a single large and heavy thing or to two different things, one of which is large and another of which is heavy.

The invention claimed is:

1. A method for operating a computer-controlled industrial robotic arm to perform operations by a set of one or more workstations upon a workpiece, the method comprising:
   attaching a set of one or more position targets to the robotic arm, wherein each of the position targets has a defined surface profile that is configured for detection by a 3D scanning profilometer;
   operating the robotic arm to pass a centerpoint feature defined by the surface profile of a first target of the set of position targets through a detection plane of a first profilometer during a first profilometer scan;
   based on the first profilometer scan and a registered position of the robotic arm, determining a position of the centerpoint feature during the first profilometer scan;
   for each workstation of the set of one or more workstations:
      manually controlling positioning of the robotic arm to make physical contact between the centerpoint feature and each of one or more calibration points on the each workstation, and
      determining a position of an operating feature of the each workstation based on a registered position of the robotic arm at each physical contact;
   securing a workpiece to the robotic arm;
   operating the robotic arm to pass a portion of the workpiece to be operated upon and a second target of the set of position targets through the detection plane of the first profilometer during a second profilometer scan;
   based on the second profilometer scan, computationally determining a physical surface profile of the portion of the workpiece relative to the second target; and
   based on the determined physical surface profile relative to the second target, operating the robot arm to manipulate the portion of the workpiece for operation upon by the operating feature of the each workstation of the set of one or more workstations.

2. The method of claim 1, wherein the second target is a different target than the first target, and wherein the second target is also passed through the detection plane during the first profilometer scan, the method further comprising:
   based on the first profilometer scan, the defined surface profile of the first target, and the defined surface profile of the second target, determining a position of a defined surface profile feature of the first target relative to a defined surface profile feature of the second target.

3. The method of claim 2,
   wherein the first target has been temporarily secured to the robot arm during the first profilometer scan, and
   wherein the first target has been removed from the robot arm during the second profilometer scan.

4. The method of claim 1, wherein the first and second targets are a same single target.

5. The method of claim 1, further comprising:
   operating the robotic arm to pass the portion of the workpiece to be operated upon and a third target of the set of position targets through the detection plane of the first profilometer during a third profilometer scan, wherein the second profilometer scan and the third profilometer scan each scan the portion of the workpiece from a different perspective; and based on the third profilometer scan, determining a physical surface profile of the portion of the workpiece relative to the third target,
wherein the robot arm is operated to manipulate the portion of the workpiece for operation upon by the operating feature of the each workstation of the set of one or more workstations further based on the determined physical surface profile relative to the third target.

6. The method of claim 5, wherein the first, second and third targets are different targets.

7. The method of claim 5, wherein the first, second and third targets are a same single target.

8. The method of claim 1,
wherein a second profilometer is positioned and oriented opposite the first profilometer,
wherein during the first profilometer scan, the centerpoint feature is passed between the first and second profilometers through a detection plane of the second profilometer simultaneously with being passed through the detection plane of the first profilometer, and
wherein during the second profilometer scan, the portion of the workpiece to be operated upon and a third target of the set of position targets are passed between the first and second profilometers through the detection plane of the second profilometer.

9. The method of claim 8, further comprising:
performing a positional and orientational calibration between the robotic arm and each of the first profilometer and the second profilometer based on the defined surface profile of the first target.

10. The method of claim 1,
wherein the robot arm comprises a robotically controllable gripper, and
wherein the workpiece is secured to the robot arm by the gripper gripping the workpiece.

11. The method of claim 10,
wherein the set of one or more workstations comprises a grinder for removing material from a portion of the workpiece, and
wherein the operating feature of the grinder is a grinding surface.

12. The method of claim 11,
wherein the workpiece is a cutting blade, and
wherein the portion of the workpiece is a cutting edge of the cutting blade.

13. The method of claim 12, further comprising:
computationally determining a target edge profile for the cutting edge based on the determined physical surface profile of the cutting edge,
wherein the robot arm manipulates the cutting blade for operation upon by the grinder to remove material in accordance with the target edge profile.

14. The method of claim 13, wherein the target edge profile is computationally determined:
based on a set of one or more predetermined target edge profile characteristics; and
by extrapolating the determined physical surface profile of the cutting edge into the cutting blade.

15. The method of claim 14, further comprising:
computationally analyzing the determined physical surface profile to identify defects in the determined physical surface profile; and
computationally determining an amount of extrapolation into the cutting blade based on the identified defects.

16. The method of claim 13,
wherein the set of one or more workstations comprises a polisher for polishing the cutting edge, and
wherein, after operation upon by the grinder, the robot arm manipulates the cutting blade for operation upon by the polisher to polish the cutting edge in accordance with the target edge profile.

17. The method of claim 12,
wherein the cutting blade is part of a knife having a handle, and
wherein the cutting blade is gripped by the gripper by two lateral sides of the cutting blade such that the cutting edge is exposed and unobstructed by the gripper.

18. The method of claim 10, further comprising:
securing a workpiece to the robotic arm, the gripper gripping the workpiece to remove it from a predetermined location in a holder configured for storing multiple workpieces; and
after operating the robot arm to manipulate the portion of the workpiece for operation upon by the operating feature of the each workstation of the set of one or more workstations, operating the robot arm and the gripper to place the workpiece in a predetermined location in a holder configured for storing multiple workpieces.

* * * * *